United States Patent
Kubota et al.

(10) Patent No.: US 11,487,373 B2
(45) Date of Patent: Nov. 1, 2022

(54) DISPLAY DEVICE, AUTHENTICATION METHOD, AND PROGRAM

(71) Applicant: SEMICONDUCTOR ENERGY LABORATORY CO., LTD., Atsugi (JP)

(72) Inventors: Daisuke Kubota, Kanagawa (JP); Ryo Hatsumi, Kanagawa (JP); Taisuke Kamada, Saitama (JP); Koji Kusunoki, Kanagawa (JP); Kazunori Watanabe, Tokyo (JP); Susumu Kawashima, Kanagawa (JP); Kensuke Yoshizumi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/026,446

(22) Filed: Sep. 21, 2020

(65) Prior Publication Data
US 2021/0096678 A1 Apr. 1, 2021

(30) Foreign Application Priority Data

Sep. 27, 2019 (JP) .............................. JP2019-176791

(51) Int. Cl.
*G06F 3/041* (2006.01)
*G06F 3/042* (2006.01)
*G06V 40/13* (2022.01)

(52) U.S. Cl.
CPC ............ *G06F 3/0412* (2013.01); *G06F 3/042* (2013.01); *G06V 40/1318* (2022.01); *G06F 2203/04103* (2013.01)

(58) Field of Classification Search
CPC ............ G06F 3/041–047; G06F 3/044; G06F 3/0443; G06F 3/0446; G06F 2203/04111;
(Continued)

(56) References Cited

U.S. PATENT DOCUMENTS

| 10,541,280 B1 * | 1/2020 | Krah ..................... G06F 3/0446 |
| 2010/0220041 A1 | 9/2010 | Smith |

(Continued)

FOREIGN PATENT DOCUMENTS

| CN | 108962951 A | 12/2018 |
| JP | 2003-330383 A | 11/2003 |

(Continued)

*Primary Examiner* — Sanjiv D. Patel
(74) *Attorney, Agent, or Firm* — Fish & Richardson P.C.

(57) ABSTRACT

A display device featuring a touch detection and a fingerprint imaging functions is provided. A display device includes a light-emitting element and a light-receiving element. The light-emitting element includes a first pixel electrode, a light-emitting layer, and a common electrode, and the light-receiving element includes a second pixel electrode, an active layer, and the common electrode. The first pixel electrode and the second pixel electrode are provided on the same plane. The common electrode overlaps with the first pixel electrode with the light-emitting layer therebetween, and overlaps with the second pixel electrode with the active layer therebetween. A first conductive layer, a second conductive layer, and an insulating layer are provided above the common electrode. The insulating layer is provided above the first conductive layer, and the second conductive layer is provided above the insulating layer. The light-receiving element has a function of receiving light emitted from the light-emitting element.

6 Claims, 25 Drawing Sheets

(58) Field of Classification Search
CPC ............... H01L 27/323; H01L 27/3262; H01L 27/3246; H01L 27/3258; G09G 3/3233; G09G 2300/0426
See application file for complete search history.

(56) References Cited

U.S. PATENT DOCUMENTS

| | | |
|---|---|---|
| 2013/0075761 A1 | 3/2013 | Akiyama |
| 2014/0056493 A1 | 2/2014 | Gozzini |
| 2014/0350366 A1 | 11/2014 | Akiyama |
| 2016/0174847 A1 | 6/2016 | Tsuchiya |
| 2017/0330920 A1 | 11/2017 | Tanaka et al. |
| 2018/0210571 A1* | 7/2018 | Wang .................... G06F 3/0412 |
| 2019/0013368 A1 | 1/2019 | Chung et al. |
| 2020/0119113 A1* | 4/2020 | Lee ....................... G06F 3/0446 |

FOREIGN PATENT DOCUMENTS

| | | |
|---|---|---|
| JP | 2014-197522 A | 10/2014 |
| JP | 2018-037356 A | 3/2018 |

\* cited by examiner

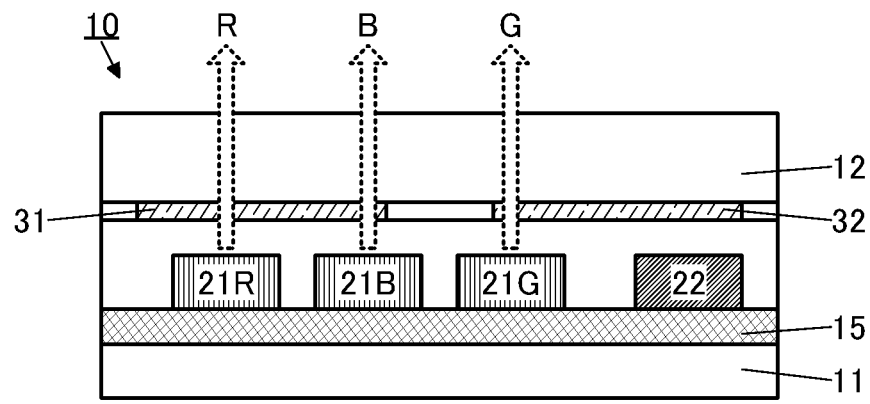
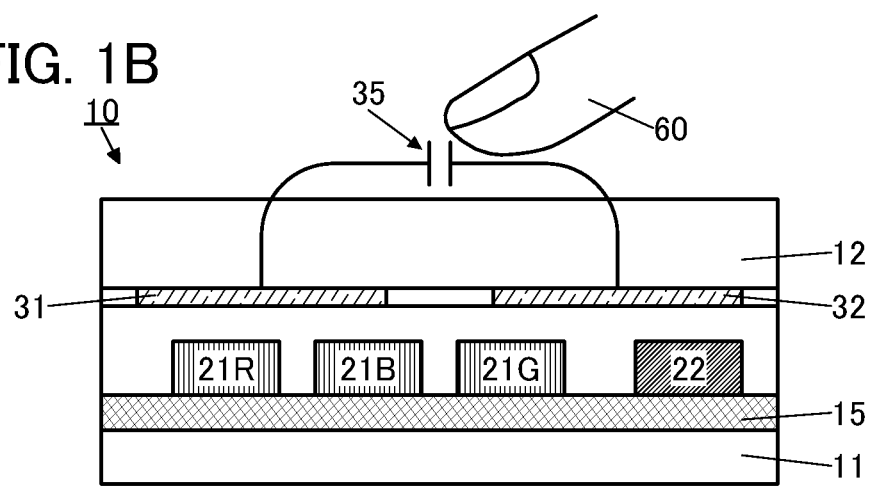
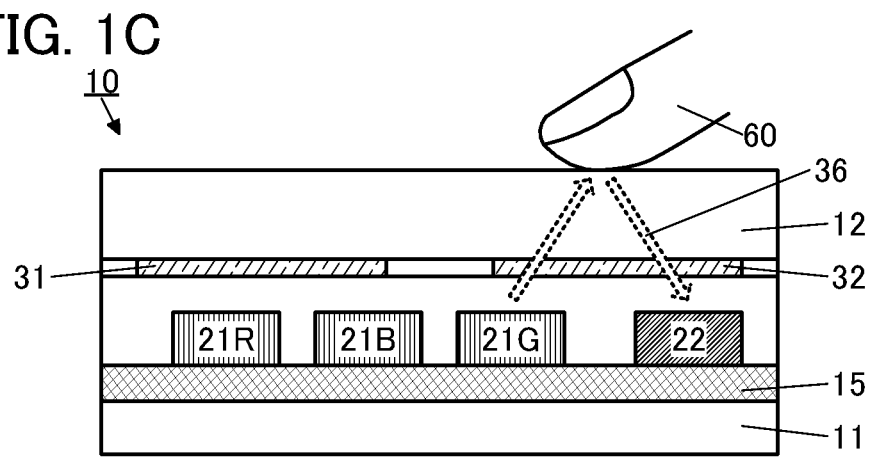

100C

100D

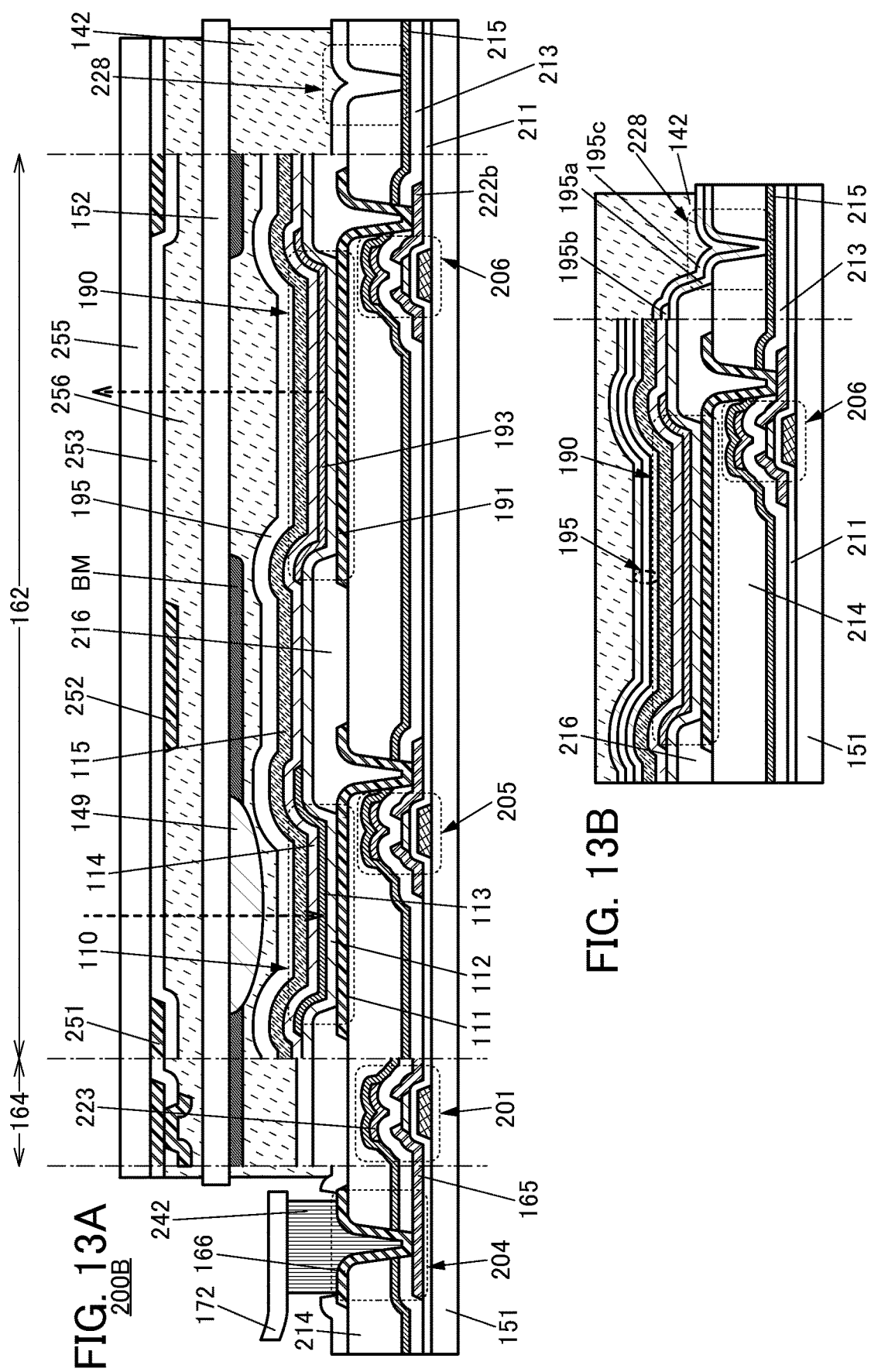

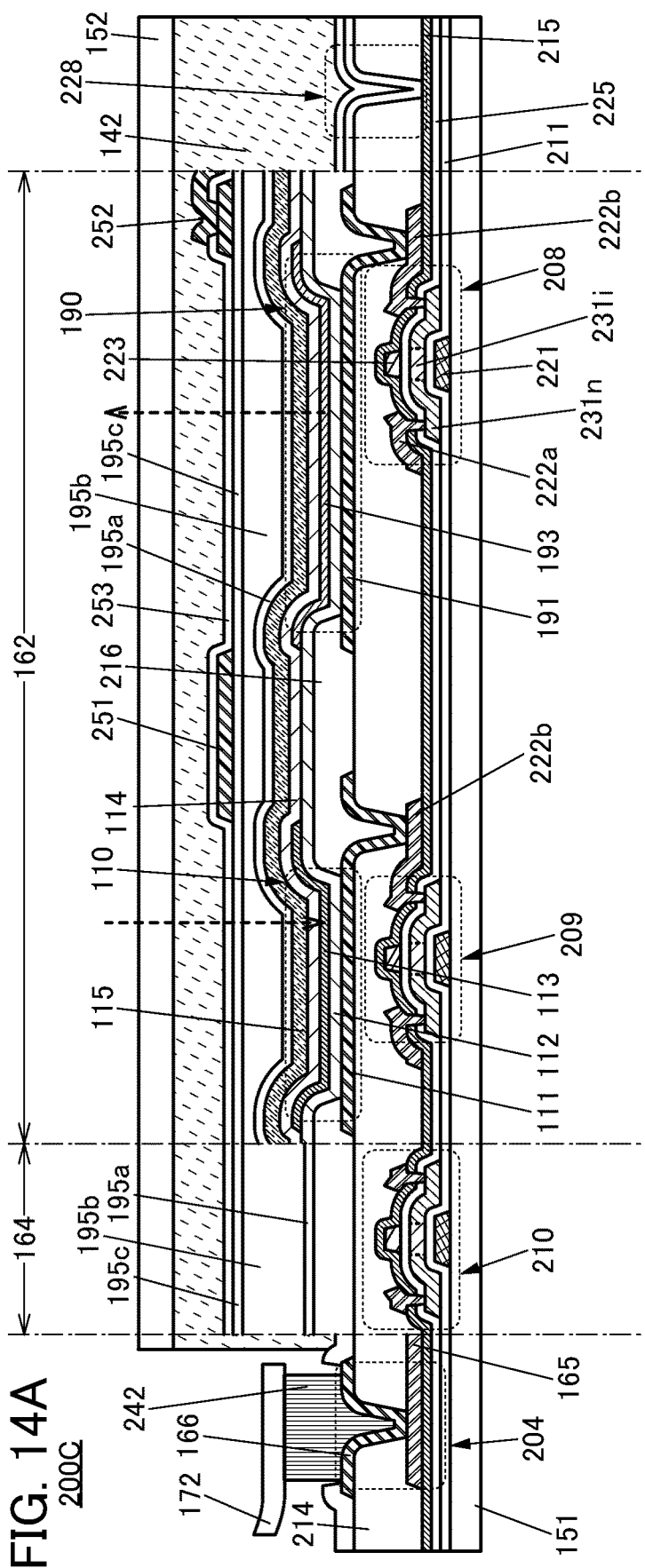
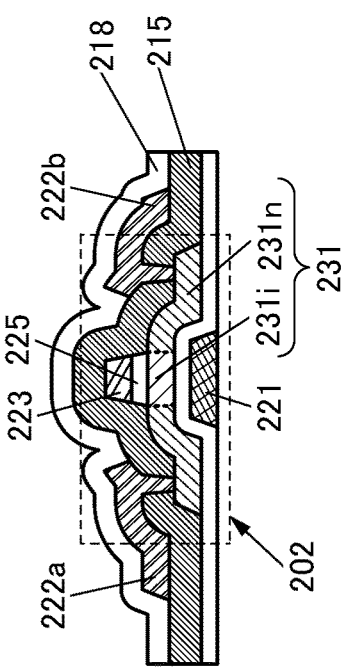

DISPLAY DEVICE, AUTHENTICATION METHOD, AND PROGRAM

BACKGROUND OF THE INVENTION

1. Field of the Invention

One embodiment of the present invention relates to a display device. One embodiment of the present invention relates to an imaging device. One embodiment of the present invention relates to a touch panel. One embodiment of the present invention relates to an authentication method for an electronic device.

Note that one embodiment of the present invention is not limited to the above technical field. Examples of the technical field of one embodiment of the present invention disclosed in this specification and the like include a semiconductor device, a display device, a light-emitting apparatus, a power storage device, a memory device, an electronic device, a lighting device, an input device, an input/output device, a driving method thereof, and a manufacturing method thereof. A semiconductor device generally means a device that can function by utilizing semiconductor characteristics.

2. Description of the Related Art

In recent years, information terminal devices, for example, mobile phones such as smartphones, tablet information terminals, and notebook personal computers (PC) have been widely used. Such information terminal devices often include personal information or the like, and thus various authentication technologies for preventing unauthorized use have been developed.

For example, Patent Document 1 discloses an electronic device including a fingerprint sensor in a push button switch portion.

REFERENCE

[Patent Document 1] United States Patent Application Publication No. 2014/0056493

SUMMARY OF THE INVENTION

In the case where an authentication function such as a fingerprint authentication function is added to an electronic device functioning as an information terminal device, the electronic device necessarily includes a module for taking an image of a fingerprint. Therefore, as the number of components increases, the cost of the electronic device increases.

An object of one embodiment of the present invention is to reduce the cost of an electronic device having an authentication function. Another object is to reduce the number of components of an electronic device. Another object is to provide a display device capable of taking an image of a fingerprint or the like. Another object is to provide a display device having both a touch detection function and a fingerprint imaging function. Another object is to provide an electronic device with a high screen occupancy rate, which has a fingerprint authentication function.

An object of one embodiment of the present invention is to provide an authentication method with a high security level. Another object is to provide a user-friendly authentication method. An object of one embodiment of the present invention is to provide a novel display device, electronic device, authentication method, or program.

Note that the description of these objects does not preclude the existence of other objects. One embodiment of the present invention does not have to achieve all these objects. Note that other objects can be derived from the description of the specification, the drawings, the claims, and the like.

One embodiment of the present invention is a display device including a light-emitting element, a light-receiving element, a first conductive layer, a second conductive layer, and an insulating layer. The light-emitting element includes a first pixel electrode, a light-emitting layer, and a common electrode. The light-receiving element includes a second pixel electrode, an active layer, and the common electrode. The first pixel electrode and the second pixel electrode are provided on the same plane. The common electrode includes a portion overlapping with the first pixel electrode with the light-emitting layer therebetween, and a portion overlapping with the second pixel electrode with the active layer therebetween. The first conductive layer, the second conductive layer, and the insulating layer are provided above the common electrode. The insulating layer is provided above the first conductive layer, and the second conductive layer is provided above the insulating layer. The light-receiving element has a function of receiving light emitted from the light-emitting element.

Another embodiment of the present invention is a display device including a light-emitting element, a light-receiving element, a first conductive layer, a second conductive layer, an insulating layer, and a protective layer. The light-emitting element includes a first pixel electrode, a light-emitting layer, and a common electrode. The light-receiving element includes a second pixel electrode, an active layer, and the common electrode. The first pixel electrode and the second pixel electrode are provided on the same plane. The common electrode includes a portion overlapping with the first pixel electrode with the light-emitting layer therebetween, and a portion overlapping with the second pixel electrode with the active layer therebetween. The protective layer is provided above the common electrode. The first conductive layer is provided above the protective layer. The insulating layer is provided above the first conductive layer and the protective layer. The second conductive layer is provided above the insulating layer. The light-receiving element has a function of receiving light emitted from the light-emitting element.

In the above, the first conductive layer preferably includes a plurality of openings. Here, the light-emitting element preferably overlaps with one of the openings of the first conductive layer, and the light-receiving element preferably overlaps with another one of the openings of the first conductive layer.

In the above, a common layer is preferably included. Here, the common layer preferably includes a portion between the first pixel electrode and the common electrode, and a portion between the second pixel electrode and the common electrode. The light-emitting layer and the active layer preferably include different organic compounds.

Another embodiment of the present invention is an authentication method for an electronic device including a display portion including display elements and light-receiving elements arranged in a matrix, a touch sensor for detecting a touch on the display portion, and an authentication portion, including the following steps: a step of obtaining positional data of a finger touching the display portion by the touch sensor; a step of turning on the display element in a first region including a position touched by the finger in the display portion; a step of taking an image of the first region by the light-receiving element and obtaining fingerprint data; and a step of performing user authentication processing using the fingerprint data by the authentication portion.

Another embodiment of the present invention is an authentication method for an electronic device including a display portion including display elements and light-receiving elements arranged in a matrix, a touch sensor for detecting a touch on the display portion, and an authentication portion, including the following steps: a step of displaying an image showing a position to be touched to a user on the display portion; a step of detecting a touch on the position to be touched by the touch sensor; a step of turning on the display element in a first region including the position to be touched in the display portion; a step of taking an image of the first region by the light-receiving element and obtaining fingerprint data; and a step of performing user authentication processing using the fingerprint data by the authentication portion.

Another embodiment of the present invention is a program executed by an electronic device including a display portion including display elements and light-receiving elements arranged in a matrix, a touch sensor for detecting a touch on the display portion, and an authentication portion, including the following steps: a step of obtaining positional data of a finger touching the display portion by the touch sensor; a step of turning on the display element in a first region including a position touched by the finger in the display portion; a step of taking an image of the first region by the light-receiving element and obtaining fingerprint data; and a step of performing user authentication processing using the fingerprint data by the authentication portion.

Another embodiment of the present invention is a program executed by an electronic device including a display portion including display elements and light-receiving elements arranged in a matrix, a touch sensor for detecting a touch on the display portion, and an authentication portion, including the following steps: a step of displaying an image showing a position to be touched to a user on the display portion; a step of detecting a touch on the position to be touched by the touch sensor; a step of turning on the display element in a first region including the position to be touched in the display portion; a step of taking an image of the first region by the light-receiving element and obtaining fingerprint data; and a step of performing user authentication processing using the fingerprint data by the authentication portion.

According to one embodiment of the present invention, the cost of an electronic device having an authentication function can be reduced. The number of components of an electronic device can be reduced. A display device capable of taking an image of a fingerprint or the like can be provided. A display device having both a touch detection function and a fingerprint imaging function can be provided. An electronic device with a high screen occupancy rate, which has a fingerprint authentication function, can be provided.

Moreover, according to one embodiment of the present invention, an authentication method with a high security level can be provided. A user-friendly authentication method can be provided. According to one embodiment of the present invention, a novel display device, electronic device, authentication method, or program can be provided.

Note that the description of these effects does not preclude the existence of other effects. One embodiment of the present invention does not necessarily have all these effects.

Note that other effects can be derived from the description of the specification, the drawings, the claims, and the like.

BRIEF DESCRIPTION OF THE DRAWINGS

In the accompanying drawings:

FIGS. 1A to 1C illustrate a structure example of a display device;

FIGS. 13A and 13B illustrate structure examples of a display device;

FIGS. 14A and 14B illustrate structure examples of a display device;

DETAILED DESCRIPTION OF THE INVENTION

Figure 2A:
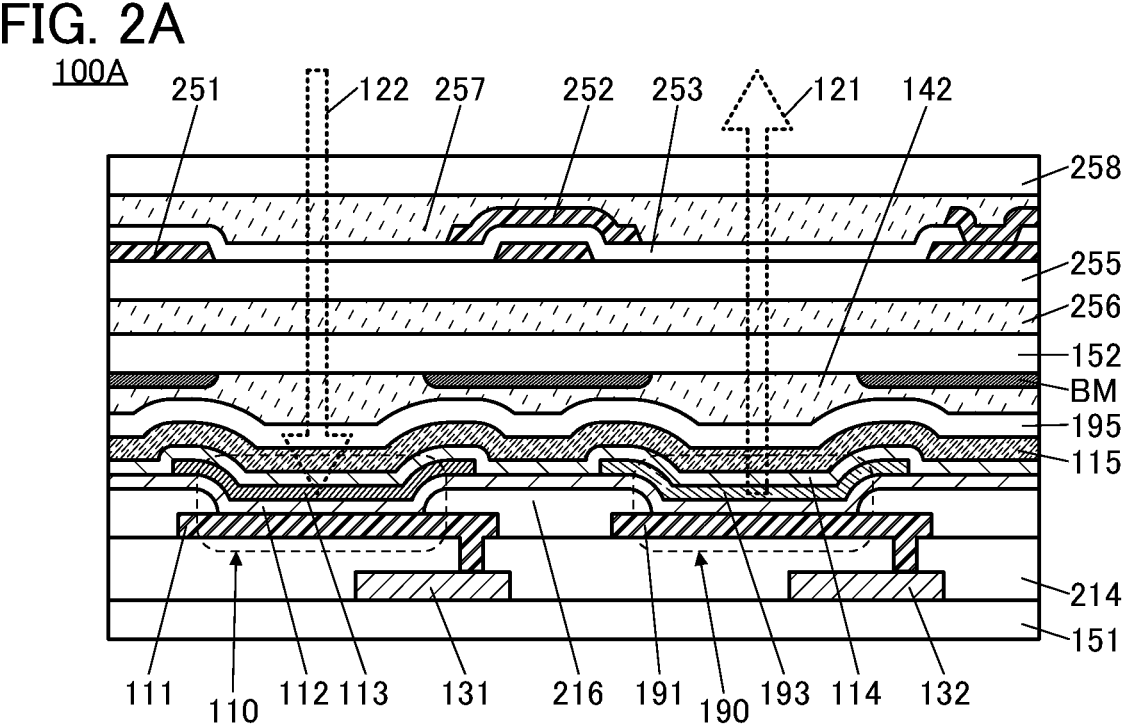
FIGS. 2A and 2B illustrate structure examples of display devices.

Hereinafter, embodiments will be described with reference to drawings. Note that embodiments can be implemented in many different modes, and it will be readily understood by those skilled in the art that modes and details thereof can be changed in various ways without departing from the spirit and scope of the present invention. Thus, the present invention should not be interpreted as being limited to the following description of the embodiments.

Note that in structures of the present invention described below, the same portions or portions having similar functions are denoted by the same reference numerals in different drawings, and the description thereof is not repeated. The same hatching pattern is used for portions having similar functions, and the portions are not denoted by specific reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first" and "second" are used in order to avoid confusion among components and do not limit the number.

Note that the expressions indicating directions such as "over" and "under" are basically used to correspond to the directions of drawings. However, in some cases, the term "over" or "under" in the specification indicates a direction that does not correspond to the apparent direction in the drawings, for the purpose of easy description or the like. For example, when a stacked order (formation order) of a stacked body or the like is described, even in the case where a surface on which the stacked body is provided (e.g., a formation surface, a support surface, a bonding surface, or a planarization surface) is positioned above the stacked body in the drawings, the direction and the opposite direction are referred to as "under" and "over", respectively, in some cases.

In this specification and the like, a display panel that is one embodiment of the display device has a function of displaying (outputting) an image or the like on (to) a display surface. Thus, the display panel is one embodiment of an output device.

In this specification and the like, a structure in which a connector such as a flexible printed circuit (FPC) or a tape carrier package (TCP) is attached to a substrate of a display panel, or a structure in which an IC is mounted on a substrate by a chip on glass (COG) method or the like is referred to as a display panel module or a display module, or simply referred to as a display panel or the like in some cases.

Note that in this specification and the like, a touch panel that is one embodiment of the display device has a function of displaying an image or the like on a display surface and a function of a touch sensor capable of detecting contact, press, approach, or the like of an object to be sensed such as a finger or a stylus with, on, or to the display surface. Therefore, the touch panel is one embodiment of an input/output device.

A touch panel can be referred to as, for example, a display panel (or a display device) with a touch sensor or a display panel (or a display device) having a touch sensor function. A touch panel can include a display panel and a touch sensor panel. Alternatively, a touch panel can have a function of a touch sensor inside a display panel or on a surface of the display panel.

In this specification and the like, a structure in which a connector or an IC is attached to a substrate of a touch panel is referred to as a touch panel module or a display module, or simply referred to as a touch panel or the like in some cases.

Embodiment 1

In this embodiment, a display device of one embodiment of the present invention and an electronic device including the display device will be described.

A display device of one embodiment of the present invention includes a plurality of display elements, a plurality of light-receiving elements (also referred to as light-receiving devices), and a touch sensor. The display element is preferably a light-emitting element (also referred to as a light-emitting device). The light-receiving element is preferably a photoelectric conversion element. In the following description, a light-emitting element is used as the display element.

The display device has a function of displaying an image on the display surface side by the display elements arranged in a matrix.

The display device can take an image of an object that touches or approaches a display surface. Part of light emitted from the light-emitting element is reflected by the object and reflected light enters the light-receiving element, for example. The light-receiving element can output an electric signal in accordance with the intensity of incident light. Thus, the display device including the plurality of light-receiving elements arranged in a matrix can obtain the positional data or shape of the object as data (this process is also referred to as imaging). That is, the display device can function as an image sensor panel or the like. In particular, the display device can take an image of a fingerprint of a fingertip that touches the display surface.

The display device includes the touch sensor that obtains the positional data of an object that touches or approaches the display surface. A touch sensor of any of various types such as a resistive type, a capacitive type, an infrared ray type, an electromagnetic induction type, and a surface acoustic wave type can be used. As the touch sensor, a capacitive touch sensor is particularly preferable.

Examples of the capacitive touch sensor include a surface capacitive touch sensor and a projected capacitive touch sensor. Examples of the projected capacitive touch sensor include a self-capacitive touch sensor and a mutual capacitive touch sensor. The use of a mutual capacitive touch sensor is preferred because multiple points can be sensed simultaneously.

A mutual capacitive touch sensor can include a plurality of electrodes to which pulse potentials are supplied and a plurality of electrodes to which a sensor circuit is connected. The touch sensor can sense the approach of a finger or the like using a change in capacitance between the electrodes. The electrodes included in the touch sensor are preferably positioned closer to the display surface side than the light-emitting element and the light-receiving element.

In the case where a light-emitting element is used as the display element, an EL element such as an organic light-emitting diode (OLED) and a quantum-dot light-emitting diode (QLED) is preferably used. As a light-emitting substance included in the EL element, a substance emitting fluorescence (a fluorescent material), a substance emitting phosphorescence (a phosphorescent material), a substance exhibiting thermally activated delayed fluorescence (a thermally activated delayed fluorescent (TADF) material), an inorganic compound (e.g., a quantum dot material), or the like can be used. Alternatively, a light-emitting diode (LED) such as a micro-LED can be used as the light-emitting element.

As the light-receiving element, a PN photodiode or a PIN photodiode can be used, for example. The light-receiving element functions as a photoelectric conversion element that detects light incident on the light-receiving element and generates charge. The amount of generated charge in the photoelectric conversion element is determined depending on the amount of incident light. It is particularly preferable to use an organic photodiode including a layer containing an organic compound as the light-receiving element. An organic photodiode, which is easily made thin, lightweight, and large in area and has a high degree of freedom for shape and design, can be used in a variety of display devices.

The light-emitting element can have a stacked-layer structure including a light-emitting layer between a pair of electrodes, for example. The light-receiving element can have a stacked-layer structure including an active layer between a pair of electrodes. A semiconductor material can be used for the active layer of the light-receiving element. For example, an organic semiconductor material containing an organic compound or an inorganic semiconductor material such as silicon can be used.

It is particularly preferable to use an organic compound for the active layer of the light-receiving element. In that case, one electrode of the light-emitting element and one electrode of the light-receiving element (the electrodes are also referred to as pixel electrodes) are preferably provided on the same plane. It is further preferable that the other electrode of the light-emitting element and the other electrode of the light-receiving element be an electrode (also referred to as a common electrode) formed using one continuous conductive layer. Furthermore, it is still further preferable that the light-emitting element and the light-receiving element include a common layer. Thus, some manufacturing steps can be common between the light-emitting element and the light-receiving element and thus the manufacturing process can be simplified, so that the manufacturing cost can be reduced and the manufacturing yield can be increased.

The conductive layer functioning as the electrode of the touch sensor is preferably formed using a metal or an alloy material. In this case, the conductive layer preferably includes an opening through which light is emitted from the light-emitting element and an opening through which light is received by the light-receiving element. For example, the conductive layer preferably has a top surface having a plurality of openings, further preferably a lattice-shaped top surface so that one of the openings of the conductive layer overlaps with the light-emitting element and another one of the openings overlaps with the light-receiving element. Such a structure enables application of a low-resistance material such as a metal or an alloy material to the conductive layer without decreasing the light emission area of the light-emitting element and the light receiving area of the light-receiving element. Accordingly, a display device capable of high quality display, high quality imaging, and highly sensitive touch sensing can be obtained.

Note that a light-transmitting electrode that transmits light emitted from the light-emitting element can be used as the electrode of the touch sensor. In that case, the light-transmitting electrode can be provided to overlap with the light-emitting element and the light-receiving element.

The light-emitting element and the light-receiving element can be provided between a pair of substrates. As the substrate, a rigid substrate such as a glass substrate or a flexible film may be used. Here, the electrode of the touch sensor can be formed over the substrate on the display surface side. Alternatively, the electrode of the touch sensor may be formed over another substrate and bonded to the display surface side.

It is preferable that the electrode of the touch sensor be positioned between the pair of substrates. In that case, a protective layer that covers the light-emitting element and the light-receiving element can be provided, and the electrode of the touch sensor can be provided over the protective layer. Thus, the number of components can be reduced, whereby the manufacturing process can be simplified. In addition, such a structure is particularly suitable for the display device that is used as a flexible display using a flexible film as a substrate because the display device can be thin.

The display device of one embodiment of the present invention has a function of taking an image of a fingerprint for fingerprint authentication or the like and thus does not need an imaging module, leading to a reduction in the number of components of an electronic device. In addition, the display device can take an image of a fingerprint when a finger touches the display portion and thus does not need a fingerprint imaging portion in part of a housing of an electronic device, leading to an increase in the screen occupancy rate of the electronic device (the proportion of the screen area to the surface area of the electronic device). Therefore, the screen size can be easily increased without increasing the housing size.

More specific structure examples are described below with reference to drawings.

Structure Example 1 of Display Device

FIG. 1A illustrates a structure example of a display device 10. The display device 10 includes a substrate 11, a substrate 12, a light-emitting element 21R, a light-emitting element 21B, a light-emitting element 21G, a light-receiving element 22, a functional layer 15, a conductive layer 31, a conductive layer 32, and the like.

The light-emitting elements 21R, 21B, and 21G and the light-receiving element 22 are provided between the substrates 11 and 12. The conductive layers 31 and 32 are provided over the light-emitting elements 21R, 21B, and 21G and the light-receiving element 22.

The light-emitting elements 21R, 21B, and 21G emit red (R) light, green (G) light, and blue (B) light, respectively.

The display device 10 includes a plurality of pixels arranged in a matrix. One pixel includes at least one subpixel. One subpixel includes one light-emitting element. For example, one pixel can include three subpixels (e.g., three colors of R, G, and B or three colors of yellow (Y), cyan (C), and magenta (M)) or four subpixels (e.g., four colors of R, G, B, and white (W) or four colors of R, G, B, and Y). The pixel further includes the light-receiving element 22. The light-receiving element 22 may be provided in all the pixels or in some of the pixels. In addition, one pixel may include a plurality of light-receiving elements 22.

The conductive layers 31 and 32 serve as electrodes of a touch sensor. In the case of using a mutual capacitive touch sensor, a pulse potential is supplied to one of the conductive layers 31 and 32, and an analog-digital (A/D) conversion circuit, a sensor circuit such as a sense amplifier, or the like is connected to the other of the conductive layers 31 and 32.

In FIG. 1A, the conductive layers 31 and 32 are provided between the substrates 11 and 12 and provided closer to the substrate 12 side than the light-emitting elements 21R, 21B, and 21G and the light-receiving element 22. FIG. 1A illustrates an example in which light emitted from each of the light-emitting elements 21R and 21B and light emitted from the light-emitting element 21G are emitted to the outside through the conductive layer 31 and the conductive layer 32, respectively. In this case, a light-transmitting conductive material such as a conductive metal oxide is preferably used for the conductive layers 31 and 32.

FIG. 1B illustrates a state where a finger 60 approaches a surface of the substrate 12. Capacitance 35 is formed between the conductive layers 31 and 32. When the finger 60 or the like approaches the substrate 12, the capacitance 35 changes (specifically, the capacitance is reduced). When a pulse potential is supplied to one of the conductive layers 31 and 32, the change in the capacitance appears as a change in the amplitude of a signal that occurs in the other of the conductive layers 31 and 32. Accordingly, the touch and approach of the finger 60 or the like can be sensed.

FIG. 1C shows a state where the finger 60 touches the surface of the substrate 12. Part of light emitted from the light-emitting element 21G is reflected or scattered in a contact portion of the substrate 12 and the finger 60. In the case where light 36, which is part of reflected light or scattered light, enters the light-receiving element 22, an image of a contact surface of the finger 60 can be taken.

On a surface of the finger 60, a fingerprint is formed of depressions and projections. Thus, when the finger 60 touches the substrate 12, the projections of the fingerprint touch the substrate 12, and light is reflected or scattered on contact surfaces thereof. Light is also reflected or scattered on the depressions of the fingerprint, but the depressions do not touch the substrate 12; thus, the intensity of light reflected or scattered on the finger is lower than that in the case of the projections. This makes the contrasts of the projections and the depressions different, whereby a clear fingerprint image can be taken.

In the intensity distribution of the scattered light on the surface where the finger 60 touches the substrate 12, the intensity of light almost perpendicular to the contact surface is the highest, and the intensity of light becomes lower as an angle becomes larger in an oblique direction. Thus, the intensity of light received by the light-receiving element 22 positioned directly below the contact surface (i.e., positioned in a portion overlapping with the contact surface) is the highest. Scattered light at greater than or equal to a predetermined scattering angle is fully reflected in the other surface (a surface opposite to the contact surface) of the substrate 12 and does not pass through the light-receiving element 22. As a result, a clear fingerprint image can be taken.

The smaller an arrangement interval between the light-receiving elements 22 is, the higher the resolution of the image taken can be. In the case where an arrangement interval between the light-receiving elements 22 is smaller than a distance between two projections of the fingerprint, preferably a distance between a depression and a projection adjacent to each other, for example, a clear fingerprint image can be obtained. A distance between a depression and a projection of a human's fingerprint is approximately 200 μm; thus, the arrangement interval between the light-receiving elements 22 is, for example, less than or equal to 400 μm, preferably less than or equal to 200 μm, further preferably less than or equal to 150 μm, still further preferably less than or equal to 100 μm, even still further preferably less than or equal to 50 μm and greater than or equal to 1 μm, preferably greater than or equal to 10 μm, further preferably greater than or equal to 20 μm.

Note that the display device 10 can take an image of not only a fingerprint but also a variety of objects that touch the surface of the substrate 12. Thus, the display device 10 can also be used as an image sensor panel. A color image can be obtained in such a manner that, for example, the light-emitting elements 21R, 21B, and 21G emit light sequentially, the light-receiving element 22 takes an image each time, and obtained three images are synthesized. In other words, an electronic device including the display device 10 can also be used as an image scanner capable of color imaging.

The display device 10 can also function as a touch panel or a pen tablet with the use of the light-receiving element 22. With the use of the light-receiving element 22, unlike the case of using a capacitive touch sensor, an electromagnetic induction touch sensor, or the like, the display device 10 can detect even the position of a highly insulating object to be sensed, the material of an object to be sensed such as a stylus is not limited, and a variety of writing materials (e.g., a brush, a glass pen, a quill pen, and the like) can be used.

Although FIG. 1C illustrates an example in which light emitted from the light-emitting element 21G is used for taking an image of the finger 60, one embodiment of the present invention is not limited thereto; one or more of the light-emitting elements 21R, 21G, and 21B can be used as light sources for taking an image of the finger 60 or the like. As the light-receiving element 22, a photoelectric conversion element that receives light emitted from at least one of the light-emitting elements 21R, 21G, and 21B can be used. Specifically, a photoelectric conversion element that receives light in a wavelength range including a wavelength of light emitted from at least one of the light-emitting elements 21R, 21G, and 21B can be used as the light-receiving element 22.

Alternatively, a light-emitting element that emits infrared light may be provided in addition to the light-emitting elements 21R, 21G, and 21B, and a photoelectric conversion element that can receive the infrared light may be provided as the light-receiving element 22. Alternatively, a photoelectric conversion element that can receive visible light and a photoelectric conversion element that can receive infrared light may be provided. Since infrared light is invisible to humans, an image of a fingerprint or the like taken by using infrared light as a light source is not affected by a displayed image. Thus, a clear image can be obtained even when display and imaging are concurrently performed.

Structure Example 2 of Display Device

Hereinafter, a more specific structure example of the display device will be described.

Structure Example 2-1

FIG. 2A is a schematic cross-sectional view of a display device 100A.

The display device 100A includes a light-receiving element 110, a light-emitting element 190, a transistor 131, a transistor 132, and the like between a pair of substrates (a substrate 151 and a substrate 152). Moreover, the display device 100A includes a conductive layer 251, a conductive layer 252, and an insulating layer 253 between another pair of substrates (a substrate 255 and a substrate 258). The substrate 152 and the substrate 255 are bonded to each other with an adhesive layer 256.

The light-receiving element 110 includes a pixel electrode 111, a common layer 112, an active layer 113, a common layer 114, and a common electrode 115. The light-emitting element 190 includes a pixel electrode 191, the common layer 112, a light-emitting layer 193, the common layer 114, and the common electrode 115.

The pixel electrode 111, the pixel electrode 191, the common layer 112, the active layer 113, the light-emitting layer 193, the common layer 114, and the common electrode 115 may each have a single-layer structure or a stacked-layer structure.

The pixel electrode 111 and the pixel electrode 191 are positioned over an insulating layer 214. The pixel electrode 111 and the pixel electrode 191 can be formed using the same material in the same step. As the common layer 112, one or both of a hole-injection layer and a hole-transport layer can be formed, for example.

Note that a layer shared by the light-receiving element and the light-emitting element may have a different function depending on which element the layer is in. In this specification, the name of a component is based on its function in the light-emitting element. For example, a hole-injection layer functions as a hole-injection layer in the light-emitting element and functions as a hole-transport layer in the light-receiving element. Similarly, an electron-injection layer functions as an electron-injection layer in the light-emitting element and functions as an electron-transport layer in the light-receiving element. The hole-transport layer functions as a hole-transport layer in both the light-emitting element and the light-receiving element. Similarly, the electron-transport layer functions as an electron-transport layer in both the light-emitting element and the light-receiving element.

The common layer 112 is positioned over the pixel electrode 111 and the pixel electrode 191. The common layer 112 is shared by the light-receiving element 110 and the light-emitting element 190.

The active layer 113 overlaps with the pixel electrode 111 with the common layer 112 therebetween. The light-emitting layer 193 overlaps with the pixel electrode 191 with the common layer 112 therebetween. The active layer 113 contains a first organic compound, and the light-emitting layer 193 contains a second organic compound different from the first organic compound.

The common layer 114 is positioned over the common layer 112, the active layer 113, and the light-emitting layer 193. The common layer 114 is shared by the light-receiving element 110 and the light-emitting element 190. As the common layer 114, one or both of an electron-injection layer and an electron-transport layer can be formed, for example.

The common electrode 115 includes a portion overlapping with the pixel electrode 111 with the common layer 112, the active layer 113, and the common layer 114 therebetween. The common electrode 115 further includes a portion overlapping with the pixel electrode 191 with the common layer 112, the light-emitting layer 193, and the common layer 114 therebetween. The common electrode 115 is shared by the light-receiving element 110 and the light-emitting element 190.

In the display device of this embodiment, an organic compound is used for the active layer 113 of the light-receiving element 110. In the light-receiving element 110, the layers other than the active layer 113 can be common to the layers in the light-emitting element 190 (EL element). Therefore, the light-receiving element 110 can be formed concurrently with the formation of the light-emitting element 190 only by adding a step of forming the active layer 113 in the manufacturing process of the light-emitting element 190. The light-emitting element 190 and the light-receiving element 110 can be formed over one substrate. Accordingly, the light-receiving element 110 can be incorporated into the display device without a significant increase in the number of manufacturing steps.

The display device 100A shows an example in which the light-receiving element 110 and the light-emitting element 190 have a common structure except that the active layer 113 of the light-receiving element 110 and the light-emitting layer 193 of the light-emitting element 190 are separately formed. Note that the structures of the light-receiving element 110 and the light-emitting element 190 are not limited thereto. The light-receiving element 110 and the light-emitting element 190 may include a separately formed layer other than the active layer 113 and the light-emitting layer 193 (see display devices 100E, 100F, and 100G described later). The light-receiving element 110 and the light-emitting element 190 preferably include at least one layer used in common (common layer). Thus, the light-receiving element 110 can be incorporated into the display device without a significant increase in the number of manufacturing steps.

In the light-receiving element 110, the common layer 112, the active layer 113, and the common layer 114, which are positioned between the pixel electrode 111 and the common electrode 115, can each be referred to as an organic layer (a layer containing an organic compound). The pixel electrode 111 preferably has a function of reflecting visible light. An end portion of the pixel electrode 111 is covered with a partition 216. The common electrode 115 has a function of transmitting visible light.

The light-receiving element 110 has a function of detecting light. Specifically, the light-receiving element 110 receives light 122 incident from the outside through the substrate 152 and converts it into an electric signal.

A light-blocking layer BM is provided on a surface of the substrate 152 on the substrate 151 side. The light-blocking layer BM has an opening at the position overlapping with the light-receiving element 110 and an opening at the position overlapping with the light-emitting element 190. Providing the light-blocking layer BM can control the range where the light-receiving element 110 detects light.

For the light-blocking layer BM, a material that blocks light from the light-emitting element can be used. The light-blocking layer BM preferably absorbs visible light. As the light-blocking layer BM, a black matrix can be formed using a metal material or a resin material containing pigment (e.g., carbon black) or dye, for example. The light-blocking layer BM may have a stacked-layer structure including two or more of a red color filter, a green color filter, and a blue color filter.

Here, part of light emitted from the light-emitting element 190 is reflected in the display device 100A and enters the light-receiving element 110 in some cases. The light-blocking layer BM can reduce the influence of such stray light. For example, in the case where the light-blocking layer BM is not provided, light emitted from the light-emitting element 190 is reflected by the substrate 152 and reflected light enters the light-receiving element 110 in some cases. Providing the light-blocking layer BM can inhibit entry of the reflected light into the light-receiving element 110. Hence, noise can be reduced, and the sensitivity of the sensor using the light-receiving element 110 can be increased.

In the light-emitting element 190, the common layer 112, the light-emitting layer 193, and the common layer 114, which are positioned between the pixel electrode 191 and the common electrode 115, can be collectively referred to as an EL layer. The pixel electrode 191 preferably has a function of reflecting visible light. An end portion of the pixel electrode 191 is covered with the partition 216. The pixel electrode 111 and the pixel electrode 191 are electrically isolated from each other by the partition 216. The common electrode 115 has a function of transmitting visible light.

The light-emitting element 190 has a function of emitting visible light. Specifically, the light-emitting element 190 is an electroluminescent element that emits light 121 toward the substrate 152 when voltage is applied between the pixel electrode 191 and the common electrode 115.

It is preferable that the light-emitting layer 193 be formed not to overlap with a light-receiving region of the light-receiving element 110. Accordingly, it is possible to prevent the light-emitting layer 193 from absorbing the light 122, thereby increasing the amount of light with which the light-receiving element 110 is irradiated.

The pixel electrode 111 is electrically connected to a source or a drain of the transistor 131 through an opening provided in the insulating layer 214.

The pixel electrode 191 is electrically connected to a source or a drain of the transistor 132 through an opening provided in the insulating layer 214. The transistor 132 has a function of controlling the driving of the light-emitting element 190.

The transistor 131 and the transistor 132 are on and in contact with the same layer (the substrate 151 in FIG. 2A).

At least part of a circuit electrically connected to the light-receiving element 110 is preferably formed using the same material in the same steps as a circuit electrically connected to the light-emitting element 190. Thus, the thickness of the display device can be reduced and the manufacturing process can be simplified, compared to the case where the two circuits are separately formed.

Here, it is preferable that the common electrode 115 shared by the light-emitting element 190 and the light-receiving element 110 be electrically connected to a wiring to which a first potential is supplied. As the first potential, a fixed potential such as a common potential, a ground potential, or a reference potential can be used. Note that the first potential supplied to the common electrode 115 is not limited to a fixed potential, and two or more different potentials can be selected to be supplied.

When the light-receiving element 110 receives light and converts the light into an electric signal, the pixel electrode 111 is preferably supplied with a second potential lower than the first potential supplied to the common electrode 115. As the second potential, a potential with which light-reception sensitivity or the like is optimized can be selected to be supplied in accordance with the structure, the optical characteristics, the electrical characteristics, or the like of the light-receiving element 110. That is, in the case where the light-receiving element 110 is regarded as a photodiode, the first potential supplied to the common electrode 115 functioning as a cathode and the second potential supplied to the pixel electrode 191 functioning as an anode can be selected so that reverse bias voltage is applied. When the light-receiving element 110 is not driven, a potential at the same or substantially the same level as the first potential or a potential higher than the first potential may be supplied to the pixel electrode 111.

In contrast, when the light-emitting element 190 is made to emit light, the pixel electrode 191 is preferably supplied with a third potential higher than the first potential supplied to the common electrode 115. As the third potential, a potential with which required emission luminance is achieved can be selected to be supplied in accordance with the structure, the threshold voltage, the current-luminance characteristics, or the like of the light-emitting element 190. That is, in the case where the light-emitting element 190 is regarded as a light-emitting diode, the first potential supplied to the common electrode 115 functioning as a cathode and the third potential supplied to the pixel electrode 191 functioning as an anode can be selected so that forward bias voltage is applied. When the light-emitting element 190 is not made to emit light, a potential at the same or substantially the same level as the first potential or a potential lower than the first potential may be supplied to the pixel electrode 191.

Here, the case where the common electrode 115 functions as a cathode and the pixel electrodes each function as an anode in the light-receiving element 110 and the light-emitting element 190 is described as an example, but one embodiment of the present invention is not limited thereto; the common electrode 115 may function as an anode and the pixel electrodes may each function as a cathode. In such a case, a potential higher than the first potential is supplied as the second potential to drive the light-receiving element 110, and a potential lower than the first potential is supplied as the third potential to drive the light-emitting element 190.

The light-receiving element 110 and the light-emitting element 190 are preferably covered with a protective layer 195. In FIG. 2A, the protective layer 195 is provided on and in contact with the common electrode 115. Providing the protective layer 195 can inhibit entry of impurities such as water into the light-receiving element 110 and the light-emitting element 190, thereby increasing the reliability of the light-receiving element 110 and the light-emitting element 190. The protective layer 195 and the substrate 152 are bonded to each other with an adhesive layer 142.

The conductive layer 251 is provided over the substrate 255. The insulating layer 253 is provided to cover the conductive layer 251 and the substrate 255. The conductive layer 252 is provided over the insulating layer 253. The substrate 255 and the substrate 258 are bonded to each other with the adhesive layer 257.

One or both of the conductive layers 251 and 252 function as an electrode/electrodes of a touch sensor. Here, an example is shown in which the conductive layers 251 and 252, which are formed with the insulating layer 253 therebetween, form a touch sensor.

FIG. 2A also illustrates a portion where the conductive layers 251 and 252 overlap with each other. The portion can be a portion where the conductive layers 251 and 252 intersect with each other, for example. A structure of a connection portion where the conductive layers 251 and 252 are electrically connected to each other is also illustrated. In the connection portion, the conductive layers 251 and 252 are electrically connected to each other through an opening provided in the insulating layer 253. The connection portion can be a portion where two island-shaped conductive layers 251 are electrically connected to each other through the conductive layer 252.

In FIG. 2A, the conductive layers 251 and 252 are provided so as to avoid a light-emitting region of the light-emitting element 190 and the light-receiving region of the light-receiving element 110. In other words, the conductive layers 251 and 252 are provided between two adjacent light-emitting elements 190 or between the light-emitting element 190 and the light-receiving element 110 in a plan view. Moreover, in FIG. 2A, the conductive layers 251 and 252 are each provided in a position overlapping with the light-blocking layer BM. Thus, a low-resistance conductive material such as a metal or an alloy can be used for the conductive layers 251 and 252 instead of a conductive material having a light-transmitting property, so that the sensitivity of the touch sensor can be increased.

Although FIG. 2A illustrates an example in which the conductive layer 251, the insulating layer 253, and the conductive layer 252 are sequentially formed on a surface of the substrate 255 on the substrate 258 side, one embodiment of the present invention is not limited thereto. For example, a structure in which the conductive layer 251 is formed on one surface side of the substrate 255, the conductive layer 252 is formed on the other surface side of the substrate 255, and the insulating layer 253 is not provided may be employed.

In the case where a conductive material such as a metal or an alloy is used for the conductive layers 251 and 252, reflection of external light due to the conductive layers 251 and 252 might be recognized from the display surface side (the substrate 258 side in FIG. 2A). Therefore, a circular polarizing plate (not illustrated) is preferably provided over the substrate 258 to suppress reflection of external light.

Structure Example 2-2

Figure 2B:
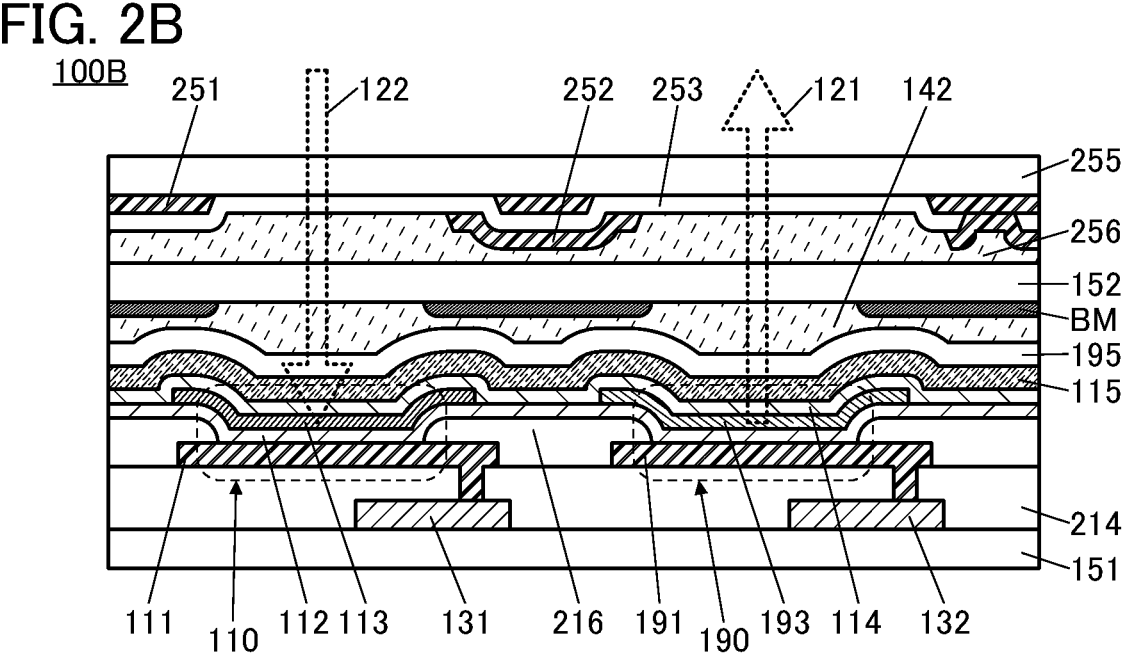

FIG. 2B is a schematic cross-sectional view of a display device 100B. The display device 100B is different from the display device 100A mainly in that the substrate 258 is not included and the direction of the substrate 255 is different from that of the display device 100A.

The conductive layer 251, the conductive layer 252, and the insulating layer 253 are provided on a surface of the substrate 255 on the substrate 152 side. The substrate 255 and the substrate 152 are bonded to each other with the adhesive layer 256.

Since the display device 100B does not include the substrate 258 and the adhesive layer 257, not only the manufacturing cost but also the thickness can be reduced compared to the display device 100A.

Structure Example 2-3

Figure 3A:
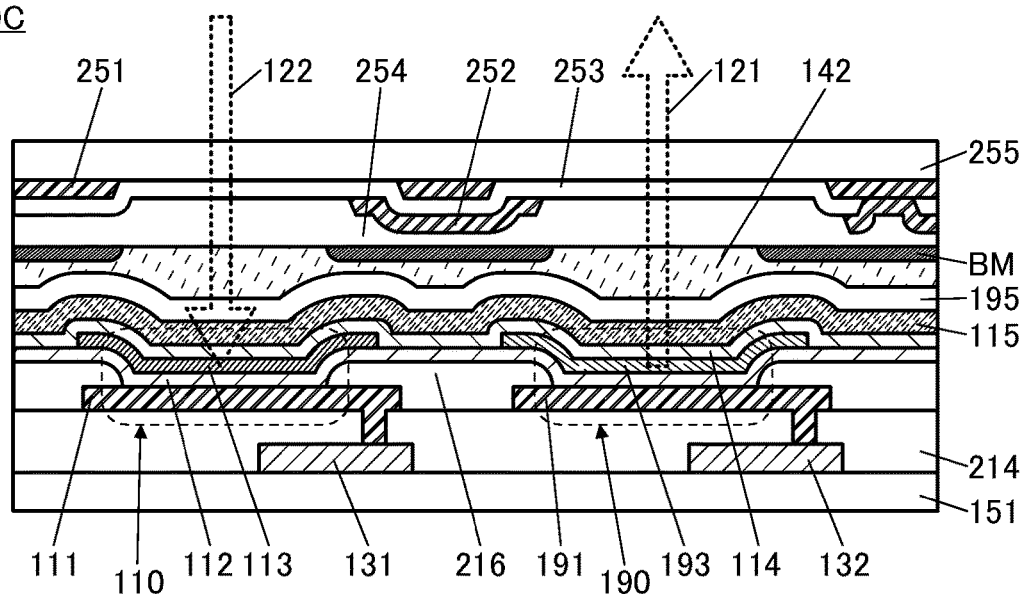
FIGS. 3A and 3B illustrate structure examples of display devices.

FIG. 3A is a schematic cross-sectional view of a display device 100C. The display device 100C is different from the display device 100B mainly in that the substrate 152 is not included.

The conductive layer 251, the conductive layer 252, and the insulating layer 253 are provided on a surface of the substrate 255 on the substrate 151 side. An insulating layer 254 is provided to cover the conductive layer 251, the conductive layer 252, and the insulating layer 253, and the light-blocking layer BM is provided on a surface of the insulating layer 254 on the substrate 151 side. The substrate 255 and the substrate 151 are bonded to each other with the adhesive layer 142.

With such a structure, the light-receiving element 110, the light-emitting element 190, the transistor 131, the transistor 132, and the conductive layers 251 and 252 included in the touch sensor can be provided between a pair of substrates (here, the substrates 151 and 255). Accordingly, a display device thinner than the display devices 100A and 100B can be achieved.

Structure Example 2-4

Figure 3B:
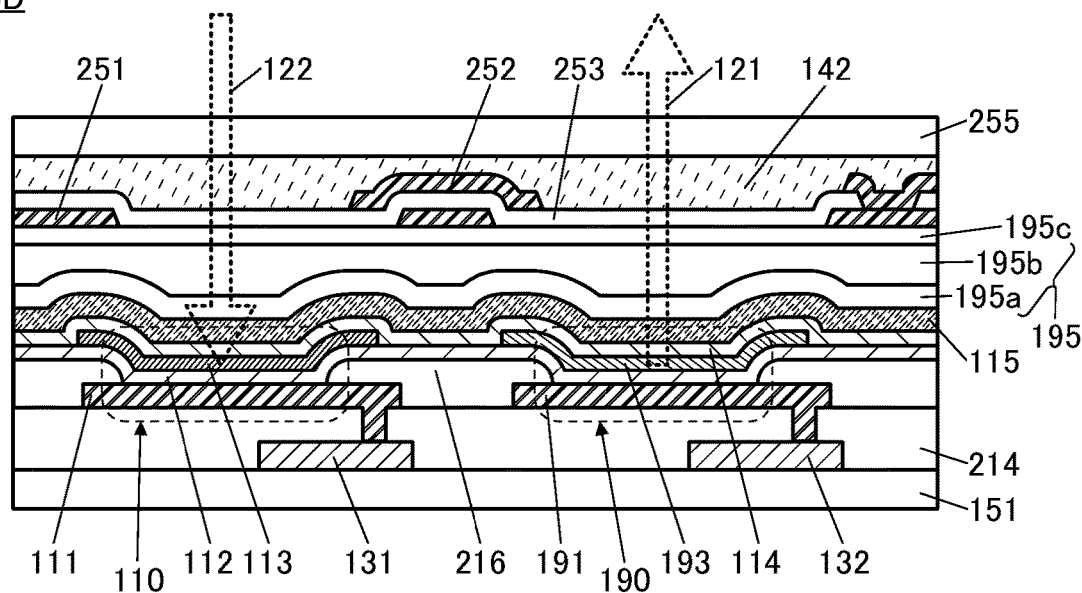

FIG. 3B is a schematic cross-sectional view of a display device 100D. The display device 100D is different from the display device 100A and the like mainly in that the conductive layer 251 and the like are provided over a top surface of the protective layer 195.

In the display device 100D, the protective layer 195 has a stacked-layer structure in which an inorganic insulating layer 195a, an organic insulating layer 195b, and an inorganic insulating layer 195c are stacked in this order from the substrate 151 side.

The conductive layer 251 is provided over the inorganic insulating layer 195c. The insulating layer 253 covers the conductive layer 251 and the inorganic insulating layer 195c. The conductive layer 252 is provided over the insulating layer 253. The substrate 255 and the substrate 151 are bonded to each other with the adhesive layer 142.

The inorganic insulating layer 195a functions as a protective film for preventing impurities such as water from diffusing into the light-receiving element 110 and the light-emitting element 190. The organic insulating layer 195b functions as a planarization film. The inorganic insulating layer 195c has a function of a protective film like the inorganic insulating layer 195a, and the conductive layer 251 is formed thereover.

Each of the inorganic insulating layers 195a and 195c preferably contains an inorganic insulating material. Examples of the inorganic insulating material include an oxide and a nitride such as silicon oxide, silicon oxynitride, silicon nitride oxide, silicon nitride, aluminum oxide, aluminum oxynitride, and hafnium oxide.

The organic insulating layer 195b preferably contains an organic insulating material. Examples of the organic insulating material include an acrylic resin, a polyimide resin, an epoxy resin, a polyamide resin, a polyimide-amide resin, a siloxane resin, a benzocyclobutene-based resin, a phenol resin, and precursors of these resins.

In the protective layer 195 having such a stacked-layer structure, even when the inorganic insulating layer 195a includes a defect such as a pinhole, for example, the organic insulating layer 195b with high step coverage can fill the defect. Moreover, the inorganic insulating layer 195c that is formed over a flat top surface of the organic insulating layer 195b has few defects. Furthermore, when a film containing an inorganic insulating material is used as the inorganic insulating layer 195c, the inorganic insulating layer 195c functions as an etching stopper when the conductive layer 251 is processed (etched), which prevents the organic insulating layer 195b from being etched.

The conductive layers 251 and 252 included in the touch sensor are formed directly over the protective layer 195, whereby the display device 100D can be extremely thin. Since the conductive layers 251 and 252 of the display device 100D are not provided on the substrate 255 side, bonding of the substrate 255 and substrate 151 does not need high accuracy, which leads to an improvement in the manufacturing yield. The substrate 255 needs at least a light-transmitting property, that is, the degree of freedom in selecting materials is extremely high compared to the display device 100A and the like.

FIG. 3B illustrates an example in which the light-blocking layer BM is not provided. When the light-blocking layer BM is not provided, the area of the light-emitting region of the light-emitting element 190 and the area of the light-receiving region of the light-receiving element 110 can be large, so that a brighter image can be displayed and imaging with higher sensitivity can be performed. Moreover, alignment between the substrates 255 and 151 becomes extremely easy, so that the manufacturing yield can be improved.

Modification Example 1

Although the light-emitting element and the light-receiving element include two common layers in the above example, one embodiment of the present invention is not limited thereto. Examples in which common layers have different structures are described below.

Note that a display device 100E, a display device 100F, and a display device 100G described below are examples in which the structures of the light-receiving element 110 and the light-emitting element 190 are different from those of the display device 100D. Needless to say, the structures of the light-receiving element 110 and the light-emitting element 190 described below as examples can be applied to the display devices 100A, 100B, 100C, and the like.

Figure 4A:
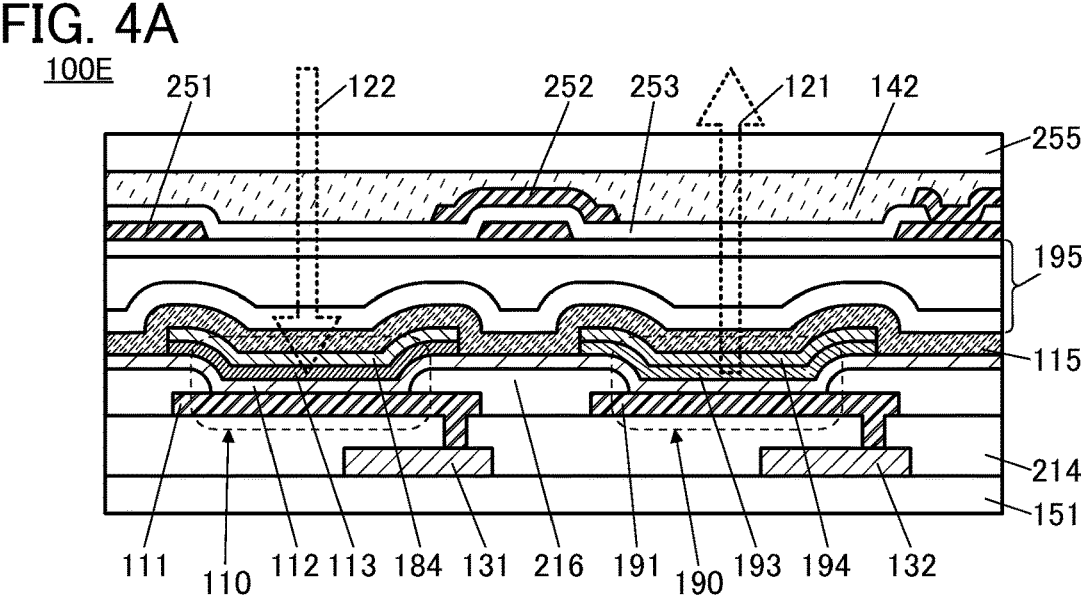
FIGS. 4A to 4C illustrate structure examples of display devices.

FIG. 4A is a schematic cross-sectional view of the display device 100E. The display device 100E is different from the display device 100D mainly in that the common layer 114 is not included and a buffer layer 184 and a buffer layer 194 are included. The buffer layer 184 and the buffer layer 194 may each have a single-layer structure or a stacked-layer structure.

In the display device 100E, the light-receiving element 110 includes the pixel electrode 111, the common layer 112, the active layer 113, the buffer layer 184, and the common electrode 115. The light-emitting element 190 includes the pixel electrode 191, the common layer 112, the light-emitting layer 193, the buffer layer 194, and the common electrode 115.

In the display device 100E, an example is shown in which the buffer layer 184 between the common electrode 115 and the active layer 113 and the buffer layer 194 between the common electrode 115 and the light-emitting layer 193 are formed separately. As the buffer layer 184 and the buffer layer 194, one or both of an electron-injection layer and an electron-transport layer can be formed, for example.

Figure 4B:
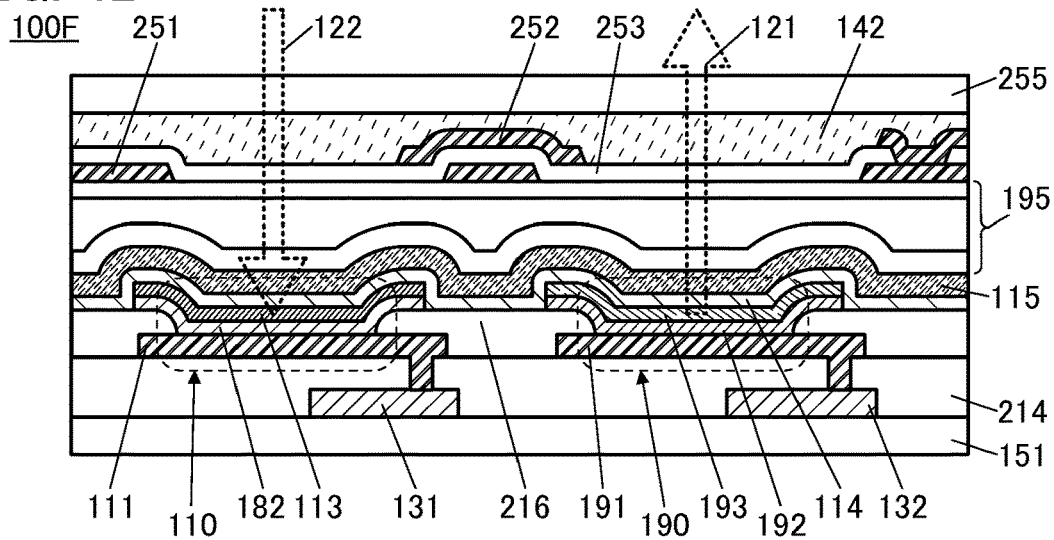

FIG. 4B is a schematic cross-sectional view of the display device 100F. The display device 100F is different from the display device 100D mainly in that the common layer 112 is not included and a buffer layer 182 and a buffer layer 192 are included. The buffer layer 182 and the buffer layer 192 may each have a single-layer structure or a stacked-layer structure.

In the display device 100F, the light-receiving element 110 includes the pixel electrode 111, the buffer layer 182, the active layer 113, the common layer 114, and the common electrode 115. The light-emitting element 190 includes the pixel electrode 191, the buffer layer 192, the light-emitting layer 193, the common layer 114, and the common electrode 115.

In the display device 100F, an example is shown in which the buffer layer 182 between the pixel electrode 111 and the active layer 113 and the buffer layer 192 between the pixel electrode 191 and the light-emitting layer 193 are formed separately. As the buffer layer 182 and the buffer layer 192, one or both of a hole-injection layer and a hole-transport layer can be formed, for example.

Figure 4C:
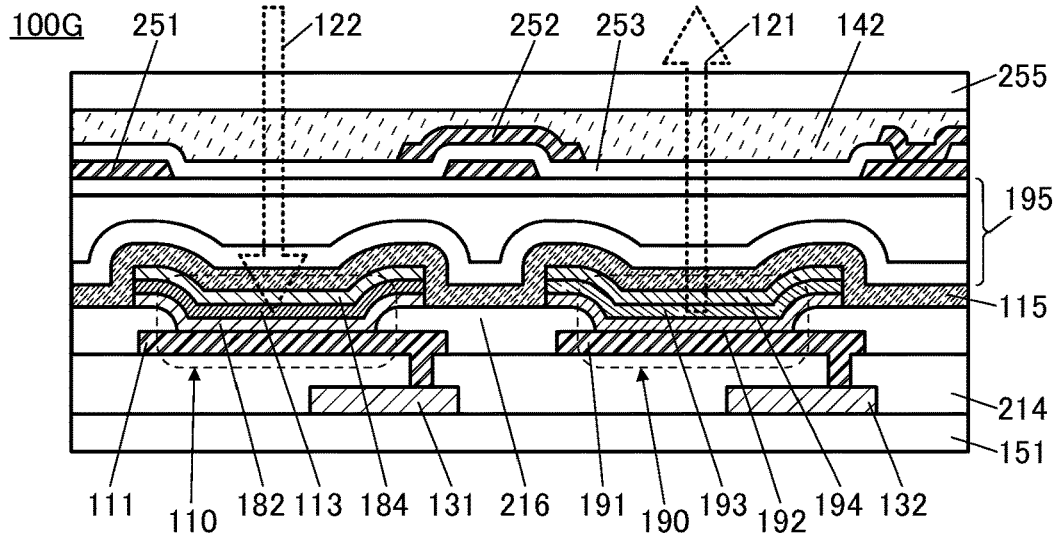

FIG. 4C is a schematic cross-sectional view of the display device 100G. The display device 100G is different from the display device 100D mainly in that the common layers 112 and 114 are not included and the buffer layers 182, 184, 192, and 194 are included.

In the display device 100G, the light-receiving element 110 includes the pixel electrode 111, the buffer layer 182, the active layer 113, the buffer layer 184, and the common electrode 115. The light-emitting element 190 includes the pixel electrode 191, the buffer layer 192, the light-emitting layer 193, the buffer layer 194, and the common electrode 115.

Another layer as well as the active layer 113 and the light-emitting layer 193 can be formed separately in the manufacturing process of the light-receiving element 110 and the light-emitting element 190.

In the example of the display device 100G, in each of the light-receiving element 110 and the light-emitting element 190, a common layer is not provided between the pair of electrodes (the pixel electrode 111 or 191 and the common electrode 115). The light-receiving element 110 and the light-emitting element 190 included in the display device 100G can be manufactured in the following manner: the pixel electrode 111 and the pixel electrode 191 are formed over the insulating layer 214 using the same material in the same step; the buffer layer 182, the active layer 113, and the buffer layer 184 are formed over the pixel electrode 111; the buffer layer 192, the light-emitting layer 193, and the buffer layer 194 are formed over the pixel electrode 191; and then, the common electrode 115 is formed to cover the buffer layer 184, the buffer layer 194, and the like.

Note that the manufacturing order of the stacked-layer structure of the buffer layer 182, the active layer 113, and the buffer layer 184 and the stacked-layer structure of the buffer layer 192, the light-emitting layer 193, and the buffer layer 194 is not particularly limited. For example, after the buffer layer 182, the active layer 113, and the buffer layer 184 are formed, the buffer layer 192, the light-emitting layer 193, and the buffer layer 194 may be formed. In contrast, the buffer layer 192, the light-emitting layer 193, and the buffer layer 194 may be formed before the buffer layer 182, the active layer 113, and the buffer layer 184 are formed. Alternatively, the buffer layer 182, the buffer layer 192, the active layer 113, and the light-emitting layer 193 may be formed in that order, for example.

Modification Example 2

An example in which a light-transmitting conductive film is used as an electrode of a touch sensor is described below.

Figure 5A:
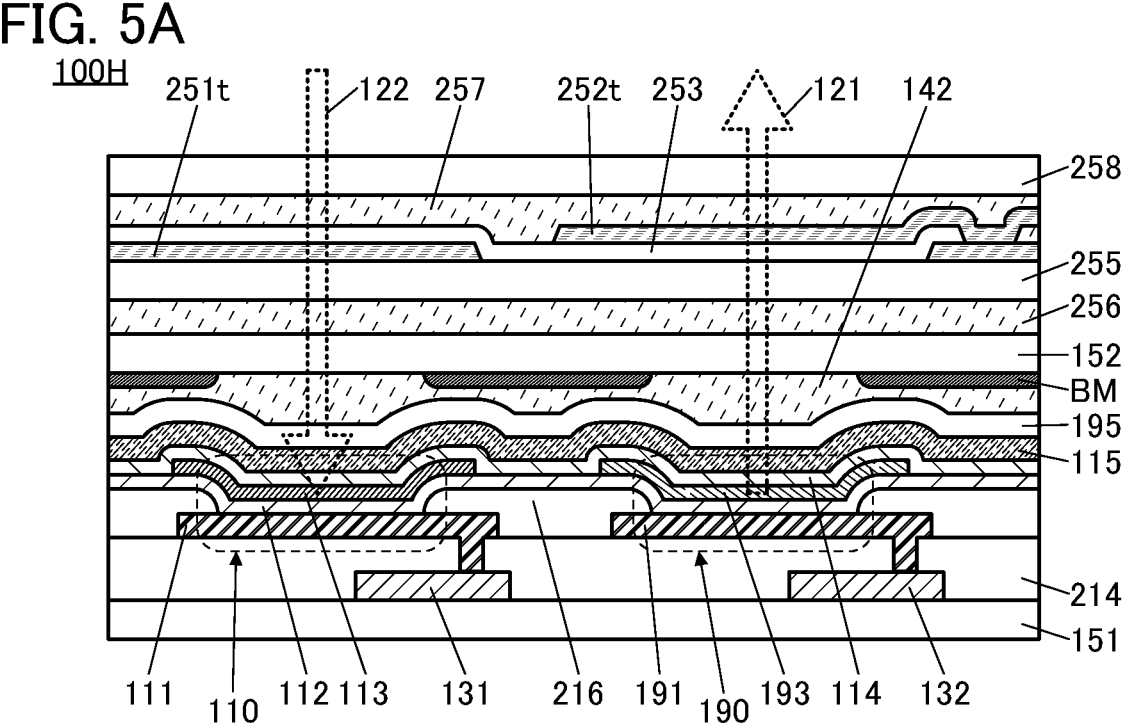
FIGS. 5A and 5B illustrate structure examples of display devices.

FIG. 5A is a schematic cross-sectional view of a display device 100H. The display device 100H is different from the display device 100A mainly in the structure of the electrode of the touch sensor.

The display device 100H includes a conductive layer 251t, a conductive layer 252t, and the insulating layer 253 between the substrates 255 and 258. The conductive layer 251t is provided over the substrate 255, the insulating layer 253 covers top surfaces of the conductive layer 251t and the substrate 255, and the conductive layer 252t is provided over the insulating layer 253. In FIG. 5A, an opening is provided in part of the insulating layer 253, and a connection portion where the conductive layers 251t and 252t are electrically connected to each other through the opening is also illustrated.

The conductive layers 251t and 252t each contain a conductive material that transmits visible light. The conductive layers 251t and 252t are each preferably formed using a material that transmits at least light emitted from the light-emitting element 190 and light received by the light-receiving element 110.

The conductive layers 251t and 252t, which have a light-transmitting property, can be provided to overlap with the light-receiving element 110 and the light-emitting element 190. Thus, bonding of the substrate 255 and substrate 151 does not need high accuracy, which leads to an improvement in the manufacturing yield of the display device 100H.

Although FIG. 5A illustrates an example in which the conductive layer 251t, the insulating layer 253, and the conductive layer 252t are sequentially formed on the surface of the substrate 255 on the substrate 258 side, one embodiment of the present invention is not limited thereto. For example, a structure in which the conductive layer 251t is formed on one surface side of the substrate 255, the conductive layer 252t is formed on the other surface side of the substrate 255, and the insulating layer 253 is not provided may be employed.

Figure 5B:
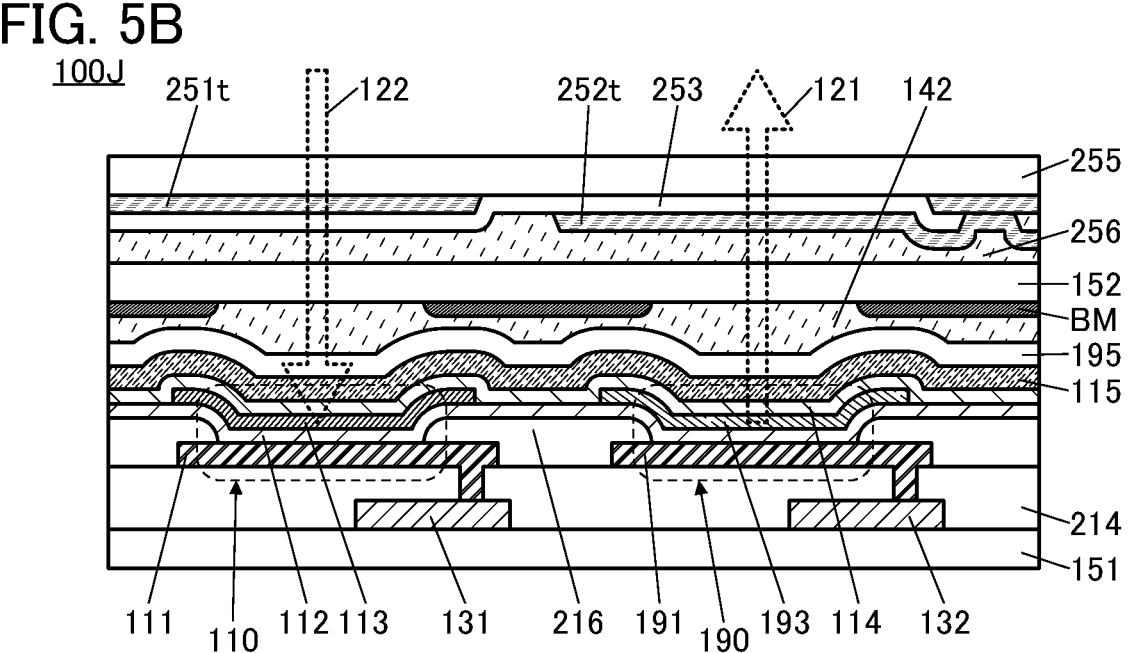

FIG. 5B is a schematic cross-sectional view of a display device 100J. The display device 100J is different from the display device 100B mainly in the structure of the electrode of the touch sensor.

The display device 100J includes the conductive layers 251t and 252t instead of the conductive layers 251 and 252 of the display device 100B. The conductive layer 251t and the conductive layer 252t may include a portion overlapping with the light-receiving region of the light-receiving element 110 and a portion overlapping with the light-emitting region of the light-emitting element 190, respectively.

The display device 100J can have a higher manufacturing yield like the display device 100H.

Note that in the display devices 100H and 100J, one of the conductive layers 251t and 252t may be replaced with a conductive layer containing a metal or an alloy. In that case, the light-transmitting conductive layer can be positioned to overlap with the light-receiving element 110 and the light-emitting element 190, and the conductive layer containing a metal or an alloy can be positioned not to overlap with the light-receiving element 110 and the light-emitting element 190. When a low-resistance conductive layer is used as part of the conductive layer included in the touch sensor, the electric resistance can be reduced and the sensitivity can be improved.

Structure Example of Touch Sensor

A structure example of the touch sensor will be described below. Here, a capacitive touch sensor is described.

Typical examples of a capacitive touch sensor include a self-capacitive touch sensor and a mutual capacitive touch sensor.

In a self-capacitive touch sensor, an electrode to which a capacitor is connected forms a segment, and a plurality of the segments are arranged in a matrix. When an object to be sensed such as a finger approaches the electrode, the self-capacitive touch sensor obtains positional data by detecting an increase in the capacitance of the electrode.

In a mutual capacitive touch sensor, a plurality of first wirings and a plurality of second wirings are arranged in directions intersecting with each other. When an object to be sensed approaches, the mutual capacitive touch sensor obtains positional data by detecting a change in capacitance formed at an intersection of the first wiring and the second wiring.

Described below is a structure that can be employed for a mutual capacitive touch sensor.

Structure Example of Touch Sensor

Figure 6A:
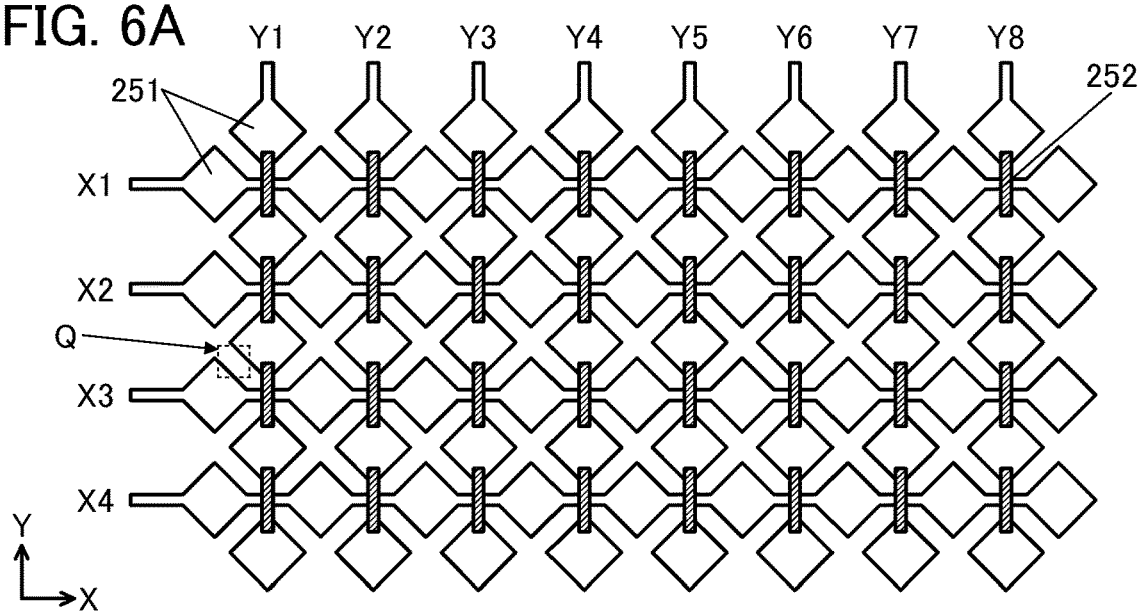
FIGS. 6A to 6C illustrate structure examples of a touch sensor.

FIG. 6A is a schematic top view illustrating an example of a conductive layer included in a touch sensor. The touch sensor illustrated in FIG. 6A includes the conductive layer 251 and the conductive layer 252.

The touch sensor includes a plurality of wirings extending in the X direction and arranged in the Y direction (wirings X1 to X4) and a plurality of wirings extending in the Y direction and arranged in the X direction (wirings Y1 to Y8). Hereinafter, an expression "wiring Xn" is used for describing the matter common to the wirings X1 to X4, and an expression "wiring Ym" is used for describing the matter common to the wirings Y1 to Y8.

A wiring Xn is formed of the conductive layer 251. The wiring Xn has a shape in which portions elongated in the X direction and rhombic portions are alternately connected to each other.

A wiring Ym includes the conductive layer 251 and the conductive layer 252. The wiring Ym is formed of a plurality of rhombic conductive layers 251 and the conductive layers 252 elongated in the Y direction, which connect the conductive layers 251.

The wiring Xn and the wiring Ym intersect with each other by a narrow portion formed of the conductive layer 251 of the wiring Xn and a narrow portion formed of the conductive layer 252 of the wiring Ym.

Figure 6B:
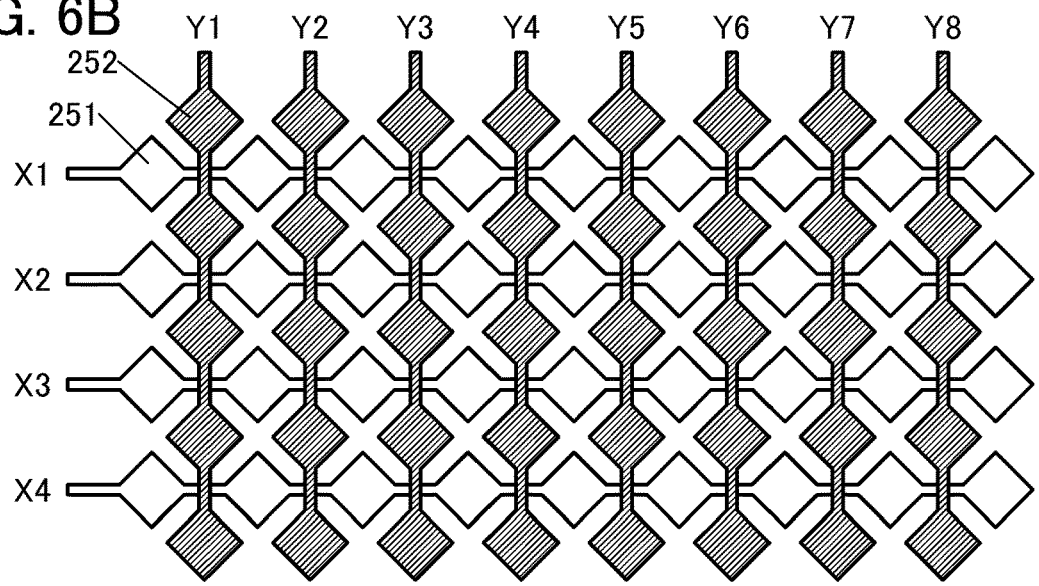

Note that as illustrated in FIG. 6B, the wiring Xn may be formed of the conductive layer 251 and the wiring Ym may be formed of the conductive layer 252.

Although FIGS. 6A and 6B illustrate examples in which four wirings Xn and eight wirings Ym are included, the number of wirings is not limited thereto and can be set as appropriate depending on the size of a display portion of a display device or required wiring density of a touch sensor.

Figure 6C:
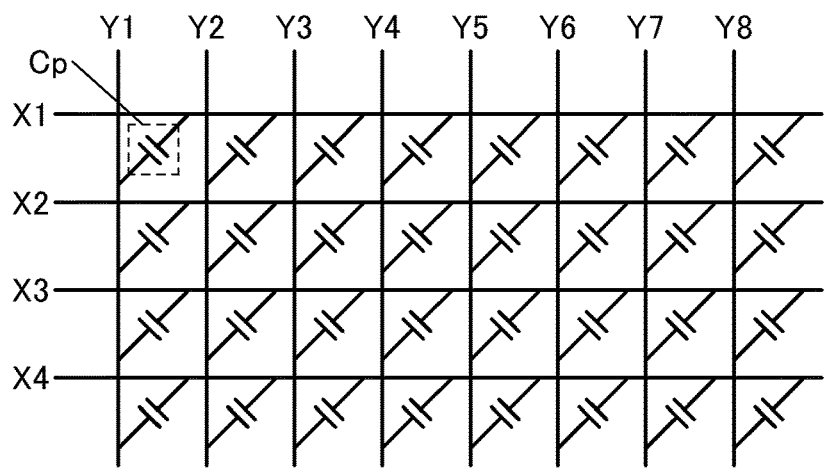

FIG. 6C is a circuit diagram illustrating the configuration of the touch sensor. Since capacitive coupling is generated between the wirings Xn and Ym, capacitance Cp is formed therebetween. The capacitance Cp is sometimes referred to as mutual capacitance between the wirings Xn and Ym. Here, a circuit supplied with a pulse potential is connected to the wiring Xn, and a circuit for obtaining the potential of the wiring Ym, such as an A/D converter circuit or a sense amplifier, is connected to the wiring Ym.

Since the capacitive coupling is formed between the wirings Xn and Ym, when a pulse potential is supplied to the wiring Xn, a pulse potential is generated in the wiring Ym. The amplitude of the pulse potential generated in the wiring Ym is proportional to the intensity of the capacitive coupling between the wirings Xn and Ym (i.e., the capacitance of the capacitance Cp). When an object to be sensed such as a finger approaches the vicinity of the intersection of the wirings Xn and Ym, capacitance is formed between the wiring Xn and the object to be sensed and between the wiring Ym and the object to be sensed; as a result, the capacitive coupling between the wirings Xn and Ym becomes relatively small. Thus, when a pulse potential is supplied to the wiring Xn, the amplitude of a pulse potential generated in the wiring Ym is decreased.

When a pulse potential is supplied to the wiring X1, pulse potentials generated in the wirings Y1 to Y8 are obtained. Similarly, pulse potentials are supplied to the wiring X2, the wiring X3, and the wiring X4 in this order, and pulse potentials generated in the wirings Y1 to Y8 at this time are obtained. Accordingly, positional data of an object to be sensed can be obtained.

Structure Example 1 of Electrode Shape

More specific examples of top surface shapes of electrodes of the wirings Xn and Ym are described below.

Figure 7:
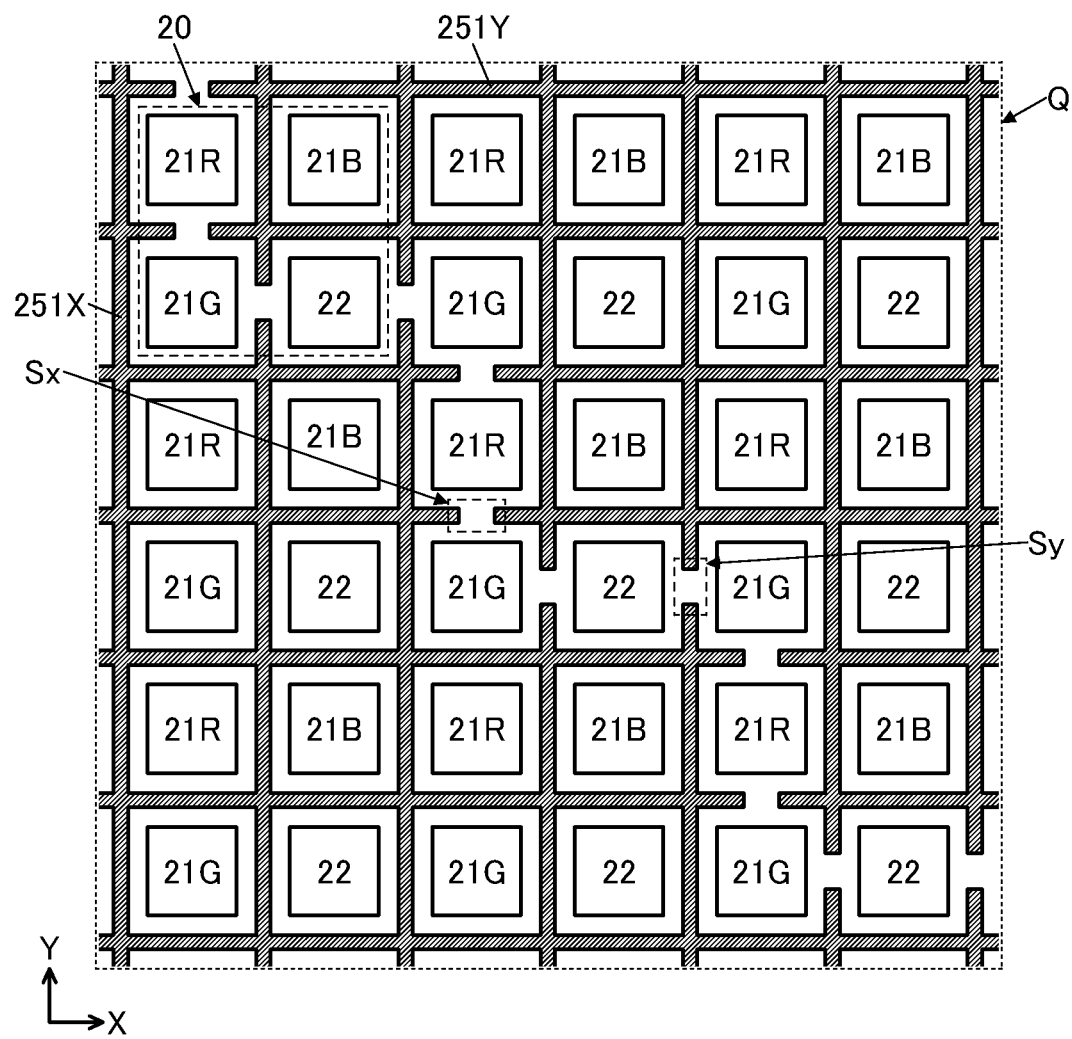
FIG. 7 illustrates a structure example of a touch sensor and a pixel.

FIG. 7 is an enlarged view of a region Q of FIG. 6A. The region Q includes the rhombic portions of the wirings Xn and Ym and a boundary therebetween.

FIG. 7 illustrates top surface shapes of a conductive layer 251X that forms the wiring Xn and a conductive layer 251Y that forms the wiring Ym. The conductive layers 251X and 251Y each have a lattice-shaped top surface. In other words, the conductive layers 251X and 251Y each have a top surface having a plurality of openings. The conductive layers 251X and 251Y may be formed over different surfaces, but it is particularly preferable that the conductive layers 251X and 251Y be positioned on the same plane and formed by processing the same conductive film.

FIG. 7 also illustrates a pixel 20. The pixel 20 includes the light-emitting elements 21R, 21B, and 21G and the light-receiving element 22. The light-emitting elements 21R and the light-emitting elements 21B are arranged alternately in the X direction. The light-emitting elements 21G and the light-receiving elements 22 are arranged alternately in the X direction. The light-emitting elements 21R and the light-emitting elements 21G are arranged alternately in the Y direction. Note that in the pixel 20, the positions of the light-emitting elements 21R, 21B, and 21G and the light-receiving element 22 are not limited thereto and any two of the four positions can be interchanged.

The conductive layers 251X and 251Y are provided between the adjacent light-emitting elements and between the light-emitting element and the light-receiving element 22 adjacent to each other in a plan view. In other words, the light-emitting elements 21R, 21B, and 21G and the light-receiving element 22 are each provided in a position overlapping with an opening of the conductive layer 251X or 251Y. Here, an example in which one light-emitting element or one light-receiving element 22 is provided in a position overlapping with one opening of the conductive layer 251X or 251Y in a plan view is illustrated. Note the one embodiment of the present invention is not limited to this example, and a plurality of light-emitting elements or one or more light-emitting elements and one or more light-receiving elements 22 may be provided in a position overlapping with one opening.

The lattice-shaped top surface of each of the conductive layers 251X and 251Y is formed by portions extending in the X direction, portions extending in the Y direction, and their intersections. The conductive layers 251X and 251Y are separated from each other by notches Sx provided in the portions extending in the X direction of the lattice-shaped conductive layer and notches Sy provided in the portions extending in the Y direction of the lattice-shaped conductive layer. Such a structure makes a distance between the conductive layers 251X and 251Y small, whereby the capacitance therebetween can be increased.

Although a notch may be provided at the intersection of the lattice, it is preferable that the notch Sx and the notch Sy be respectively positioned in the portion extending in the X direction and the portion extending in the Y direction of the lattice as illustrated in FIG. 7, whereby the patterns of the conductive layers 251X and 251Y can be less likely to be recognized from the display surface side.

Furthermore, as illustrated in FIG. 7, part of the conductive layer 251X or 251Y necessarily adjacently surrounds the light-emitting elements 21R, 21B, and 21G and the light-receiving element 22. With such a structure, the patterns of the conductive layers 251X and 251Y can be less likely to be recognized from the display surface side. In particular, the amount of received light might be changed depending on whether the conductive layer 251X or 251Y is provided around the light-receiving element 22 or not. Therefore, as illustrated in FIG. 7, part of the conductive layer 251X or 251Y is necessarily provided around the light-receiving element 22, which can suppress unevenness of a taken image due to variation in the amount of light received by the light-receiving element 22.

Note that although FIG. 7 illustrates an example in which the light-receiving element 22 whose four sides are surrounded by the conductive layer 251X or 251Y and the light-receiving element 22 adjacent to the notch Sx or Sy are mixed, one embodiment of the present invention is not limited thereto; a structure including only the light-receiving element 22 whose four sides are surrounded by the conductive layer 251X or 251Y or the light-receiving element 22 adjacent to the notch Sx or Sy may be employed.

Structure Example 2 of Electrode Shape

Figure 8:
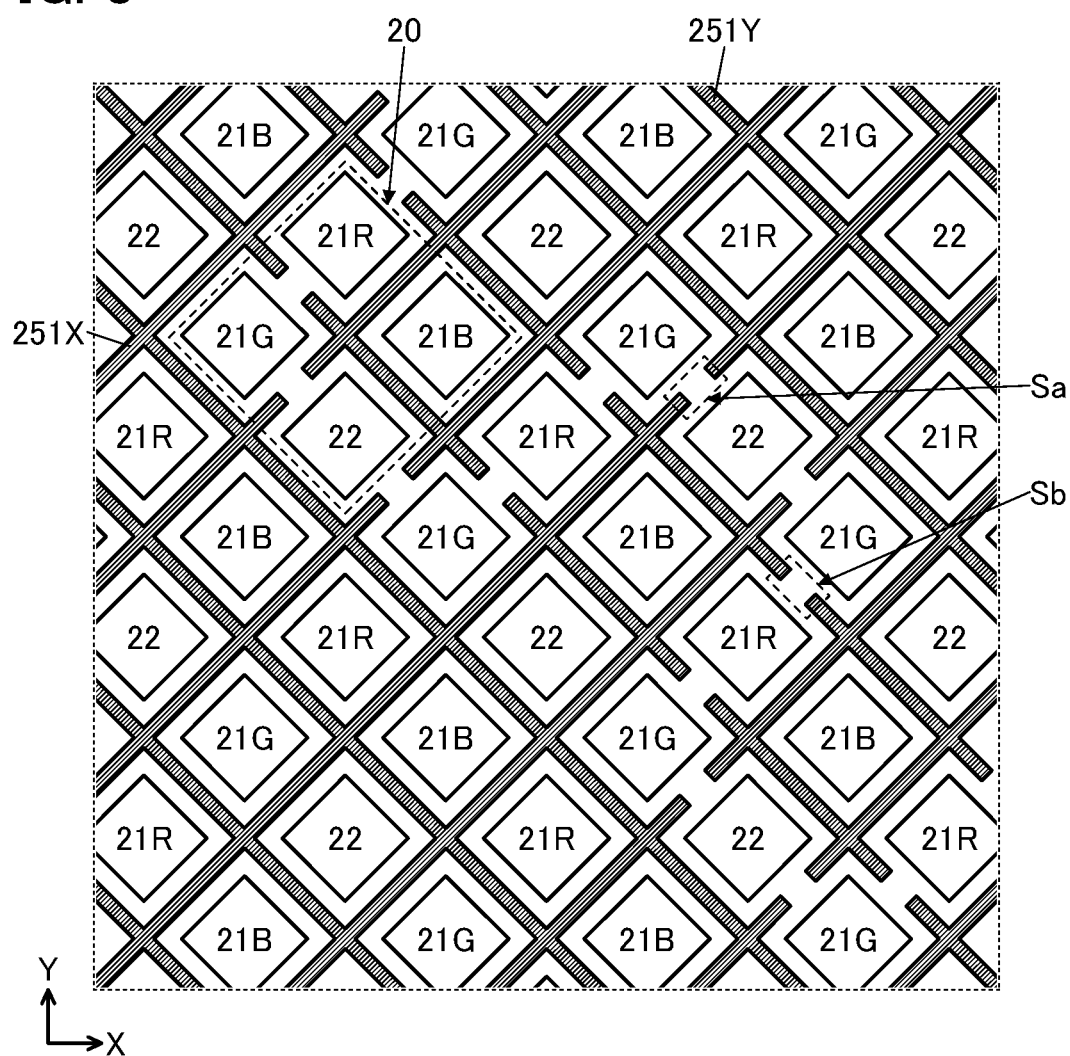
FIG. 8 illustrates a structure example of a touch sensor and a pixel.

FIG. 8 illustrates an example in which the arrangement direction of the pixels 20 illustrated in FIG. 7 is inclined by 45°. The conductive layers 251X and 251Y each have a lattice-shaped top surface inclined to, for example, the outline of a display portion of a display device or the extending direction of a wiring connected to the pixel.

The conductive layers 251X and 251Y are separated from each other by notches Sa provided in portions extending from the lower left to the upper right of the lattice-shaped conductive layer and notches Sb provided in portions extending from the upper left to the lower right of the lattice-shaped conductive layer.

Here, the conductive layers 251X and 251Y can be separated linearly by using either the notches Sa or the notches Sb. However, it is preferable that the notches Sa and the notches Sb be used in combination and the conductive layers 251X and 251Y be separated so that a boundary therebetween has a zigzag shape as illustrated in FIG. 8, in which case, the patterns of the conductive layers 251X and 251Y can be less likely to be recognized from the display surface side. Moreover, since the zigzag boundary between the conductive layers 251X and 251Y can be long, the capacitance between the conductive layers 251X and 251Y can be increased.

Structure Example 3 of Electrode Shape

Figure 9A:
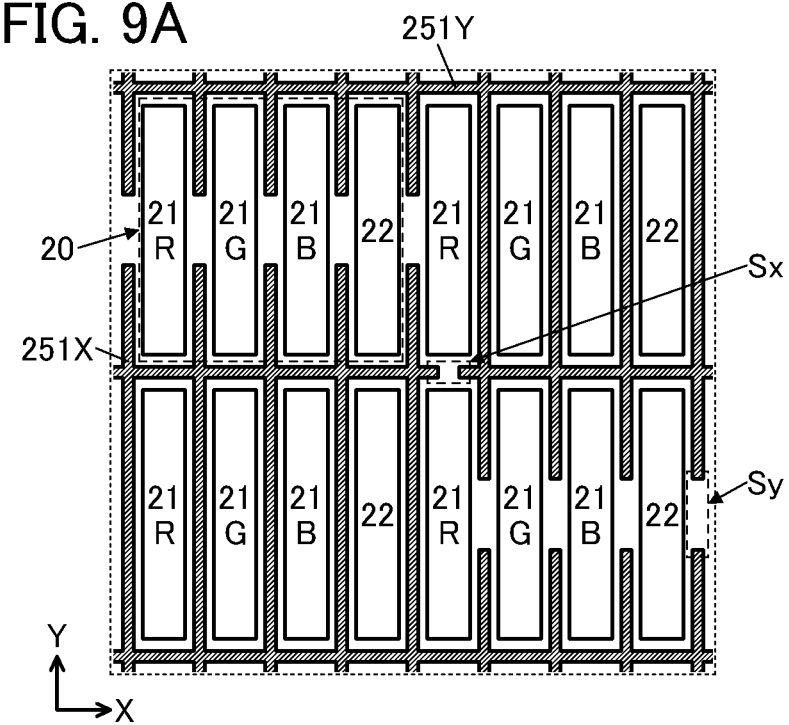
FIGS. 9A and 9B illustrate structure examples of a touch sensor and a pixel.
Figure 9B:
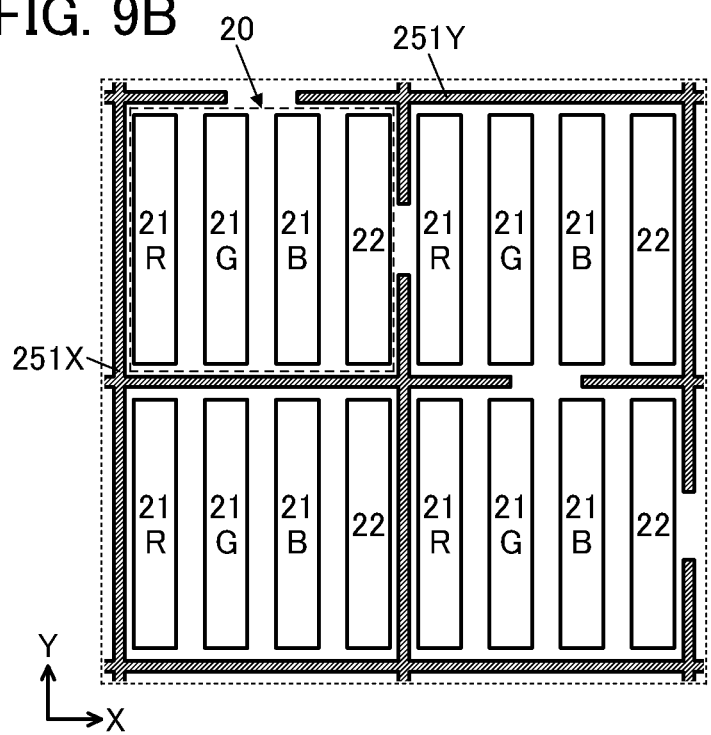

FIGS. 9A and 9B illustrate examples in which the light-emitting elements 21R, 21G, and 21B and the light-receiving element 22 of the pixel 20 are arranged in the X direction.

In FIG. 9A, the conductive layers 251X and 251Y each have a lattice-shaped top surface having vertically long openings. The light-emitting elements 21R, 21G, and 21B and the light-receiving element 22 are each positioned so as to overlap with one opening.

In FIG. 9B, the light-emitting elements 21R, 21G, and 21B and the light-receiving element 22 are positioned so as to overlap with one opening of each of the conductive layers 251X and 251Y.

With such a structure, the quality of an image displayed using the light-emitting elements 21R, 21G, and 21B can be improved.

Figure 10:
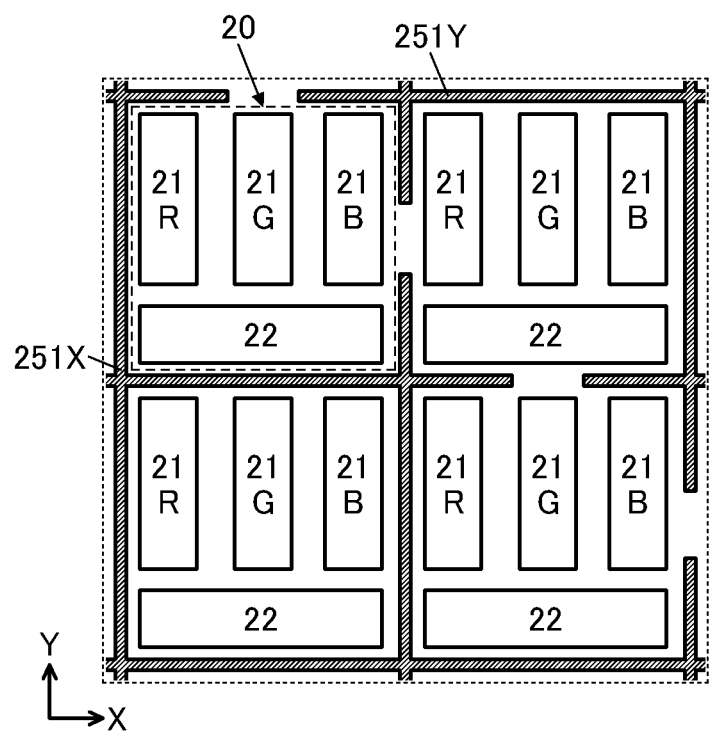
FIG. 10 illustrates a structure example of a touch sensor and a pixel.

In the pixel 20 illustrated in FIG. 10, the light-emitting elements 21R, 21G, and 21B are arranged in the X direction and the light-receiving element 22 is positioned below the light-emitting elements.

Such a structure is preferable because the display quality of an image can be further improved.

Structure Example 3 of Display Device

Hereinafter, a more specific example of the display device will be described.

Structure Example 3-1

Figure 11:
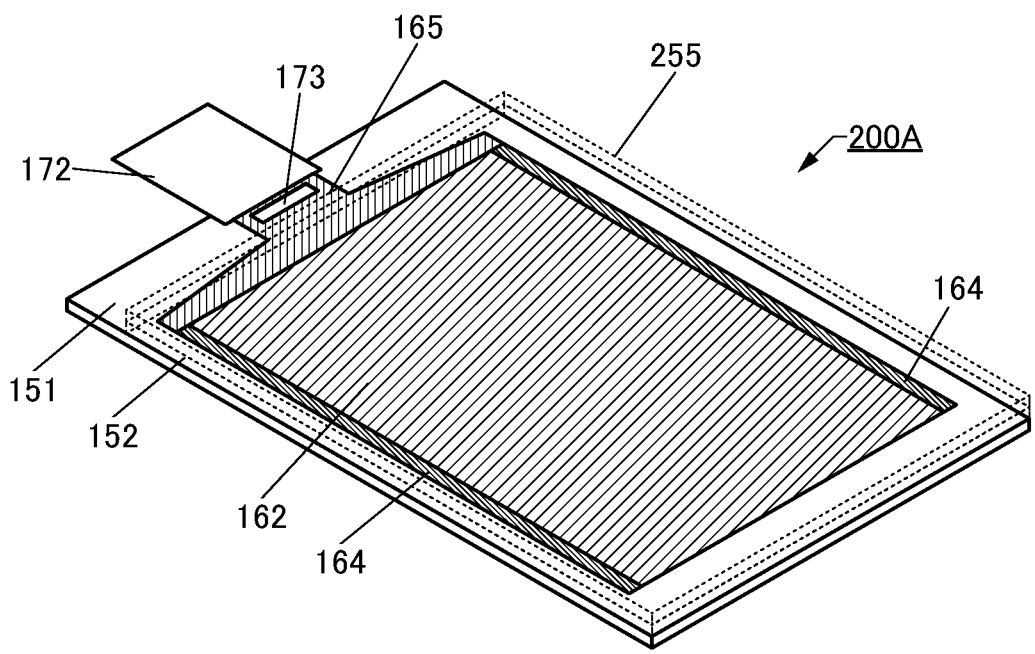
FIG. 11 illustrates a structure example of a display device.

FIG. 11 is a perspective view of a display device 200A.
In the display device 200A, the substrate 151 and the substrate 152 are bonded to each other. The substrate 255 is bonded over the substrate 152. In FIG. 11, the substrate 152 and the substrate 255 are denoted by dashed lines. The substrate 255 is provided with the above-described touch sensor.

The display device 200A includes a display portion 162, a circuit 164, a wiring 165, and the like. FIG. 11 illustrates an example in which an integrated circuit (IC) 173 and an FPC 172 are mounted on the display device 200A. Thus, the structure illustrated in FIG. 11 can be regarded as a display module including the display device 200A, the IC 173, and the FPC 172.

As the circuit 164, a scan line driver circuit can be used.

The wiring 165 has a function of supplying a signal and power to the display portion 162 and the circuit 164. The signal and power are input to the wiring 165 from the outside through the FPC 172 or from the IC 173.

FIG. 11 illustrates an example in which the IC 173 is provided over the substrate 151 by a chip on glass (COG) method, a chip on film (COF) method, or the like. An IC including a scan line driver circuit, a signal line driver circuit, or the like can be used as the IC 173, for example. Note that the display device 200A and the display module are not necessarily provided with the IC 173. The IC 173 may be mounted over the FPC 172 by a COF method or the like.

Figure 12:
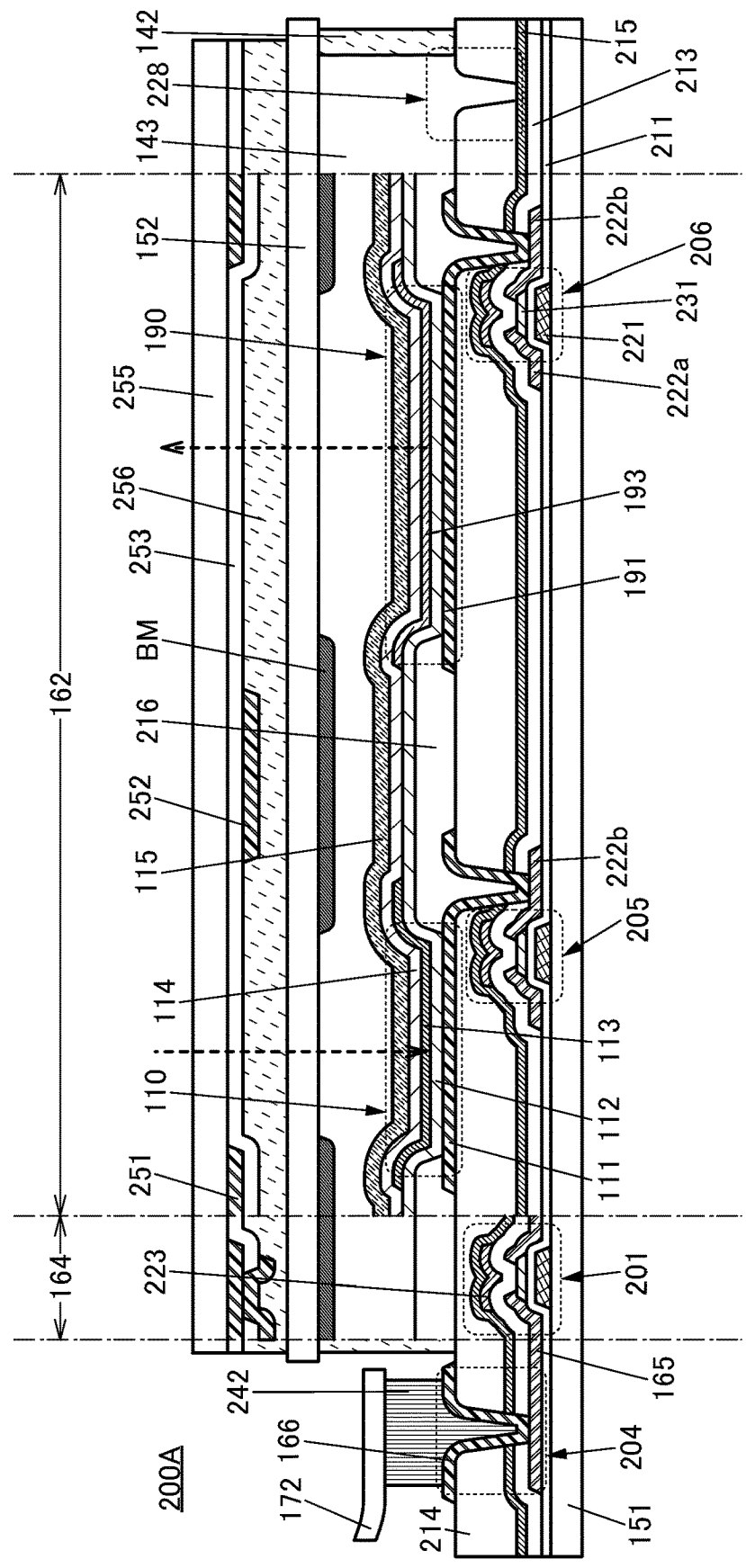
FIG. 12 illustrates a structure example of a display device.

FIG. 12 illustrates an example of cross sections of part of a region including the FPC 172, part of a region including the circuit 164, part of a region including the display portion 162, and part of a region including an end portion of the display device 200A illustrated in FIG. 11.

The display device 200A in FIG. 12 includes a transistor 201, a transistor 205, a transistor 206, the light-emitting element 190, the light-receiving element 110, and the like between the substrates 151 and 152.

The substrate 152 and the insulating layer 214 are bonded to each other with the adhesive layer 142. A solid sealing structure, a hollow sealing structure, or the like can be employed to seal the light-emitting element 190 and the light-receiving element 110. In FIG. 12, a hollow sealing structure is employed in which the space 143 surrounded by the substrate 152, the adhesive layer 142, and the insulating layer 214 is filled with an inert gas (e.g., nitrogen or argon). The adhesive layer 142 may overlap with the light-emitting element 190. The space 143 surrounded by the substrate 152, the adhesive layer 142, and the insulating layer 214 may be filled with a resin different from that of the adhesive layer 142.

The light-emitting element 190 has a stacked-layer structure in which the pixel electrode 191, the common layer 112, the light-emitting layer 193, the common layer 114, and the common electrode 115 are stacked in this order from the insulating layer 214 side. The pixel electrode 191 is connected to a conductive layer 222b included in the transistor 206 through an opening provided in the insulating layer 214. The transistor 206 has a function of controlling the driving of the light-emitting element 190. An end portion of the pixel electrode 191 is covered with the partition 216. The pixel electrode 191 contains a material that reflects visible light, and the common electrode 115 contains a material that transmits visible light.

The light-receiving element 110 has a stacked-layer structure in which the pixel electrode 111, the common layer 112, the active layer 113, the common layer 114, and the common electrode 115 are stacked in this order from the insulating layer 214 side. The pixel electrode 111 is electrically connected to the conductive layer 222b included in the transistor 205 through an opening provided in the insulating layer 214. An end portion of the pixel electrode 111 is covered with the partition 216. The pixel electrode 111 contains a material that reflects visible light, and the common electrode 115 contains a material that transmits visible light.

Light from the light-emitting element 190 is emitted toward the substrate 152. Light enters the light-receiving element 110 through the substrate 152 and the space 143. For the substrate 152, a material having a high visible-light-transmitting property is preferably used.

The pixel electrode 111 and the pixel electrode 191 can be formed using the same material in the same step. The common layer 112, the common layer 114, and the common electrode 115 are used in both the light-receiving element 110 and the light-emitting element 190. The light-receiving element 110 and the light-emitting element 190 can have common components except the active layer 113 and the light-emitting layer 193. Thus, the light-receiving element 110 can be incorporated into the display device 200A without a significant increase in the number of manufacturing steps.

The light-blocking layer BM is provided on a surface of the substrate 152 on the substrate 151 side. The light-blocking layer BM has an opening at the position overlapping with the light-receiving element 110 and an opening at the position overlapping with the light-emitting element 190. Providing the light-blocking layer BM can control the range where the light-receiving element 110 detects light. Furthermore, with the light-blocking layer BM, light can be prevented from directly entering the light-receiving element 110 from the light-emitting element 190. Hence, a sensor with less noise and high sensitivity can be obtained.

The transistor 201, the transistor 205, and the transistor 206 are formed over the substrate 151. These transistors can be fabricated using the same material in the same step.

An insulating layer 211, an insulating layer 213, an insulating layer 215, and the insulating layer 214 are provided in this order over the substrate 151. Part of the insulating layer 211 functions as a gate insulating layer of each transistor. Part of the insulating layer 213 functions as a gate insulating layer of each transistor. The insulating layer 215 is provided to cover the transistors. The insulating layer 214 is provided to cover the transistors and has a function of a planarization layer. Note that the number of gate insulating layers and the number of insulating layers covering the transistors are not limited and may each be one or two or more.

A material through which impurities such as water and hydrogen do not easily diffuse is preferably used for at least one of the insulating layers covering the transistors. This is because such an insulating layer can function as a barrier film. Such a structure can effectively inhibit diffusion of impurities into the transistors from the outside and increase the reliability of the display device.

An inorganic insulating film is preferably used as each of the insulating layers 211, 213, and 215. As the inorganic insulating film, an inorganic insulating film such as a silicon nitride film, a silicon oxynitride film, a silicon oxide film, a silicon nitride oxide film, an aluminum oxide film, or an aluminum nitride film can be used, for example. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used.

An organic insulating film often has a lower barrier property than an inorganic insulating film. Therefore, the organic insulating film preferably has an opening in the vicinity of an end portion of the display device 200A. This can inhibit diffusion of impurities from the end portion of the display device 200A through the organic insulating film. Alternatively, the organic insulating film may be formed so that its end portion is positioned on the inner side compared to the end portion of the display device 200A, to prevent the organic insulating film from being exposed at the end portion of the display device 200A.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

In a region 228 illustrated in FIG. 12, an opening is formed in the insulating layer 214. This can inhibit diffusion of impurities into the display portion 162 from the outside through the insulating layer 214 even when an organic insulating film is used as the insulating layer 214. Consequently, the reliability of the display device 200A can be increased.

Each of the transistors 201, 205, and 206 includes a conductive layer 221 functioning as a gate, the insulating layer 211 functioning as a gate insulating layer, a conductive layer 222a and the conductive layer 222b functioning as a source and a drain, a semiconductor layer 231, the insulating layer 213 functioning as a gate insulating layer, and a conductive layer 223 functioning as a gate. Here, a plurality of layers obtained by processing the same conductive film are shown with the same hatching pattern. The insulating layer 211 is positioned between the conductive layer 221 and the semiconductor layer 231. The insulating layer 213 is positioned between the conductive layer 223 and the semiconductor layer 231.

There is no particular limitation on the structure of the transistors included in the display device of this embodiment. For example, a planar transistor, a staggered transistor, or an inverted staggered transistor can be used. A top-gate transistor or a bottom-gate transistor can be used. Alternatively, gates may be provided above and below a semiconductor layer where a channel is formed.

The transistors 201, 205, and 206 employ a structure in which the semiconductor layer where a channel is formed is positioned between two gates. The two gates may be connected to each other and supplied with the same signal to operate the transistor. Alternatively, the threshold voltage of the transistor may be controlled by supplying a potential for controlling the threshold voltage to one of the two gates and a potential for driving to the other.

There is no particular limitation on the crystallinity of a semiconductor material used for the transistor, and any of an amorphous semiconductor, a single crystal semiconductor, and a semiconductor having other crystallinity than single crystal (a microcrystalline semiconductor, a polycrystalline semiconductor, or a semiconductor partly including crystal regions) may be used. It is preferable that a single crystal semiconductor or a semiconductor having crystallinity be used, in which case degradation of transistor characteristics can be prevented.

It is preferable that a semiconductor layer of a transistor contain a metal oxide (also referred to as an oxide semiconductor). Alternatively, a semiconductor layer of a transistor may contain silicon. Examples of silicon include amorphous silicon and crystalline silicon (e.g., low-temperature polysilicon or single crystal silicon).

The semiconductor layer preferably contains indium, M (M is one or more of gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more of aluminum, gallium, yttrium, and tin.

It is particularly preferable that an oxide containing indium (In), gallium (Ga), and zinc (Zn) (also referred to as IGZO) be used as the semiconductor layer.

In the case where the semiconductor layer is an In-M-Zn oxide, as for the atomic ratio of metal elements in a sputtering target used for forming the In-M-Zn oxide, it is preferable that the atomic proportion of In is greater than or equal to that of M The atomic ratio of metal elements in such a sputtering target is, for example, In:M:Zn=1:1:1, In:M:Zn=1:1:1.2, In:M:Zn=2:1:3, In:M:Zn=3:1:2, In:M:Zn=4:2:3, In:M:Zn=4:2:4.1, In:M:Zn=5:1:3, In:M:Zn=5:1:6, In:M:Zn=5:1:7, In:M:Zn=5:1:8, In:M:Zn=10:1:3, In:M:Zn=6:1:6, or In:M:Zn=5:2:5.

The sputtering target preferably contains a polycrystalline oxide, in which case the semiconductor layer having crystallinity is easily formed. Note that the atomic ratio of the formed semiconductor layer varies in the range of ±40% from any of the above atomic ratios of the metal elements of the sputtering target. For example, when a sputtering target with an atomic ratio of In:Ga:Zn=4:2:4.1 is used to form the semiconductor layer, the atomic ratio of the formed semiconductor layer may sometimes be 4:2:3 or in the neighborhood thereof.

Note that the atomic ratio of In:Ga:Zn=4:2:3 or in the neighborhood thereof includes the case where, when In is 4, Ga is greater than or equal to 1 and less than or equal to 3 and Zn is greater than or equal to 2 and less than or equal to 4. The atomic ratio of In:Ga:Zn=5:1:6 or in the neighborhood thereof includes the case where, when In is 5, Ga is greater than 0.1 and less than or equal to 2 and Zn is greater than or equal to 5 and less than or equal to 7. The atomic ratio of In:Ga:Zn=1:1:1 or in the neighborhood thereof includes the case where, when In is 1, Ga is greater than 0.1 and less than or equal to 2 and Zn is greater than 0.1 and less than or equal to 2.

The transistor included in the circuit 164 and the transistor included in the display portion 162 may have the same structure or different structures. One structure or two or more kinds of structures may be employed for a plurality of transistors included in the circuit 164. Similarly, one structure or two or more kinds of structures may be employed for a plurality of transistors included in the display portion 162.

A connection portion 204 is provided in a region of the substrate 151 where the substrate 152 does not overlap. In the connection portion 204, the wiring 165 is electrically connected to the FPC 172 through a conductive layer 166 and a connection layer 242. On the top surface of the connection portion 204, the conductive layer 166 obtained by processing the same conductive film as the pixel electrode 191 is exposed. Thus, the connection portion 204 and the FPC 172 can be electrically connected to each other through the connection layer 242.

The substrate 255 is bonded to a surface of the substrate 152, which is opposite to the substrate 151, with the adhesive layer 256 therebetween. The conductive layer 251, the insulating layer 253, and the conductive layer 252 are provided on a surface of the substrate 255 on the substrate 151 side.

Here, the case where a conductive film containing a metal or an alloy is used as each of the conductive layers 251 and 252 is described. The conductive layers 251 and 252 are provided so as to overlap with neither the light-receiving region of the light-receiving element 110 nor the light-emitting region of the light-emitting element 190. In FIG. 12, the conductive layers 251 and 252 are each provided in a position overlapping with the light-blocking layer BM.

A conductive film containing a metal such as aluminum, titanium, chromium, nickel, copper, yttrium, zirconium, molybdenum, silver, tantalum, or tungsten, or an alloy containing the metal as its main component can be used for each of the conductor layers 251 and 252, for example. A single-layer structure or a stacked-layer structure including a film containing any of these materials can be used.

Note that a light-transmitting conductive film can be used for one or both of the conductive layers 251 and 252. For example, a conductive oxide such as indium oxide, indium tin oxide, indium zinc oxide, zinc oxide, or zinc oxide containing gallium, or graphene can be used. Alternatively, a conductive film which contains the above-described metal or alloy and is thin enough to transmit light may be used. In the case where a light-transmitting conductive film is used for the conductive layer 251 or 252, the conductive layer may be provided to overlap with the light-receiving region of the light-receiving element 110 and the light-emitting region of the light-emitting element 190.

An inorganic insulating film or an organic insulating film can be used as the insulating layer 253. Examples of insulating materials include a resin such as an acrylic resin and an epoxy resin, and an inorganic insulating material such as silicon oxide, silicon oxynitride, silicon nitride oxide, silicon nitride, and aluminum oxide. The insulating layer 253 may have either a single-layer structure or a stacked-layer structure.

A variety of optical members can be arranged on the outer surface of the substrate 255. Examples of the optical members include a polarizing plate, a retardation plate, a light diffusion layer (e.g., a diffusion film), an anti-reflective layer, and a light-condensing film. Furthermore, an antistatic film preventing the attachment of dust, a water repellent film suppressing the attachment of stain, a hard coat film suppressing generation of a scratch caused by the use, an impact-absorbing layer, or the like may be arranged on the outer surface of the substrate 255.

For each of the substrates 151, 152, and 255, glass, quartz, ceramic, sapphire, a resin, or the like can be used. When the substrates 151, 152, and 255 are formed using a flexible material, the flexibility of the display device can be increased.

As the adhesive layer, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. A two-component-mixture-type resin may be used. An adhesive sheet or the like may be used.

As the connection layer 242, an anisotropic conductive film (ACF), an anisotropic conductive paste (ACP), or the like can be used.

The light-emitting element 190 may be a top emission, bottom emission, or dual emission light-emitting element, or the like. A conductive film that transmits visible light is used as the electrode through which light is extracted. A conductive film that reflects visible light is preferably used as the electrode through which light is not extracted.

The light-emitting element 190 includes at least the light-emitting layer 193. In addition to the light-emitting layer 193, the light-emitting element 190 may further include a layer containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like. For example, the common layer 112 preferably includes one or both of a hole-injection layer and a hole-transport layer. For example, the common layer 114 preferably includes one or both of an electron-transport layer and an electron-injection layer.

Either a low molecular compound or a high molecular compound can be used for the common layer 112, the light-emitting layer 193, and the common layer 114, and an inorganic compound may also be contained. The layers included in the common layer 112, the light-emitting layer 193, and the common layer 114 can be formed by any of the following methods, for example: an evaporation method (including a vacuum evaporation method), a transfer method, a printing method, an inkjet method, and a coating method.

The light-emitting layer 193 may contain an inorganic compound such as quantum dots as a light-emitting material.

The active layer 113 of the light-receiving element 110 contains a semiconductor. Examples of the semiconductor include an inorganic semiconductor such as silicon and an organic semiconductor including an organic compound. This embodiment shows an example in which an organic semiconductor is used as the semiconductor contained in the active layer. The use of an organic semiconductor is preferable because the light-emitting layer 193 of the light-emitting element 190 and the active layer 113 of the light-receiving element 110 can be formed by the same method (e.g., a vacuum evaporation method) and thus the same manufacturing apparatus can be used.

Examples of an n-type semiconductor material contained in the active layer 113 include electron-accepting organic semiconductor materials such as fullerene (e.g., $C_{60}$ and $C_{70}$) and fullerene derivatives. Fullerene has a soccer ball-like shape, which is energetically stable. HOMO and LUMO levels of fullerene are deep (low). Since the LUMO level of fullerene is deep, fullerene has an extremely high electron-accepting property (acceptor property). In general, when π-electron conjugation (resonance) spreads on a plane like benzene, an electron-donating property (donor property) becomes high. However, since fullerene has a spherical shape, fullerene has a high electron-accepting property even when a π-electron widely spreads. The high electron-accepting property is advantageous to a light-receiving device because charge separation can be efficiently performed at high speed. In addition, $C_{60}$ and $C_{70}$ each have a wide absorption band in a visible light region, and it is particularly preferable to use $C_{70}$ because $C_{70}$ has a wider π-electron conjugated system than $C_{60}$ and a wider absorption band than $C_{60}$ also in a long wavelength region.

Examples of an n-type semiconductor material contained in the active layer 113 include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer 113 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

For example, the active layer 113 is preferably formed by co-evaporation of an n-type semiconductor and a p-type semiconductor. Alternatively, the active layer 113 may be formed by stacking an n-type semiconductor and a p-type semiconductor.

As materials for the gates, the source, and the drain of a transistor and conductive layers functioning as wirings and electrodes included in the display device, any of metals such as aluminum, titanium, chromium, nickel, copper, yttrium, zirconium, molybdenum, silver, tantalum, and tungsten, or an alloy containing any of these metals as its main component can be used. A single-layer structure or a stacked-layer structure including a film containing any of these materials can be used.

As a light-transmitting conductive material, a conductive oxide such as indium oxide, indium tin oxide, indium zinc oxide, zinc oxide, or zinc oxide containing gallium, or graphene can be used. It is also possible to use a metal material such as gold, silver, platinum, magnesium, nickel, tungsten, chromium, molybdenum, iron, cobalt, copper, palladium, or titanium; an alloy material containing any of these metal materials; or a nitride of the metal material (e.g., titanium nitride). Alternatively, a nitride of the metal material (for example, titanium nitride) or the like may be used. In the case of using the metal material or the alloy material (or the nitride thereof), the thickness is preferably set small enough to be able to transmit light. Alternatively, a stacked film of any of the above materials can be used as the conductive layers. For example, a stacked film of indium tin oxide and an alloy of silver and magnesium is preferably used, in which case the conductivity can be increased. They can also be used for conductive layers such as wirings and electrodes included in the display device, conductive layers (a conductive layer functioning as a pixel electrode or a common electrode) included in a display element, and conductive layers included in a touch sensor.

Examples of insulating materials that can be used for the insulating layers include a resin such as an acrylic resin and an epoxy resin, and an inorganic insulating material such as silicon oxide, silicon oxynitride, silicon nitride oxide, silicon nitride, and aluminum oxide.

Structure Example 3-2

FIG. 13A is a cross-sectional view of a display device 200B. The display device 200B is different from the display device 200A mainly in that a lens 149 and the protective layer 195 are included.

Providing the protective layer 195 covering the light-receiving element 110 and the light-emitting element 190 can inhibit diffusion of impurities such as water into the light-receiving element 110 and the light-emitting element 190, so that the reliability of the light-receiving element 110 and the light-emitting element 190 can be increased.

In the region 228 in the vicinity of an end portion of the display device 200B, the insulating layer 215 and the protective layer 195 are preferably in contact with each other through an opening in the insulating layer 214. In particular, the inorganic insulating film included in the insulating layer 215 and the inorganic insulating film included in the protective layer 195 are preferably in contact with each other. Thus, diffusion of impurities from the outside into the display portion 162 through the organic insulating film can be inhibited. Accordingly, the reliability of the display device 200B can be increased.

FIG. 13B illustrates an example in which the protective layer 195 has a three-layer structure. In FIG. 13B, the protective layer 195 includes an inorganic insulating layer 195a over the common electrode 115, an organic insulating layer 195b over the inorganic insulating layer 195a, and an inorganic insulating layer 195c over the organic insulating layer 195b.

An end portion of the inorganic insulating layer 195a and an end portion of the inorganic insulating layer 195c extend beyond an end portion of the organic insulating layer 195b and are in contact with each other. The inorganic insulating layer 195a is in contact with the insulating layer 215 (inorganic insulating layer) through the opening in the insulating layer 214 (organic insulating layer). Accordingly, the light-receiving element 110 and the light-emitting element 190 can be surrounded by the insulating layer 215 and the protective layer 195, whereby the reliability of the light-receiving element 110 and the light-emitting element 190 can be increased.

As described above, the protective layer 195 may have a stacked-layer structure of an organic insulating film and an inorganic insulating film. In that case, an end portion of the inorganic insulating film preferably extends beyond an end portion of the organic insulating film.

The lens 149 is provided on the surface of the substrate 152 on the substrate 151 side. The lens 149 has the convex surface on the substrate 151 side. It is preferable that the light-receiving region of the light-receiving element 110 overlap with the lens 149 and do not overlap with the light-emitting layer 193. Thus, the sensitivity and accuracy of the sensor using the light-receiving element 110 can be increased.

The refractive index of the lens 149 with respect to light received by the light-receiving element 110 is preferably greater than or equal to 1.3 and less than or equal to 2.5. The lens 149 can be formed using at least one of an inorganic material and an organic material. For example, a material containing a resin can be used for the lens 149. Moreover, a material containing at least one of an oxide and a sulfide can be used for the lens 149.

Specifically, a resin containing chlorine, bromine, or iodine, a resin containing a heavy metal atom, a resin having an aromatic ring, a resin containing sulfur, and the like can be used for the lens 149. Alternatively, a material containing a resin and nanoparticles of a material having a higher refractive index than the resin can be used for the lens 149. Titanium oxide, zirconium oxide, and the like can be used for the nanoparticles.

In addition, cerium oxide, hafnium oxide, lanthanum oxide, magnesium oxide, niobium oxide, tantalum oxide, titanium oxide, yttrium oxide, zinc oxide, an oxide containing indium and tin, an oxide containing indium, gallium, and zinc, and the like can be used for the lens 149. Alternatively, zinc sulfide and the like can be used for the lens 149.

In the display device 200B, the protective layer 195 and the substrate 152 are bonded to each other with the adhesive layer 142. The adhesive layer 142 is provided to overlap with the light-receiving element 110 and the light-emitting element 190; that is, the display device 200B employs a solid sealing structure.

Structure Example 3-3

FIG. 14A is a cross-sectional view of a display device 200C. The display device 200C is different from the display device 200B mainly in the structures of the transistor and the touch sensor and including neither the light-blocking layer BM nor the lens 149.

The display device 200C includes, between the substrates 151 and 152, the light-receiving element 110, the light-emitting element 190, and the conductive layers 251 and 252 functioning as electrodes of a touch sensor.

The display device 200C includes a transistor 208, a transistor 209, and a transistor 210 over the substrate 151.

Each of the transistors 208, 209, and 210 includes the conductive layer 221 functioning as a gate, the insulating layer 211 functioning as a gate insulating layer, a semiconductor layer including a channel formation region 231i and a pair of low-resistance regions 231n, the conductive layer 222a connected to one of the low-resistance regions 231n, the conductive layer 222b connected to the other low-resistance region 231n, an insulating layer 225 functioning as a gate insulating layer, the conductive layer 223 functioning as a gate, and the insulating layer 215 covering the conductive layer 223. The insulating layer 211 is positioned between the conductive layer 221 and the channel formation region 231i. The insulating layer 225 is positioned between the conductive layer 223 and the channel formation region 231i.

The conductive layer 222a and the conductive layer 222b are each connected to the corresponding low-resistance region 231n through openings provided in the insulating layer 225 and the insulating layer 215. One of the conductive layers 222a and 222b serves as a source, and the other serves as a drain.

The pixel electrode 191 of the light-emitting element 190 is electrically connected to one of the pair of low-resistance regions 231n of the transistor 208 through the conductive layer 222b.

The pixel electrode 111 of the light-receiving element 110 is electrically connected to the other of the pair of low-resistance regions 231n of the transistor 209 through the conductive layer 222b.

FIG. 14A illustrates an example in which the insulating layer 225 covers a top and side surfaces of the semiconductor layer. In a transistor 202 illustrated in FIG. 14B, the insulating layer 225 overlaps with the channel formation region 231i of the semiconductor layer 231 and does not overlap with the low-resistance regions 231n. The structure illustrated in FIG. 14B is obtained by processing the insulating layer 225 with the conductive layer 223 as a mask, for example. In FIG. 14B, the insulating layer 215 is provided to cover the insulating layer 225 and the conductive layer 223, and the conductive layer 222a and the conductive layer 222b are connected to the low-resistance regions 231n through the openings in the insulating layer 215. Furthermore, an insulating layer 218 covering the transistor may be provided.

The inorganic insulating layer 195a, the organic insulating layer 195b, and the inorganic insulating layer 195c are stacked to cover the light-receiving element 110 and the light-emitting element 190. The conductive layer 251, the insulating layer 253, and the conductive layer 252 which are included in the touch sensor are provided over the inorganic insulating layer 195c. The conductive layers 251 and 252 are each provided in a position overlapping with neither the light-receiving region of the light-receiving element 110 nor the light-emitting region of the light-emitting element 190.

Structure Example 3-4

Figure 15:
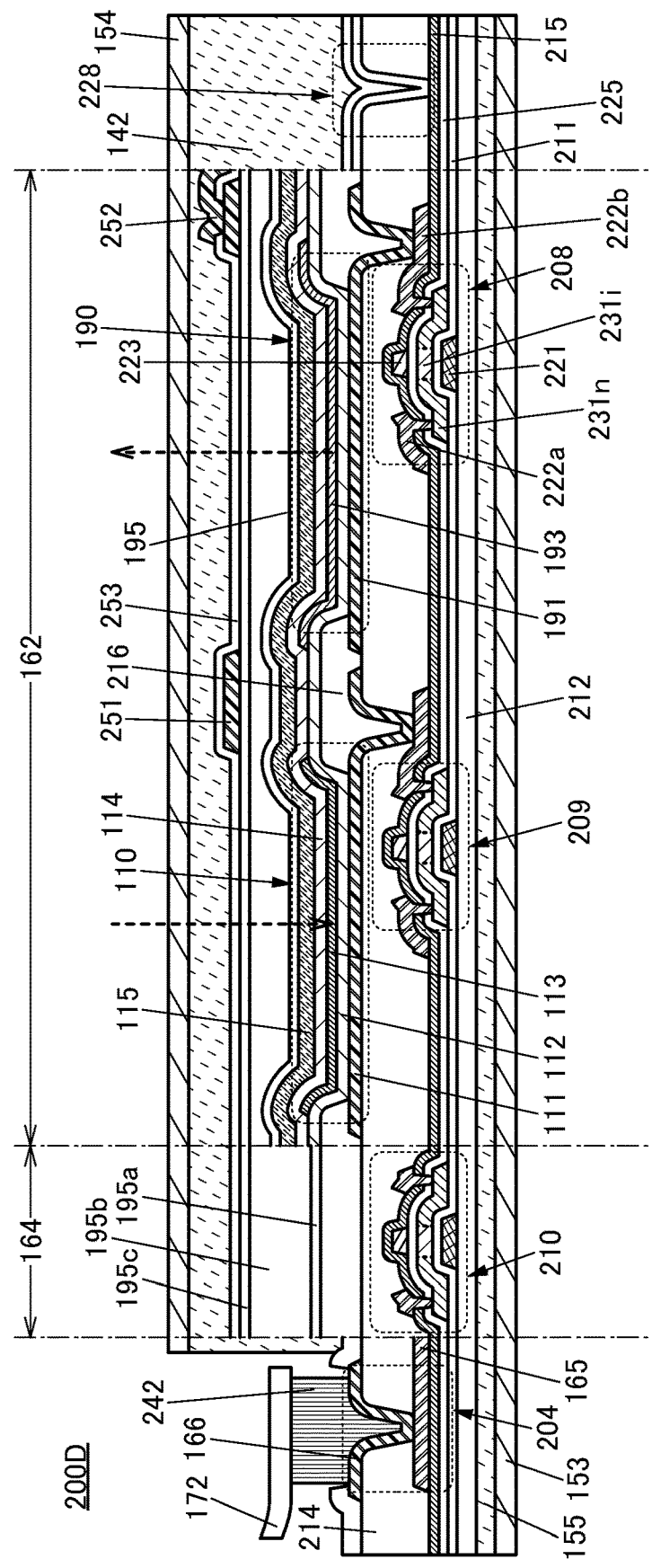
FIG. 15 illustrates a structure example of a display device.

FIG. 15 is a cross-sectional view of a display device 200D. The display device 200D is different from the display device 200C mainly in the structure of the substrate.

The display device 200D includes neither the substrate 151 nor the substrate 152 and includes a substrate 153, a substrate 154, an adhesive layer 155, and an insulating layer 212.

The substrate 153 and the insulating layer 212 are bonded to each other with the adhesive layer 155. The substrate 154 and the protective layer 195 are bonded to each other with the adhesive layer 142.

The display device 200D is formed in such a manner that the insulating layer 212, the transistor 208, the transistor 209, the light-receiving element 110, the light-emitting element 190, and the like that are formed over a formation substrate are transferred onto the substrate 153. The substrate 153 and the substrate 154 are preferably flexible. Accordingly, the display device 200D can be highly flexible.

The inorganic insulating film that can be used as the insulating layer 211, the insulating layer 213, and the insulating layer 215 can be used as the insulating layer 212. Alternatively, a stacked film of an organic insulating film and an inorganic insulating film may be used as the insulating layer 212. In that case, a film on the transistor 209 side is preferably an inorganic insulating film.

The above is the description of the structure example of the display device.

[Metal Oxide]

A metal oxide that can be used for the semiconductor layer will be described below.

Note that in this specification and the like, a metal oxide containing nitrogen is also referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

Note that in this specification and the like, "c-axis aligned crystal (CAAC)" or "cloud-aligned composite (CAC)" might be stated. Note that CAAC refers to an example of a crystal structure, and CAC refers to an example of a function or a material composition.

For example, a cloud-aligned composite oxide semiconductor (CAC-OS) can be used for the semiconductor layer.

A CAC-OS or a CAC metal oxide has a conducting function in part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, a switching function (On/Off function) can be given to the CAC-OS or the CAC metal oxide. In the CAC-OS or the CAC metal oxide, separation of the functions can maximize each function.

The CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. Furthermore, in some cases, the conductive regions and the insulating regions are unevenly distributed in the material. The conductive regions are sometimes observed to be coupled in a cloud-like manner with their boundaries blurred.

In the CAC-OS or the CAC metal oxide, the conductive regions and the insulating regions each have a size greater than or equal to 0.5 nm and less than or equal to 10 nm, preferably greater than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or CAC metal oxide is used for a channel formation region of a transistor, high current drive capability in the on state of the transistor, that is, high on-state current and high field-effect mobility, can be obtained.

In other words, the CAC-OS or the CAC metal oxide can also be referred to as a matrix composite or a metal matrix composite.

An oxide semiconductor (metal oxide) is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

The CAAC-OS has c-axis alignment, its nanocrystals are connected in the a-b plane direction, and its crystal structure has distortion. Note that distortion refers to a portion where the direction of a lattice arrangement changes between a region with a uniform lattice arrangement and another region with a uniform lattice arrangement in a region where the nanocrystals are connected.

The shape of the nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, a lattice arrangement is distorted and thus formation of a crystal grain boundary is inhibited. This is because the CAAC-OS can tolerate distortion owing to a low density of oxygen atom arrangement in the a-b plane direction, a change in interatomic bond distance by substitution of a metal element, and the like.

Furthermore, the CAAC-OS tends to have a layered crystal structure (also referred to as a layered structure) in which a layer containing indium and oxygen (hereinafter, In layer) and a layer containing the element M, zinc, and oxygen (hereinafter, (M, Zn) layer) are stacked. Note that indium and the element M can be replaced with each other, and when the element M of the (M, Zn) layer is replaced with indium, the layer can be referred to as an (In, M, Zn) layer. When indium of the In layer is replaced with the element M, the layer can be referred to as an (In, M) layer.

The CAAC-OS is a metal oxide with high crystallinity. By contrast, in the CAAC-OS, a reduction in electron mobility due to a crystal grain boundary is less likely to occur because it is difficult to observe a clear crystal grain boundary. Entry of impurities, formation of defects, or the like might decrease the crystallinity of a metal oxide. This means that the CAAC-OS has small amounts of impurities and defects (e.g., oxygen vacancies (Vo)). Thus, a metal oxide including the CAAC-OS is physically stable. Accordingly, the metal oxide including the CAAC-OS is resistant to heat and has high reliability.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different nanocrystals in the nc-OS. Thus, the orientation in the whole film is not observed. Accordingly, in some cases, the nc-OS cannot be distinguished from an a-like OS or an amorphous oxide semiconductor, depending on an analysis method.

Indium-gallium-zinc oxide (hereinafter referred to as IGZO) that is a kind of metal oxide containing indium, gallium, and zinc has a stable structure in some cases when formed of the above-described nanocrystals. In particular, IGZO crystals tend not to grow in the air and thus, a stable structure is obtained when IGZO is formed of smaller crystals (e.g., the above-described nanocrystals) rather than larger crystals (here, crystals with a size of several millimeters or several centimeters).

The a-like OS is a metal oxide having a structure between that of the nc-OS and that of the amorphous oxide semiconductor. The a-like OS has a void or a low-density region. That is, the a-like OS has low crystallinity as compared with the nc-OS and the CAAC-OS.

An oxide semiconductor (metal oxide) can have various structures that show various different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The substrate temperature during the formation of the metal oxide film is preferably lower than or equal to 350° C., further preferably higher than or equal to room temperature and lower than or equal to 200° C., and still further preferably higher than or equal to room temperature and lower than or equal to 130° C. The substrate temperature during the formation of the metal oxide film is preferably room temperature because the productivity is increased.

The metal oxide film can be formed by a sputtering method. Alternatively, a PLD method, a PECVD method, a thermal CVD method, an ALD method, a vacuum evaporation method, or the like may be used.

The above is the description of the metal oxide.

At least part of any of the structure examples, the drawings corresponding thereto, and the like described in this embodiment can be implemented in combination with any of the other structure examples, the other drawings corresponding thereto, and the like as appropriate.

At least part of this embodiment can be implemented in combination with any of the other embodiments described in this specification as appropriate.

Embodiment 2

In this embodiment, a device which can include a display device of one embodiment of the present invention, an authentication method using the device, and the like will be described.

A device including a display device of one embodiment of the present invention has a function of a touch panel that detects the position of a finger or the like that touches a display surface and a function of an image sensor that takes an image of an object on the display surface. The device can perform fingerprint authentication by taking an image of a finger or the like that touches the display surface, for example. One embodiment of the present invention, which includes light-receiving elements arranged in a matrix in a display surface, can take an image for fingerprint authentication at any position in the display surface. Therefore, authentication processing that does not cause stress to a user can be achieved.

Structure Example of Device

Figure 16:
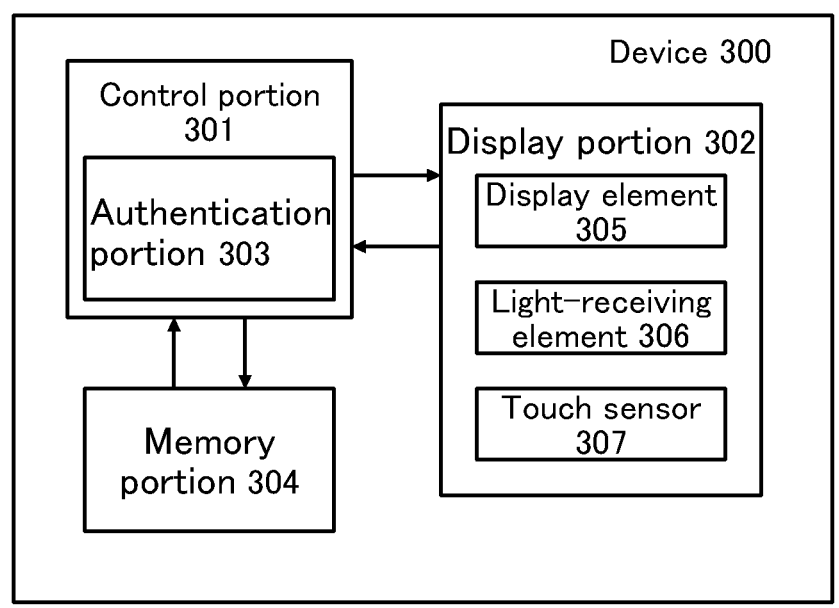
FIG. 16 illustrates a structure example of a device.

FIG. 16 is a block diagram of a device 300 of one embodiment of the present invention. The device 300 includes a control portion 301, a display portion 302, and a memory portion 304. The control portion 301 includes an authentication portion 303. The display portion 302 includes a display element 305, a light-receiving element 306, and a touch sensor 307. The device 300 can be applied to an electronic device such as a portable information terminal, for example.

Note that in a block diagram attached to this specification, components are classified according to their functions and shown as independent blocks; however, it is practically difficult to completely separate the components according to their functions, and one component may be related to a plurality of functions or a plurality of components may achieve one function.

The control portion 301 has a function of performing entire control of the system of the device 300. In addition, the control portion 301 has a function of collectively controlling the components of the device 300.

The control portion 301 functions as, for example, a central processing unit (CPU). The control portion 301 interprets and executes instructions from various programs with a processor to process various kinds of data and control programs. The programs executed by the processor may be stored in a memory region of the processor or in the memory portion 304.

The control portion 301 has a function of generating image data to be output to the display portion 302, a function of processing a taken image (imaging data) input from the light-receiving element 306 of the display portion 302, a function of processing the positional data of an object to be sensed that is input from the touch sensor 307, a function of controlling the lock state of the system, and the like.

The display portion 302 has an image display function, a touch detection function, and an imaging function. The display portion 302 can obtain fingerprint data by taking an image of a finger that touches a screen. The display portion 302 can also be referred to as a touch panel with a function of obtaining fingerprint data.

Specifically, the display portion 302 has a function of displaying an image with the display element 305 on the basis of image data input from the control portion 301. Moreover, the display portion 302 has a function of taking an image of a fingerprint or the like with the light-receiving element 306 and outputting imaging data to the control portion 301. Furthermore, the display portion 302 has a function of obtaining the positional data of an object to be sensed such as a finger with the touch sensor 307 and outputting the positional data to the control portion 301.

Embodiment 1 can be referred to for the structure of a display device that can be used for the display portion 302.

It is preferable that the display portion 302 be capable of obtaining fingerprint data of a finger that touches any position on the screen. In other words, a range where the touch sensor functions and a range where fingerprint data can be obtained are preferably aligned or substantially aligned with each other on the screen.

The memory portion 304 has a function of retaining user's fingerprint data registered in advance. The memory portion 304 can output the fingerprint data to the authentication portion 303 in accordance with the request of the control portion 301 or the authentication portion 303.

The memory portion 304 preferably retains fingerprint data of all the fingers used for user authentication. For example, fingerprint data of user's right and left index fingers can be retained. The user can freely register fingerprint data of not only an index finger but also one or more of a middle finger, a ring finger, a little finger, and a thumb, and the memory portion 304 can retain all the registered fingerprint data.

The control portion 301 has a function of making the locked system unlocked and available when the user is authenticated by user authentication performed by the authentication portion 303.

Moreover, when the display portion 302 detects touch operation and outputs positional data while the system is locked, the control portion 301 generates image data and outputs the image data to the display portion 302 so that a display element located at the touched position in the display portion 302 is turned on. In addition, the control portion 301 has a function of requesting the display portion 302 to take an image of a fingerprint while the display element is on.

The control portion 301 may also have a function of generating image data including an image showing a position to be touched by a user (i.e., an image indicating a position to be touched) and outputting the image data to the display portion 302 while the system is locked.

The authentication portion 303 has a function of comparing fingerprint data input from the display portion 302 and fingerprint data retained in the memory portion 304 and performing processing for determining whether those match or not (authentication processing). The authentication portion 303 can perform the authentication processing by a method in which two images are compared to use the degree of similarity therebetween, e.g., a template matching method or a pattern matching method.

Alternatively, fingerprint authentication processing may be performed by inference using machine learning. In this case, it is particularly preferable that the authentication processing be performed by inference using a neural network.

Authentication Method Example 1

An authentication method example using the device 300 is described below. Here, operation relating to fingerprint authentication is described.

Figure 17:
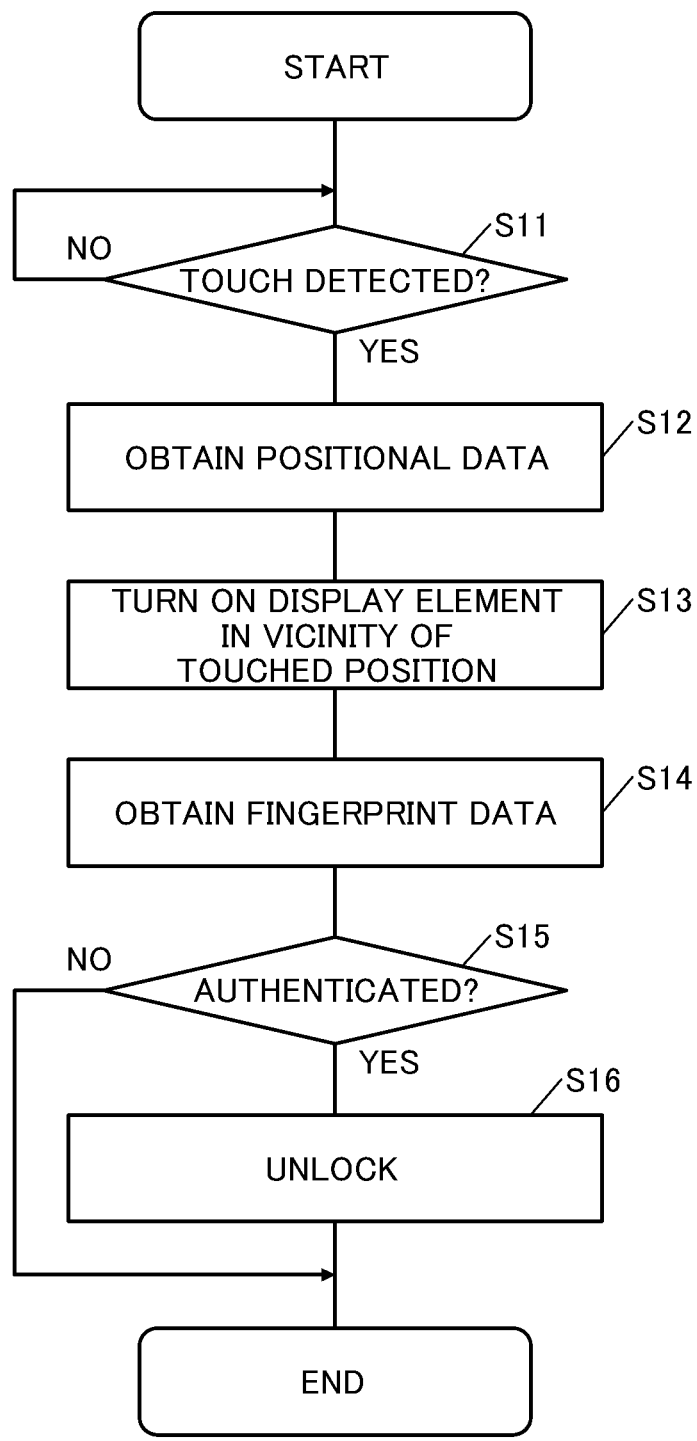
FIG. 17 is a flow chart showing an authentication method example.

FIG. 17 is a flow chart relating to operation in the authentication method using the device 300.

First, processing is started. Here, the system of the device 300 is locked, i.e., in a state where functions that a user can execute are limited (including a log-out state and a log-off state).

In Step S11, whether the display portion 302 is touched or not is detected. Touch detection is performed by the touch sensor 307. In the case where a touch is detected, the processing proceeds to Step S12. Step S11 is repeatedly performed until a touch is detected.

In Step S12, the positional data of a touched position is obtained. The positional data is output from the touch sensor 307 to the control portion 301.

In Step S13, the display elements 305 at and in the vicinity of the touched position are turned on in accordance with the positional data. At this time, the control portion 301 generates image data with which portions at and in the vicinity of the touched position are bright (have a high gray level) and other portions are dark (have a low gray level) and outputs the image data to the display portion 302, whereby the display portion 302 displays an image based on the image data.

Light emitted from the display element 305 can be used as a light source for taking an image by the light-receiving element 306. Accordingly, the display element 305 to be turned on can emit light that can be received by the light-receiving element 306. When the display portion 302 includes the display elements 305 of R, G, and B, for example, any one or two or all of the display elements 305 can be turned on.

In Step S13, it is possible that the portions at and in the vicinity of the touched position display a bright image (emit light) and other portions emit no light. Thus, the display element 305 that is on is hidden by a finger, so that bright light can be prevented from being recognized by a user. In other words, a light source for fingerprint authentication can be prevented from being directly recognized by a user.

Under a dark environment, for example, when a user directly recognizes a light source for fingerprint authentication, the user feels glare and, in the worst case, there is a risk that user's eyes might be damaged; thus, only the position hidden by a finger emits light, whereby a load on the user can be reduced.

Note that portions at other than the touched position may emit no light or display another image.

Here, the brightness of the display element 305 to be turned on can be changed as appropriate depending on ambient light or the sensitivity of the light-receiving element 306, and is preferably as high as possible. For example, assuming that the luminance or the gray level of the display element 305 that emits the brightest light is 100%, the luminance or the gray level can be 50% to 100%, preferably 70% to 100%, further preferably 80% to 100%.

Moreover, a range that emits light is preferably hidden by a finger. In the case where a finger touches a screen, a contact surface of the finger is positioned inside the outline of the finger that is seen by a user and the projected area of the finger on the screen is larger than the contact area of the finger. Therefore, assuming that the contact area is 100%, the light-emitting area can be 50% to 150%, preferably 70% to 130%, further preferably 80% to 120%. When the light-emitting area is smaller than 50%, fingerprint data obtained by imaging is insufficient and thus the accuracy of authentication might be decreased. In contrast, when the light-emitting area exceeds 150%, a light source might be directly recognized by a user.

Alternatively, a structure may be employed in which the range that emits light is a circle of radius r whose center is a touched position and the value of r can be set in advance. The size or shape of a finger varies depending on user's age, gender, physique, or the like, so that a user may be capable of setting the radius r of the circle, which defines the range that emits light.

Next, in Step S14, fingerprint data is obtained. The fingerprint data is output from the display portion 302 to the control portion 301 as image data obtained by the light-receiving element 306.

In Step S15, authentication processing is performed by the authentication portion 303. Specifically, the authentication portion 303 compares the fingerprint data (image data) output from the display portion 302 and user's fingerprint data which is registered in advance and retained in the memory portion 304, and determines whether those data match or not. When authenticated (i.e., the two fingerprint data are determined to match), the processing proceeds to Step S16. When not authenticated (i.e., the two fingerprint data are determined not to match), the processing terminates.

In the case where two or more fingerprint data are stored in the memory portion 304, all of the fingerprint data are subjected to the authentication processing.

In Step S16, the control portion 301 unlocks the system of the device 300 (including the case of bringing the system into a log-in state).

The above is the description of the flow chart shown in FIG. 17.

Figure 18A:
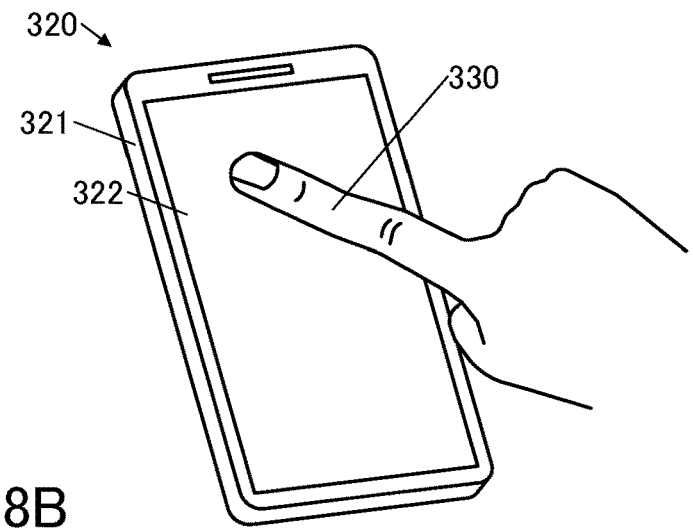
FIGS. 18A to 18C illustrate usage examples of an electronic device.
Figure 18B:
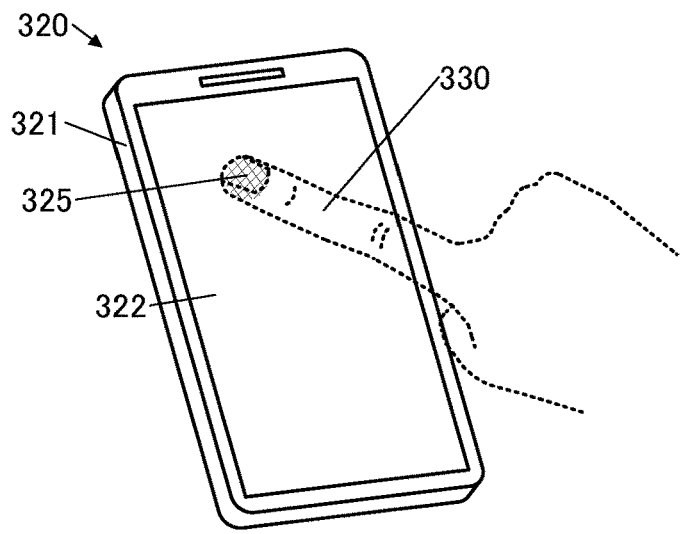
Figure 18C:
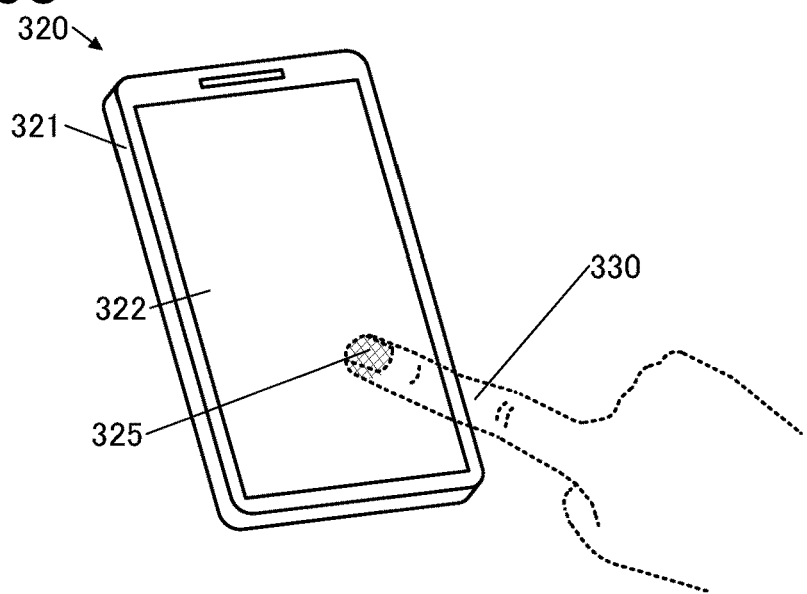

A specific usage example relating to the above authentication method will be described below. FIGS. 18A to 18C illustrate a state where an electronic device employing the above authentication method is used.

FIG. 18A illustrates an electronic device 320 including the device 300. The electronic device 320 includes a housing 321 and a display portion 322. The housing 321 includes the control portion 301, and the display portion 302 is used as the display portion 322.

FIG. 18A illustrates a state where a finger 330 touches the display portion 322 and an image of a fingerprint is taken.

FIG. 18B is a drawing in which the finger 330 in FIG. 18A is transparent and only its outline is indicated by a dashed line. FIG. 18B illustrates a state where a display element positioned in a region 325 including a portion touched by the finger 330 is on. As illustrated in FIGS. 18A and 18B, the region 325 which emits bright light is hidden by the finger 330 and thus is less likely to be recognized by a user. Therefore, fingerprint authentication can be performed without causing stress to the user.

In addition, the electronic device 320 can perform fingerprint authentication at any position in the display portion 322. FIG. 18C illustrates a state where a position different from that in FIGS. 18A and 18B is touched and an image of a fingerprint is taken.

Authentication Method Example 2

Figure 19:
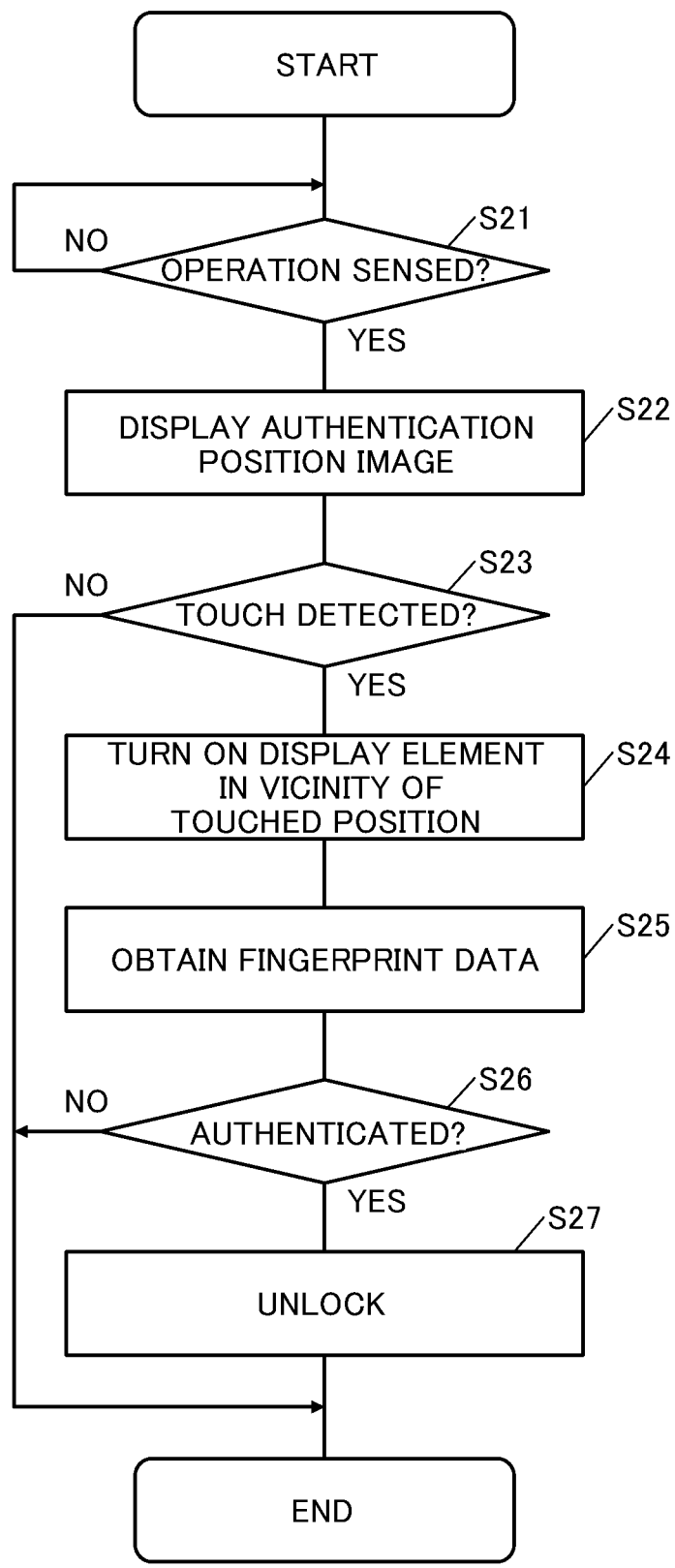
FIG. 19 is a flow chart showing an authentication method example.

An authentication method example which is different from the above will be described below. FIG. 19 is a flow chart relating to operation in the authentication method using the device 300.

First, processing is started. At this time, the system of the device 300 is locked.

In Step S21, operation by a user on the device 300 is sensed. Examples of the operation include turning on the electronic device, pressing a physical button, touching the display portion 302, directing user's eyes to the device 300, making ambient light bright, and changing the orientation of the electronic device greatly. When the operation is sensed, the processing proceeds to Step S22. Step S21 is repeatedly performed until the operation is sensed.

Next, in Step S22, an authentication position image is displayed on the display portion 302. The authentication position image includes an image showing a position to be touched by the user, an image indicating a position to be touched, text information urging the user to touch, or the like.

Specifically, the control portion 301 generates image data including an authentication position image and outputs the image data, whereby an image based on the image data is displayed on the display portion 302.

Here, the authentication position image may indicate the same position each time processing is performed, but preferably indicates different positions each time processing is performed. That is, the user touches portions randomly shown at different positions each time processing is performed, whereby fingerprint authentication can be performed.

Taking an image of a fingerprint at the same position every time promotes degradation of the display element 305 that is turned on as a light source for taking an image of a fingerprint or the transistor included in the pixel, for example, which may cause a problem such as a decrease in the emission luminance of the display element 305 or burn-in of the screen. Therefore, by performing fingerprint authentication at different positions each time processing is performed as described above, a decrease in the luminance of the display element 305, burn-in of the screen, or the like can be inhibited.

Fingerprint authentication performed at different positions each time processing is performed requires the user to perform operation for authentication actively, which leads to an improvement in user's security awareness.

Here, as an authentication position image, a position to be touched and an image or text information which specifies a finger to touch can be displayed in combination. For example, text information such as "Please touch with a middle finger" can be displayed and fingerprint data of a middle finger can be used for authentication in later authentication processing. Different fingers can be randomly specified each time processing is performed like a position to be touched.

Moreover, the display portion 302 can display a plurality of authentication position images to be touched by two or more fingers simultaneously and authentication processing can be performed based on two or more fingerprint data. Alternatively, multi-step authentication may be performed in which one finger is subjected to authentication processing, and when the finger is authenticated, another finger is subjected to fingerprint authentication.

As described above, authentication processing using a plurality of fingerprint data, which are randomly specified, instead of only one fingerprint data can make the security level extremely high. For example, even when a malicious user obtains fingerprint data of a true user (owner) illegally and uses the device 300, the device 300 cannot be used without fingerprint data of a plurality (preferably, all) of fingers; thus, unauthorized use can be favorably prevented.

In Step S23, whether the position corresponding to the authentication position image is touched or not is detected. Touch detection is performed by the touch sensor 307. In the case where a touch is detected, the processing proceeds to Step S24. In the case where a touch is not detected for a certain period or a different position is touched, the processing terminates.

In Step S24, the display elements 305 at and in the vicinity of the touched position are turned on. For Step S24, Step S13 in Authentication method example 1 can be referred to.

Next, in Step S25, fingerprint data is obtained. The fingerprint data is output from the display portion 302 to the control portion 301 as image data obtained by the light-receiving element 306.

In Step S26, the authentication portion 303 performs authentication processing. When authenticated, the processing proceeds to Step S27. When not authenticated, the processing terminates. For the authentication processing, the description of Step S15 in Authentication method example 1 can be referred to.

In the case where a position to be touched and an image or text information which specifies a finger to touch are displayed on the display portion 302 in combination as an authentication position image in Step S22, authentication processing is performed using fingerprint data of a corresponding finger.

In the case where a plurality of authentication position images corresponding to two or more fingers are displayed on the display portion 302 in Step S22 as described above, authentication processing is performed using fingerprint data of a plurality of corresponding fingers.

In Step S27, the control portion 301 unlocks the system of the device 300 (including the case of bringing the system into a log-in state).

The above is the description of the flow chart shown in FIG. 19.

When the multi-step authentication described in Step S22 is performed, the processings from Step S22 to Step S26 are performed a plurality of times. As two-step authentication, the following processing can be performed, for example: authentication processing is performed using a fingerprint of a right middle finger in the first processing; when the fingerprint is authenticated, authentication processing is performed using a fingerprint of a left ring finger in the second processing; and when the fingerprint of the left ring finger is authenticated, the system is unlocked. Fingers to be specified in the first processing and the second processing are preferably randomly changed each time processing is performed.

Figure 20A:
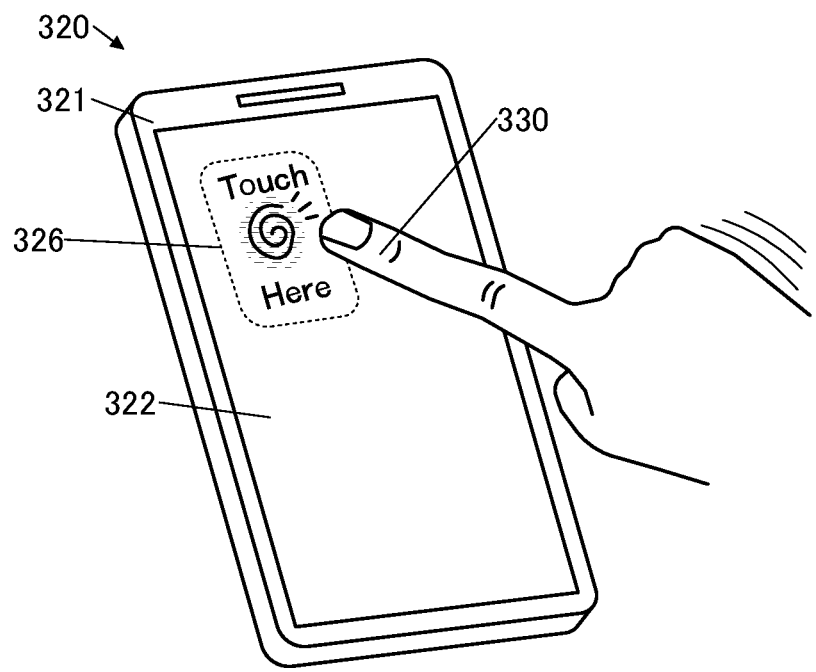
FIGS. 20A and 20B illustrate usage examples of an electronic device.

FIG. 20A illustrates a state where an image 326 is displayed as an authentication position image on the display portion 322 of the electronic device 320 and the finger 330 is to touch a portion indicated by the image 326.

The image 326 includes text information "Touch Here" to urge the user to touch in addition to an illustration that imitates a fingerprint. The illustration added with the text information can clearly show the position to the user.

Figure 20B:
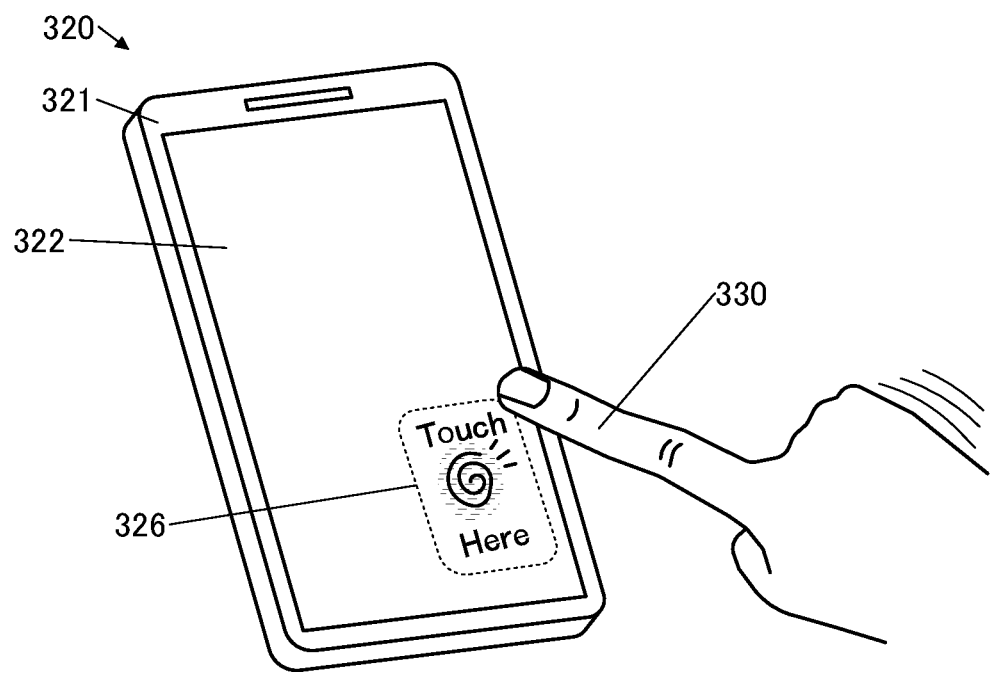

FIG. 20B illustrates a state where the image 326 is displayed at a position different from that in FIG. 20A and the finger 330 is to touch the image 326.

Structure Example of Electronic Device

Figure 21A:
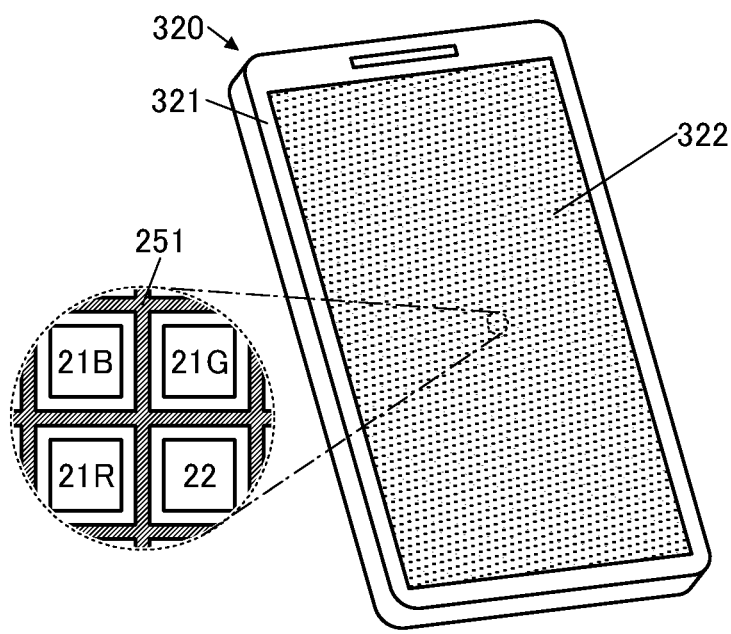
FIGS. 21A and 21B illustrate structure examples of electronic devices.

FIG. 21A is a schematic view of the electronic device 320. The electronic device 320 includes the housing 321 and the display portion 322. FIG. 21A is an enlarged view of one pixel in the display portion 322. The pixel provided in the display portion 322 includes the light-emitting elements 21R, 21G, and 21B and the light-receiving element 22. In addition, the conductive layer 251 having a lattice-shaped top surface is provided, and the light-emitting elements 21R, 21G, and 21B and the light-receiving element 22 are provided to overlap with openings of the conductive layer 251.

The entire display portion 322 of the electronic device 320 functions as a touch panel. The electronic device 320 includes the pixels each including the light-receiving element 22 over the entire display portion 322. Therefore, an image of a fingerprint can be taken by touching any position in the display portion 322.

Figure 21B:
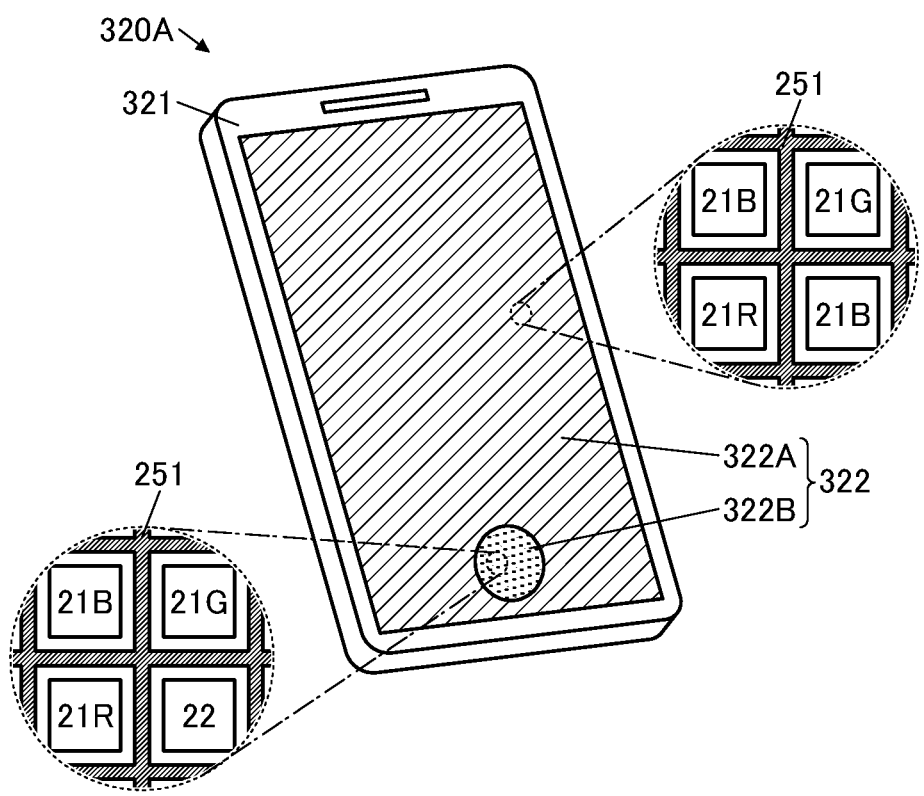

An electronic device 320A illustrated in FIG. 21B includes two regions (regions 322A and 322B) in the display portion 322. In FIG. 21B, the region 322B is positioned on the lower side of the display portion 322 and the region other than the region 322B is the region 322A.

FIG. 21B illustrates enlarged views of one pixel provided in the region 322A and one pixel provided in the region 322B. Like the pixel provided in the display portion 322 of the electronic device 320 illustrated in FIG. 21A, the pixel provided in the region 322B includes the light-emitting elements 21R, 21G, and 21B and the light-receiving element 22.

The pixel provided in the region 322A does not include the light-receiving element 22 and includes only the light-emitting elements. FIG. 21B illustrates an example in which the pixel includes one light-emitting element 21R, one light-emitting element 21G, and two light-emitting elements 21B. Note that one embodiment of the present invention is not limited thereto, and not the number of light-emitting elements 21B but the number of light-emitting elements 21R or 21G or light-emitting elements of another color may be two. Furthermore, the pixel arrangement of the region 322A may be different from that of the region 322B; for example, the light-emitting elements 21R, 21G, and 21B can be arranged in the form of stripes. The regions 322A and 322B preferably have the same pixel arrangement, in which case a boundary therebetween is less likely to be recognized.

In addition, the lattice-shaped conductive layer 251 is provided in both the region 322A and the region 322B. Thus, the entire display portion 322 functions as a touch panel.

In FIG. 21B, fingerprint authentication can be performed by touching the region 322B. Accordingly, the user can perform fingerprint authentication in the same portion every time, which enables a usable (user-friendly) electronic device.

Although FIG. 21B illustrates an example in which the region 322B is positioned on the lower side of the display portion 322 and is substantially circular, the position and the shape of the region 322B are not limited thereto. For example, the region 322B may be provided along part of the outline of the display portion 322. The number of regions 322B is not limited to one, and a plurality of regions 322B may be provided in the display portion 322.

The above is the description of the structure example of the electronic device.

Note that an authentication method, a processing method, an operation method, a driving method, a display method, or the like that is executed by the device of one embodiment of the present invention is described as a program, for example. A program in which the authentication method, the processing method, the operation method, the driving method, the display method, or the like that is described above as an example and executed by the device 300 or the like is described can be stored in a non-temporary memory medium, read by an arithmetic device or the like included in the control portion 301 of the device 300, and executed. That is, a program that makes hardware to execute the authentication method, the operation method, or the like described in the above as an example and a non-temporary memory medium including the program are of embodiments of the present invention.

At least part of any of the structure examples, the drawings corresponding thereto, and the like described in this embodiment can be implemented in combination with any of the other structure examples, the other drawings corresponding thereto, and the like as appropriate.

At least part of this embodiment can be implemented in combination with any of the other embodiments described in this specification as appropriate.

Embodiment 3

In this embodiment, pixel configurations that can be employed for the display device of one embodiment of the present invention will be described with reference to drawings.

A display panel of one embodiment of the present invention includes first pixel circuits including a light-receiving element and second pixel circuits including a light-emitting element. The first pixel circuits and the second pixel circuits are arranged in a matrix.

Figure 22A:
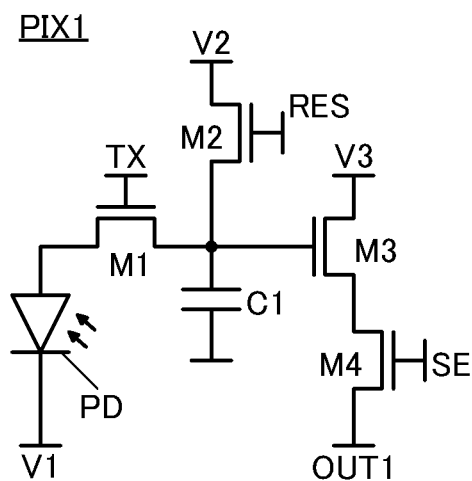
FIGS. 22A and 22B are configuration examples of pixel circuits.
Figure 22B:
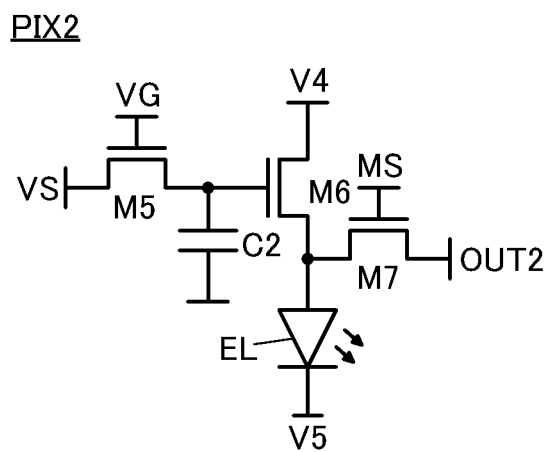

FIG. 22A illustrates an example of the first pixel circuit including a light-receiving element. FIG. 22B illustrates an example of the second pixel circuit including a light-emitting element.

A pixel circuit PIX1 illustrated in FIG. 22A includes a light-receiving element PD, a transistor M1, a transistor M2, a transistor M3, a transistor M4, and a capacitor C1. Here, a photodiode is used as an example of the light-receiving element PD.

A cathode of the light-receiving element PD is electrically connected to a wiring V1, and an anode of the light-receiving element PD is electrically connected to one of a source and a drain of the transistor M1. A gate of the transistor M1 is electrically connected to a wiring TX, and the other of the source and the drain of the transistor M1 is electrically connected to one electrode of the capacitor $C_1$, one of a source and a drain of the transistor M2, and a gate of the transistor M3. A gate of the transistor M2 is electrically connected to a wiring RES, and the other of the source and the drain of the transistor M2 is electrically connected to a wiring V2. One of a source and a drain of the transistor M3 is electrically connected to a wiring V3, and the other of the source and the drain of the transistor M3 is electrically connected to one of a source and a drain of the transistor M4. A gate of the transistor M4 is electrically connected to a wiring SE, and the other of the source and the drain of the transistor M4 is electrically connected to a wiring OUT1.

A constant potential is supplied to the wiring V1, the wiring V2, and the wiring V3. When the light-receiving element PD is driven with a reverse bias, the wiring V2 is supplied with a potential lower than the potential of the wiring V1. The transistor M2 is controlled by a signal supplied to the wiring RES and has a function of resetting the potential of a node connected to the gate of the transistor M3 to a potential supplied to the wiring V2. The transistor M1 is controlled by a signal supplied to the wiring TX and has a function of controlling the timing at which the potential of the node changes, in accordance with a current flowing through the light-receiving element PD. The transistor M3 functions as an amplifier transistor for outputting a signal corresponding to the potential of the node. The transistor M4 is controlled by a signal supplied to the wiring SE and functions as a selection transistor for reading an output corresponding to the potential of the node by an external circuit connected to the wiring OUT1.

A pixel circuit PIX2 illustrated in FIG. 22B includes a light-emitting element EL, a transistor M5, a transistor M6, a transistor M7, and a capacitor C2. Here, a light-emitting diode is used as an example of the light-emitting element EL. In particular, an organic EL element is preferably used as the light-emitting element EL.

A gate of the transistor M5 is electrically connected to a wiring VG, one of a source and a drain of the transistor M5 is electrically connected to a wiring VS, and the other of the source and the drain of the transistor M5 is electrically connected to one electrode of the capacitor $C_2$ and a gate of the transistor M6. One of a source and a drain of the transistor M6 is electrically connected to a wiring V4, and the other is electrically connected to an anode of the light-emitting element EL and one of a source and a drain of the transistor M7. A gate of the transistor M7 is electrically connected to a wiring MS, and the other of the source and the drain of the transistor M7 is electrically connected to a wiring OUT2. A cathode of the light-emitting element EL is electrically connected to a wiring V5.

A constant potential is supplied to the wiring V4 and the wiring V5. In the light-emitting element EL, the anode side can have a high potential and the cathode side can have a lower potential than the anode side. The transistor M5 is controlled by a signal supplied to the wiring VG and functions as a selection transistor for controlling a selection state of the pixel circuit PIX2. The transistor M6 functions as a driving transistor that controls a current flowing through the light-emitting element EL in accordance with a potential supplied to the gate of the transistor M6. When the transistor M5 is on, a potential supplied to the wiring VS is supplied to the gate of the transistor M6, and the luminance of the light-emitting element EL can be controlled in accordance with the potential. The transistor M7 is controlled by a signal supplied to the wiring MS and has a function of outputting a potential between the transistor M6 and the light-emitting element EL to the outside through the wiring OUT2.

Note that in the display panel of this embodiment, the light-emitting element may be made to emit light in a pulsed manner so as to display an image. A reduction in the driving time of the light-emitting element can reduce power consumption of the display panel and suppress heat generation of the display panel. An organic EL element is particularly preferable because of its favorable frequency characteristics. The frequency can be 1 kHz to 100 MHz, for example.

Here, a transistor in which a metal oxide (an oxide semiconductor) is used in a semiconductor layer where a channel is formed is preferably used as the transistors M1, M2, M3, and M4 included in the pixel circuit PIX1 and the transistors M5 M6, and M7 included in the pixel circuit PIX2.

A transistor using a metal oxide having a wider band gap and a lower carrier density than silicon can achieve an extremely low off-state current. Such a low off-state current enables retention of charges accumulated in a capacitor that is connected in series with the transistor for a long time. Therefore, it is particularly preferable to use a transistor including an oxide semiconductor as the transistors M1, M2, and M5 each of which is connected in series with the capacitor C1 or the capacitor C2. Moreover, the use of transistors including an oxide semiconductor as the other transistors can reduce the manufacturing cost.

Alternatively, transistors using silicon as a semiconductor in which a channel is formed can be used as the transistors M1 to M7. In particular, the use of silicon with high crystallinity, such as single crystal silicon or polycrystalline silicon, is preferable because high field-effect mobility is achieved and higher-speed operation is possible.

Alternatively, a transistor including an oxide semiconductor may be used as at least one of the transistors M1 to M7, and transistors including silicon may be used as the other transistors.

Although n-channel transistors are shown in FIGS. 22A and 22B, p-channel transistors can alternatively be used.

The transistors included in the pixel circuit PIX1 and the transistors included in the pixel circuit PIX2 are preferably formed side by side over the same substrate. It is particularly preferable that the transistors included in the pixel circuit PIX1 and the transistors included in the pixel circuit PIX2 be periodically arranged in one region.

One or more layers including the transistor and/or the capacitor are preferably provided to overlap with the light-receiving element PD or the light-emitting element EL. Thus, the effective area of each pixel circuit can be reduced, and a high-definition light-receiving portion or display portion can be achieved.

At least part of this embodiment can be implemented in combination with any of the other embodiments described in this specification as appropriate.

Embodiment 4

In this embodiment, electronic devices that can include the display device of one embodiment of the present invention will be described with reference to drawings.

An electronic device of this embodiment includes the display device of one embodiment of the present invention. The display device has a function of sensing light, and thus can perform biological authentication with the display portion and detect a touch or a near touch on the display portion. Unauthorized use of the electronic device of one embodiment of the present invention is difficult, that is, the security level of the electronic device is extremely high. In addition, the electronic device can have improved functionality and convenience, for example.

Examples of the electronic devices include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device in this embodiment can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 23A:
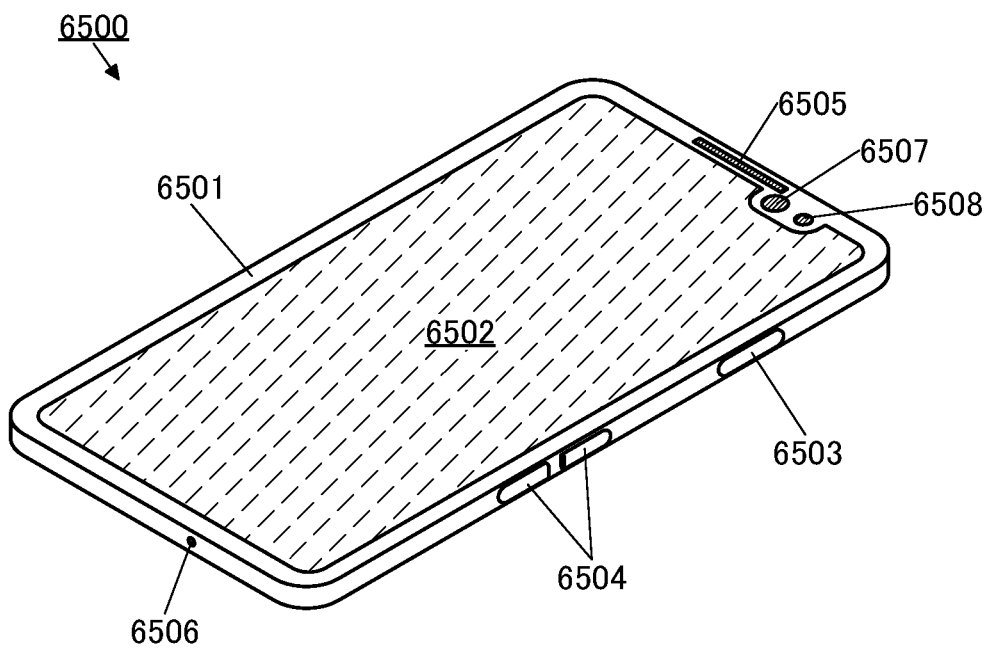
FIGS. 23A and 23B illustrate a structure example of an electronic device.

An electronic device 6500 in FIG. 23A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display device of one embodiment of the present invention can be used in the display portion 6502.

Figure 23B:
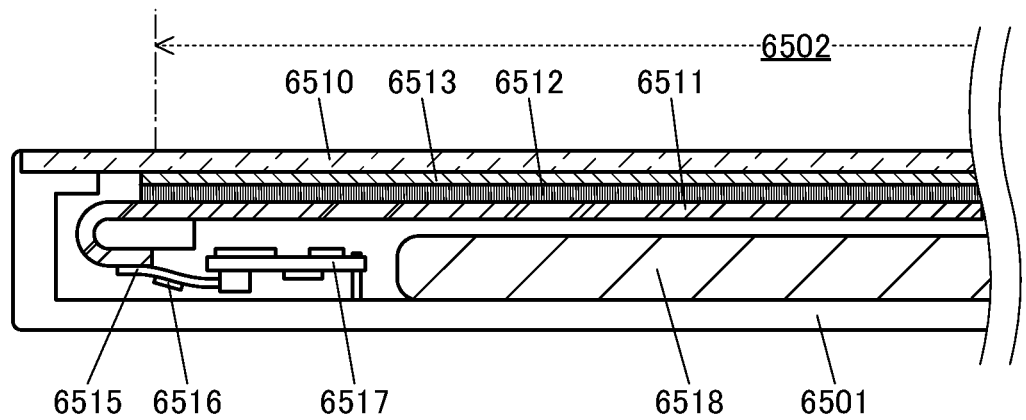

FIG. 23B is a schematic cross-sectional view including an end portion of the housing 6501 on the microphone 6506 side.

A protective component 6510 that transmits light is provided on the display surface side of the housing 6501. A display panel 6511, an optical component 6512, a touch sensor panel 6513, a printed circuit board 6517, a battery 6518, and the like are provided in a space surrounded by the housing 6501 and the protective component 6510.

The display panel 6511, the optical component 6512, and the touch sensor panel 6513 are fixed to the protective component 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be provided. Since the display panel 6511 is extremely thin, the battery 6518 with high capacity can be mounted while maintaining the small thickness of the electronic device. An electronic device with a narrow frame can be obtained when part of the display panel 6511 is folded back so that the portion connected to the FPC 6515 is positioned on the rear side of a pixel portion.

Figure 24A:
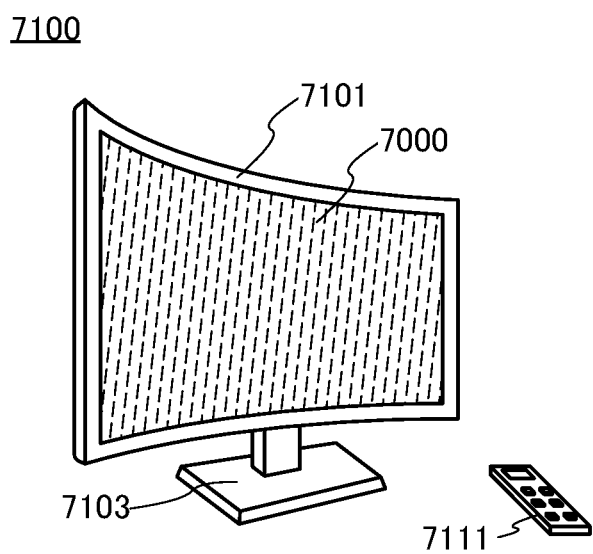
FIGS. 24A to 24D illustrate structure examples of electronic devices.

FIG. 24A illustrates an example of a television device. In a television device 7100, a display portion 7000 is incorporated in a housing 7101. Here, a structure in which the housing 7101 is supported by a stand 7103 is illustrated.

The display device of one embodiment of the present invention can be used in the display portion 7000.

The television device 7100 illustrated in FIG. 24A can be operated with an operation switch provided in the housing 7101 or a separate remote controller 7111. Alternatively, the display portion 7000 may include a touch sensor, and the television device 7100 may be operated by a touch on the display portion 7000 with a finger or the like. The remote controller 7111 may be provided with a display portion for displaying information output from the remote controller 7111. With a touch panel or operation keys provided in the remote controller 7111, channels and volume can be controlled, and videos displayed on the display portion 7000 can be controlled.

Note that the television device 7100 is provided with a receiver, a modem, and the like. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 24B:
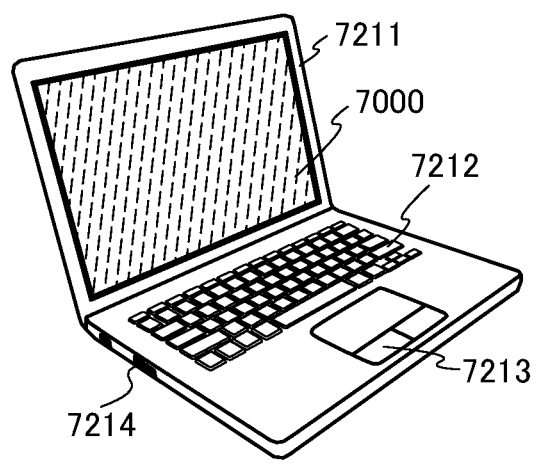

FIG. 24B illustrates an example of a laptop personal computer. A laptop personal computer 7200 includes a housing 7211, a keyboard 7212, a pointing device 7213, an external connection port 7214, and the like. The display portion 7000 is incorporated in the housing 7211.

The display device of one embodiment of the present invention can be used in the display portion 7000.

Figure 24C:
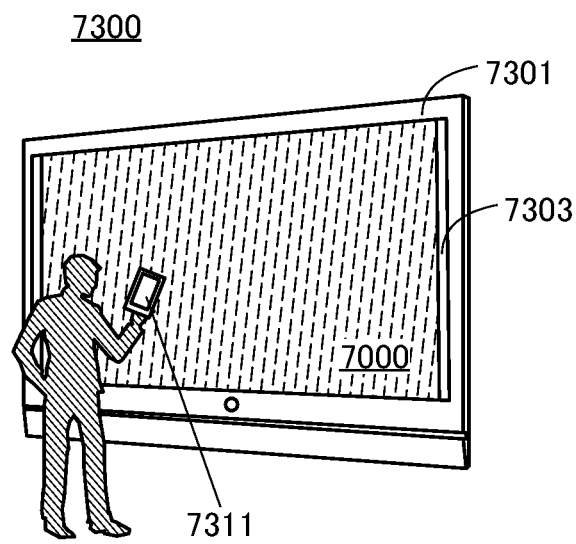
Figure 24D:
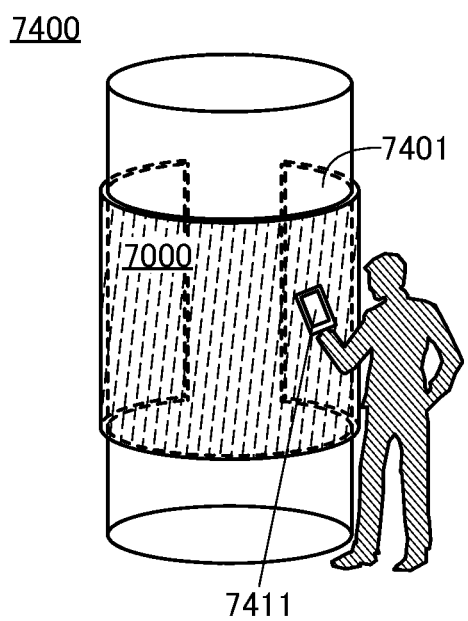

FIGS. 24C and 24D illustrate examples of digital signage.

Digital signage 7300 illustrated in FIG. 24C includes a housing 7301, the display portion 7000, a speaker 7303, and the like. Furthermore, the digital signage can include an LED lamp, operation keys (including a power switch or an operation switch), a connection terminal, a variety of sensors, a microphone, and the like.

FIG. 24D illustrates digital signage 7400 mounted on a cylindrical pillar 7401. The digital signage 7400 includes the display portion 7000 provided along a curved surface of the pillar 7401.

The display device of one embodiment of the present invention can be used in the display portion 7000 illustrated in each of FIGS. 24C and 24D.

A larger area of the display portion 7000 can increase the amount of data that can be provided at a time. The larger display portion 7000 attracts more attention, so that the effectiveness of the advertisement can be increased, for example.

It is preferable to use a touch panel in the display portion 7000 because a device with such a structure does not just display still or moving images on the display portion 7000 but can be operated by users intuitively. Moreover, for an application for providing information such as route information or traffic information, usability can be enhanced by intuitive operation.

It is preferable that the digital signage 7300 or the digital signage 7400 work with an information terminal 7311 or an information terminal 7411 such as a user's smartphone through wireless communication, as illustrated in FIGS. 24C and 24D. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

Electronic devices illustrated in FIGS. 25A to 25F include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The electronic devices illustrated in FIGS. 25A to 25F have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may include a camera or the like and have a function of taking a still image or a moving image and storing the taken image in a recording medium (an external recording medium or a recording medium incorporated in the camera), a function of displaying the taken image on the display portion, or the like.

The electronic devices illustrated in FIGS. 25A to 25F are described in detail below.

Figure 25A:
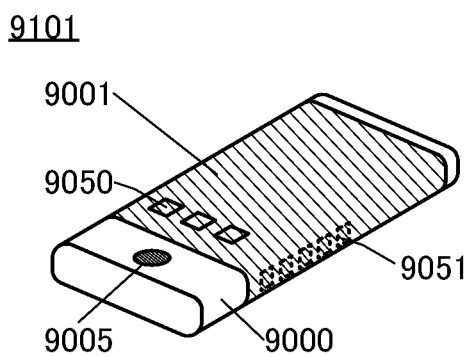
FIGS. 25A to 25F illustrate structure examples of electronic devices.

FIG. 25A is a perspective view illustrating a portable information terminal 9101. The portable information terminal 9101 can be used as a smartphone, for example. Note that the portable information terminal 9101 may be provided with the speaker 9003, the connection terminal 9006, the sensor 9007, or the like. The portable information terminal 9101 can display text and image information on its plurality of surfaces. FIG. 25A illustrates an example where three icons 9050 are displayed. Information 9051 indicated by dashed rectangles can be displayed on another surface of the display portion 9001. Examples of the information 9051 include notification of reception of an e-mail, an SNS message, or an incoming call, the title and sender of an e-mail, an SNS message, or the like, the date, the time, remaining battery, and the reception strength of an antenna. Alternatively, the icon 9050 or the like may be displayed at the position where the information 9051 is displayed.

Figure 25B:
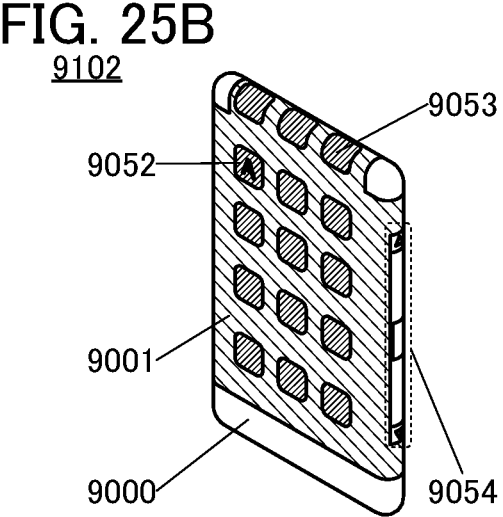

FIG. 25B is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, the user can check the information 9053 displayed at a position that can be observed from above the portable information terminal 9102, with the portable information terminal 9102 put in a breast pocket of his/her clothes. The user can see the display without taking out the portable information terminal 9102 from the pocket and decide whether to answer the call, for example.

Figure 25C:
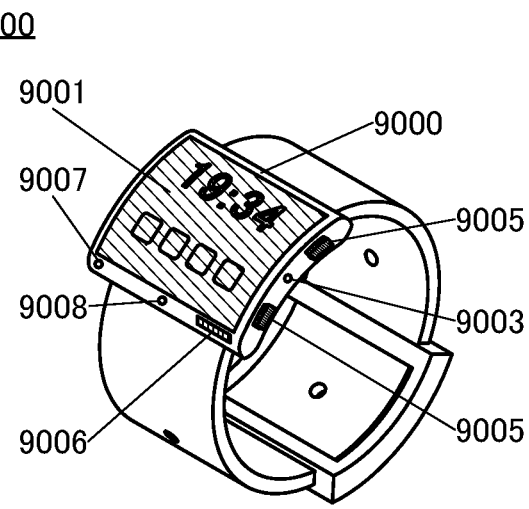

FIG. 25C is a perspective view illustrating a watch-type portable information terminal 9200. A display surface of the display portion 9001 is curved, and display can be performed along the curved display surface. Furthermore, for example, mutual communication between the portable information terminal 9200 and a headset capable of wireless communication can be performed, and thus hands-free calling is possible. With the connection terminal 9006, the portable information terminal 9200 can perform mutual data transmission with another information terminal and charging. Note that the charging operation may be performed by wireless power feeding.

Figure 25D:
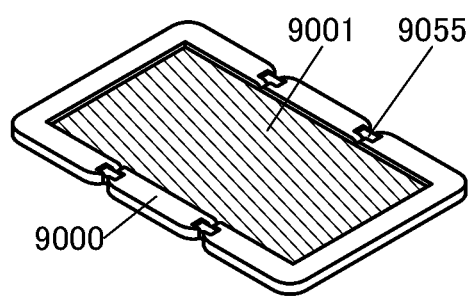
Figure 25E:
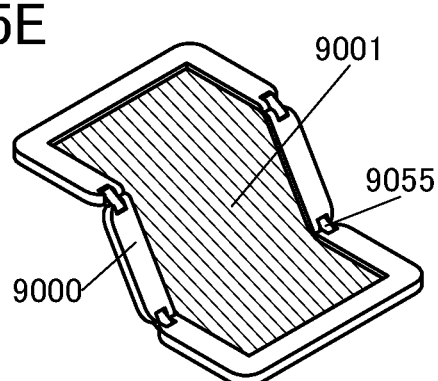
Figure 25F:
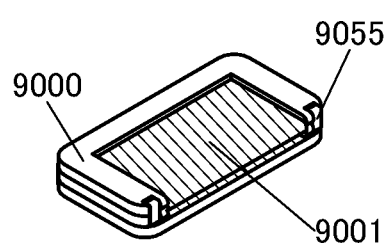

FIGS. 25D, 25E, and 25F are perspective views of a foldable portable information terminal 9201 that is opened, that is shifted from the opened state to the folded state or from the folded state to the opened state, and that is folded, respectively. The portable information terminal 9201 is highly portable in the folded state and is highly browsable in the opened state because of a seamless large display region. The display portion 9001 of the portable information terminal 9201 is supported by three housings 9000 joined by hinges 9055. For example, the display portion 9001 can be folded with a radius of curvature of greater than or equal to 0.1 mm and less than or equal to 150 mm.

At least part of this embodiment can be implemented in combination with any of the other embodiments described in this specification as appropriate.

This application is based on Japanese Patent Application Serial No. 2019-176791 filed with Japan Patent Office on Sep. 27, 2019, the entire contents of which are hereby incorporated by reference.

What is claimed is:

1. A display device comprising:
a light-emitting element;
a light-receiving element;
a first conductive layer;
a second conductive layer; and
an insulating layer,
wherein the light-emitting element comprises a first pixel electrode, a light-emitting layer, and a common electrode,
wherein the light-receiving element comprises a second pixel electrode, an active layer, and the common electrode,
wherein the first pixel electrode and the second pixel electrode are on the same plane,
wherein the common electrode comprises a portion overlapping with the first pixel electrode with the light-emitting layer therebetween, and a portion overlapping with the second pixel electrode with the active layer therebetween,
wherein the first conductive layer, the second conductive layer, and the insulating layer are above the common electrode,
wherein the first conductive layer is provided between the light-emitting element and the light-receiving element in a plan view of the display device;
wherein the insulating layer is above the first conductive layer,
wherein the second conductive layer is above the insulating layer, and
wherein the light-receiving element has a function of receiving light emitted from the light-emitting element.

2. The display device according to claim 1,
wherein the first conductive layer comprises a plurality of openings,
wherein the light-emitting element overlaps with one of the openings of the first conductive layer, and
wherein the light-receiving element overlaps with another one of the openings of the first conductive layer.

3. The display device according to claim 1, further comprising a common layer, wherein the common layer comprises a portion between the first pixel electrode and the common electrode, and a portion between the second pixel electrode and the common electrode, and wherein the light-emitting layer and the active layer comprise different organic compounds.

4. A display device comprising:

a light-emitting element;

a light-receiving element;

a first conductive layer;

a second conductive layer;

an insulating layer; and a protective layer, wherein the light-emitting element comprises a first pixel electrode, a light-emitting layer, and a common electrode, wherein the light-receiving element comprises a second pixel electrode, an active layer, and the common electrode, wherein the first pixel electrode and the second pixel electrode are on the same plane, wherein the common electrode comprises a portion overlapping with the first pixel electrode with the light-emitting layer therebetween, and a portion overlapping with the second pixel electrode with the active layer therebetween, wherein the protective layer is above the common electrode, wherein the first conductive layer is above the protective layer, wherein the first conductive layer is provided between the light-emitting element and the light-receiving element in a plan view of the display device;

wherein the insulating layer is above the first conductive layer and the protective layer, wherein the second conductive layer is above the insulating layer, and wherein the light-receiving element has a function of receiving light emitted from the light-emitting element.

5. The display device according to claim 4, wherein the first conductive layer comprises a plurality of openings, wherein the light-emitting element overlaps with one of the openings of the first conductive layer, and wherein the light-receiving element overlaps with another one of the openings of the first conductive layer.

6. The display device according to claim 4, further comprising a common layer, wherein the common layer comprises a portion between the first pixel electrode and the common electrode, and a portion between the second pixel electrode and the common electrode, and wherein the light-emitting layer and the active layer comprise different organic compounds.

* * * * *